United States Patent [19]

Pelham et al.

[11] Patent Number: 4,967,375
[45] Date of Patent: Oct. 30, 1990

[54] FAST ARCHITECTURE FOR GRAPHICS PROCESSOR

[75] Inventors: Anthony J. Pelham, Port Orange; Walter R. Steiner; William S. Didden, both of Ormond Beach, all of Fla.

[73] Assignee: Star Technologies, Inc., Sterling, Va.

[21] Appl. No.: 840,459

[22] Filed: Mar. 17, 1986

[51] Int. Cl.$^5$ .............................................. G06F 15/20
[52] U.S. Cl. ................................... 364/518; 364/200; 364/900
[58] Field of Search ........ 364/518, 521, 200 MS File, 364/900 MS file; 340/749, 750, 798, 799

[56] References Cited

U.S. PATENT DOCUMENTS

| | | | |
|---|---|---|---|
| 4,439,762 | 3/1984 | Van Vliet et al. | 340/799 X |
| 4,562,435 | 12/1985 | McDonough et al. | 340/798 |
| 4,644,495 | 2/1987 | Crane | 340/799 X |
| 4,648,045 | 3/1987 | Demetrescu | 340/799 X |
| 4,660,029 | 4/1987 | Honda et al. | 340/799 X |
| 4,673,930 | 6/1987 | Bujalski et al. | 340/750 X |

FOREIGN PATENT DOCUMENTS

| | | |
|---|---|---|
| 0166525 | 5/1985 | European Pat. Off. . |
| 0152741 | 8/1985 | European Pat. Off. . |
| 0166525 | 1/1986 | European Pat. Off. . |
| 8403967 | 10/1984 | PCT Int'l Appl. . |

OTHER PUBLICATIONS

*Bipolar Microprocessor Logic and Interface Data Book*, by Advanced Micro Devices (1983), pp. 5-5 to 5-31 and 5-123 to 5-139.

Primary Examiner—Gary V. Harkcom
Assistant Examiner—H. R. Herndon
Attorney, Agent, or Firm—Spensley Horn Jubas & Lubitz

[57] ABSTRACT

A graphics processor having an independent processor for traversing a hierarchical graphics data base. The independent processor, termed a "tree traverser", generates a stream of addresses to the memory in which the data base is stored, producing a stream of data over a private, unidirectional data path to a geometry processor.

18 Claims, 36 Drawing Sheets

Fig. 4  SEGMENT CONTROL BLOCK

| WORD | 0 | SIBLING POINTER |
|---|---|---|
| WORD | 1 | CHILD POINTER |
| WORD | 2 | FLAG WORD |
| WORD | 3 | CULLING BUFFER POINTER |
| WORD | 4 | DATA BUFFER POINTER |
| WORD | 5 | segment NAME |
| WORD | 6 | ANNOTATION BUFFER POINTER |
| WORD | 7 | EXISTENCE POINTER |
| WORD | 8 | PARENT POINTER |
| WORD | 9 | LAST DATA BUFFER PACKET POINTER |
| WORD | 10 | PADDING WORD |
| WORD | 11 | PADDING WORD |
| WORD | 12 | PADDING WORD |
| WORD | 13 | PADDING WORD |
| WORD | 15 | PADDING WORD |
| WORD | 15 | PADDING WORD |

Fig. 5  INSTANCE CONTROL BLOCK

| WORD | 0 | SIBLING POINTER (NULL) |
|---|---|---|
| WORD | 1 | CHILD POINTER |
| WORD | 2 | FLAG WORD |
| WORD | 3 | CULLING BUFFER POINTER |
| WORD | 4 | DATA BUFFER POINTER |
| WORD | 5 | segment NAME |
| WORD | 6 | ANNOTATION SEGMENT POINTER |
| WORD | 7 | EXISTENCE POINTER |
| WORD | 8 | OWNER POINTER |
| WORD | 9 | LAST DATA BUFFER PACKET POINTER |
| WORD | 10 | PADDING WORD |
| WORD | 11 | PADDING WORD |
| WORD | 12 | PADDING WORD |
| WORD | 13 | PADDING WORD |
| WORD | 14 | PADDING WORD |
| WORD | 15 | PADDING WORD |

Fig. 6  INVOCATION CONTROL BLOCK

| WORD | 0 | SIBLING POINTER |
|---|---|---|
| WORD | 1 | INSTANCE POINTER |
| WORD | 2 | FLAG WORD |
| WORD | 3 | CULLING BUFFER POINTER |
| WORD | 4 | PARTNER POINTER |
| WORD | 5 | segment NAME |
| WORD | 6 | ANNOTATION BUFFER POINTER |
| WORD | 7 | EXISTENCE POINTER |
| WORD | 8 | PARENT POINTER |
| WORD | 9 | PADDING WORD |
| WORD | 10 | PADDING WORD |
| WORD | 11 | PADDING WORD |
| WORD | 12 | PADDING WORD |
| WORD | 13 | PADDING WORD |
| WORD | 14 | PADDING WORD |
| WORD | 15 | PADDING WORD |

Fig. 7  CULLING/DATA BUFFER POCKET

| | 31 | 16 | 15 | 8 | 7 | 0 |
|---|---|---|---|---|---|---|
| WORD 0 | NEXT POCKET POINTER ||||||
| WORD 1 | FLAG WORD || OPCODE || BYTE COUNT ||
| WORD 2 | CULLING / DATA WORD ||||||
| WORD 3 | CULLING / DATA WORD ||||||
| WORD 4 | CULLING / DATA WORD ||||||
| • | CULLING / DATA WORD ||||||
| • | CULLING / DATA PADDING WORD ||||||
| • | CULLING / DATA PADDING WORD ||||||
| WORD 15/31 | CULLING / DATA PADDING WORD ||||||

FIG. 9    TREE TRAVERSER STACK DATA FORMAT

| ADDRESS | DATA |
|---|---|
| N | CHILD POINTER |
| N + 1 | OBJECT HEADER BLOCK POINTER |
| N + 2 | TREE LEVEL |
| N + 3 | FLAG WORD |
| N + 4 | TRANSFORMATION MATRIX M11 |
| N + 5 | TRANSFORMATION MATRIX M12 |
| N + 6 | TRANSFORMATION MATRIX M13 |
| N + 7 | TRANSFORMATION MATRIX M21 |
| N + 8 | TRANSFORMATION MATRIX M22 |
| N + 9 | TRANSFORMATION MATRIX M23 |
| N + 10 | TRANSFORMATION MATRIX M31 |
| N + 11 | TRANSFORMATION MATRIX M32 |
| N + 12 | TRANSFORMATION MATRIX M33 |
| N + 13 | TRANSFORMATION MATRIX M41 |
| N + 14 | TRANSFORMATION MATRIX M42 |
| N + 15 | TRANSFORMATION MATRIX M43 |
| N + 16 | POLYGON COLOR |
| N + 17 | EDGE COLOR |
| N + 18 | STROKED TEXT COLOR |
| N + 19 | LINE COLOR |
| N + 20 | POINT COLOR |
| N + 21 | FONT |
| N + 22 | LINE WIDTHING / LINE WEIGHTING |

Fig. 11 TREE TRAVERSER — READ

Fig. 12 SYSTEM BUS — WRITE

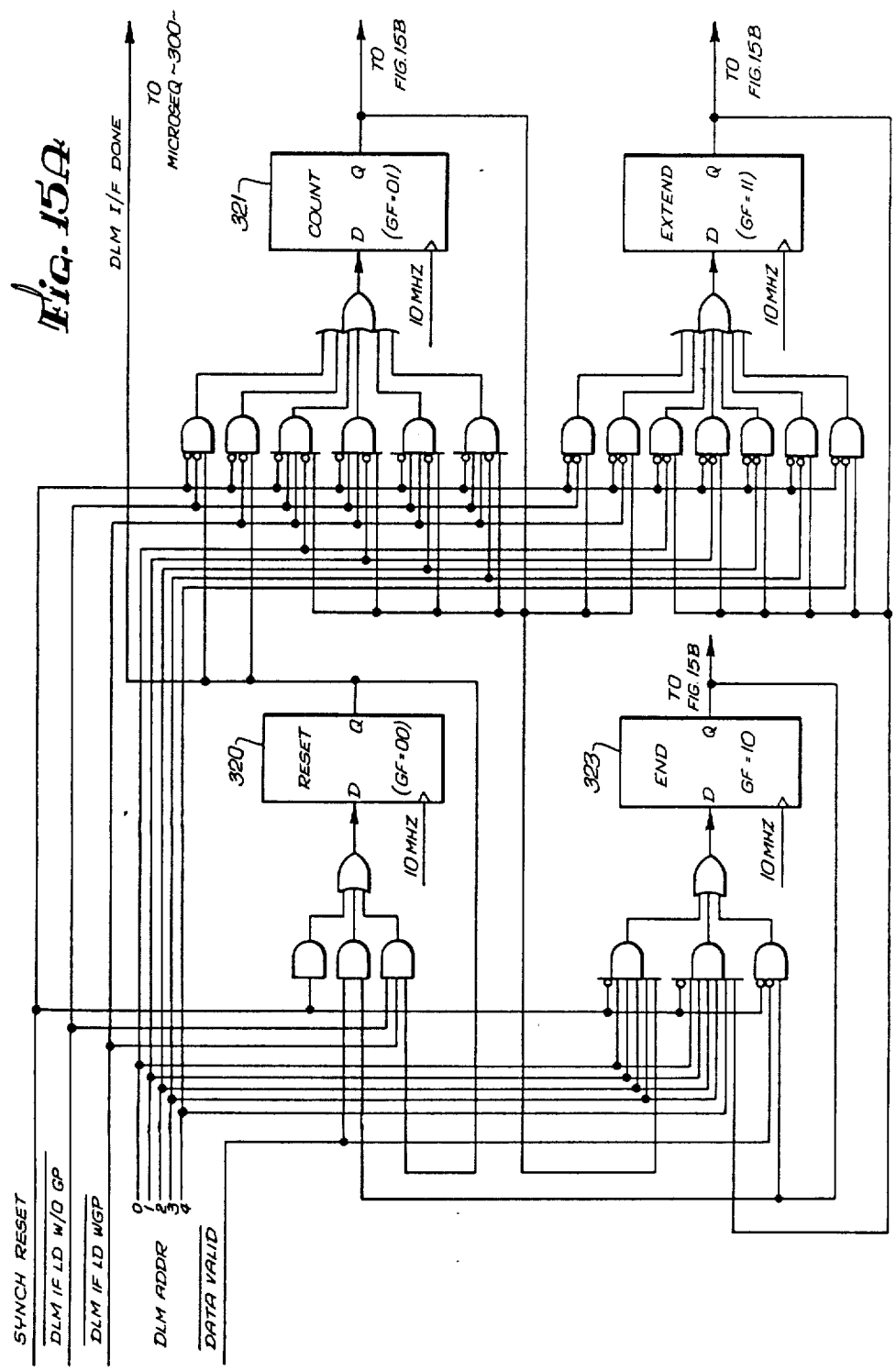

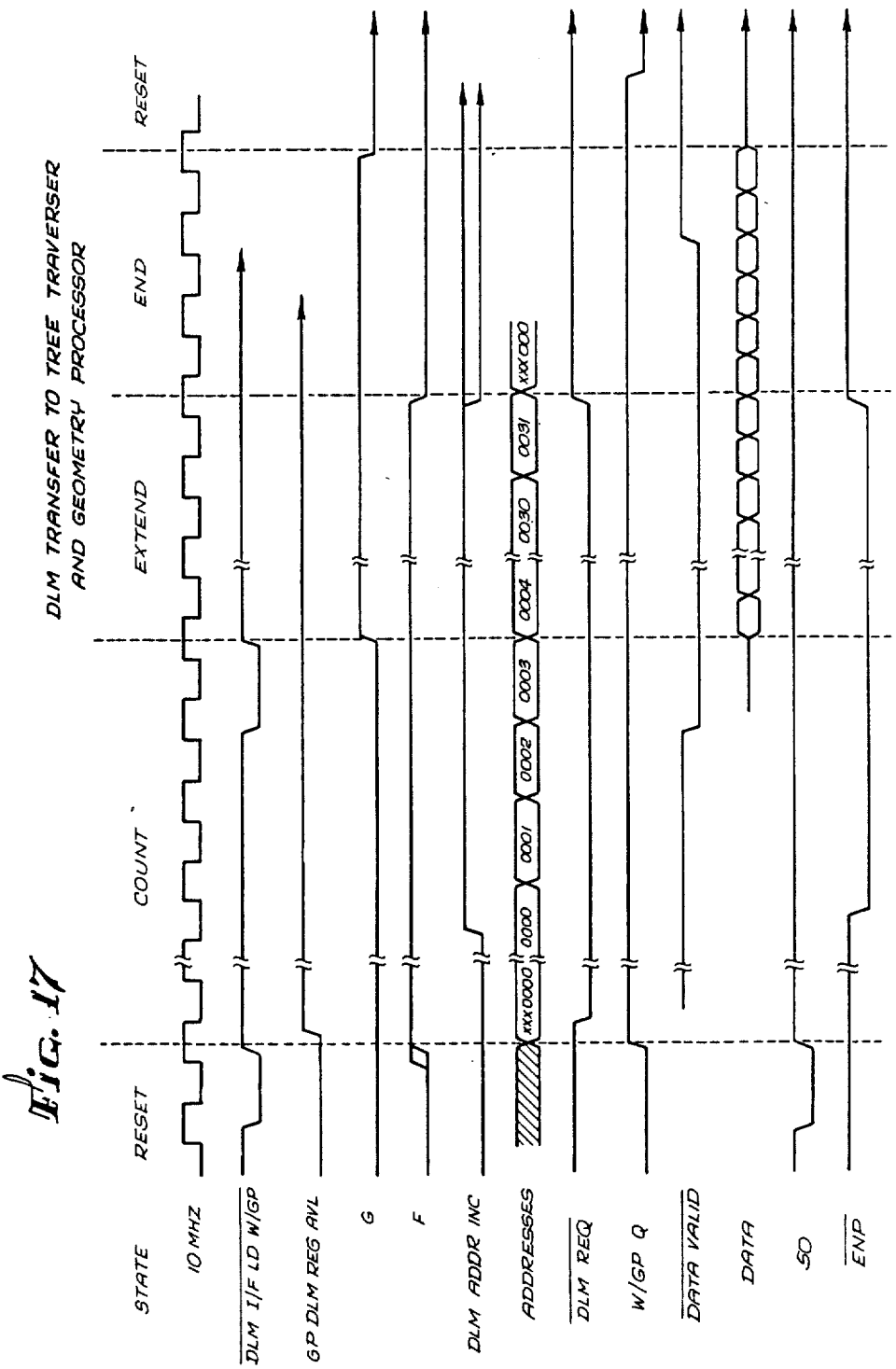

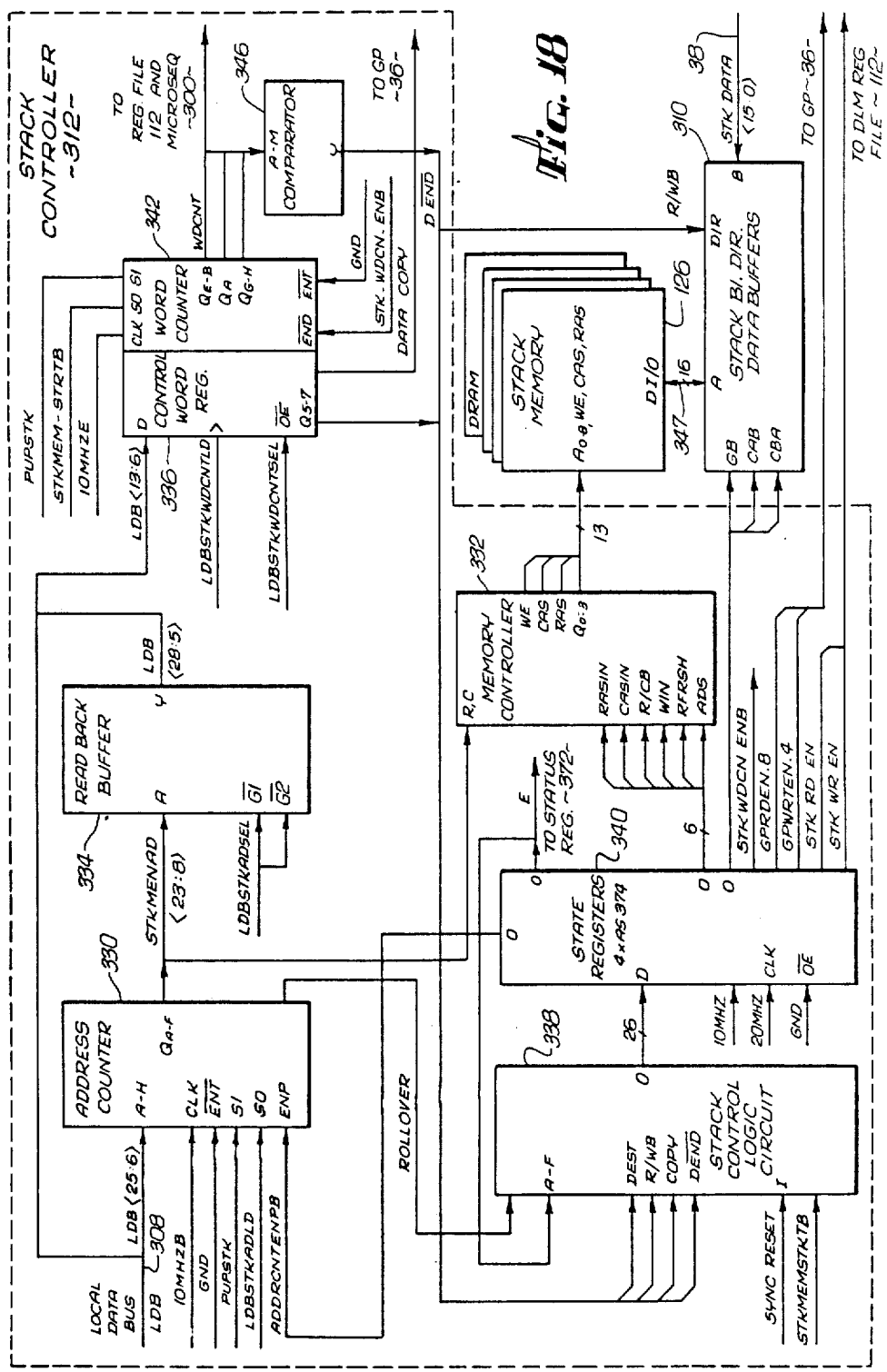

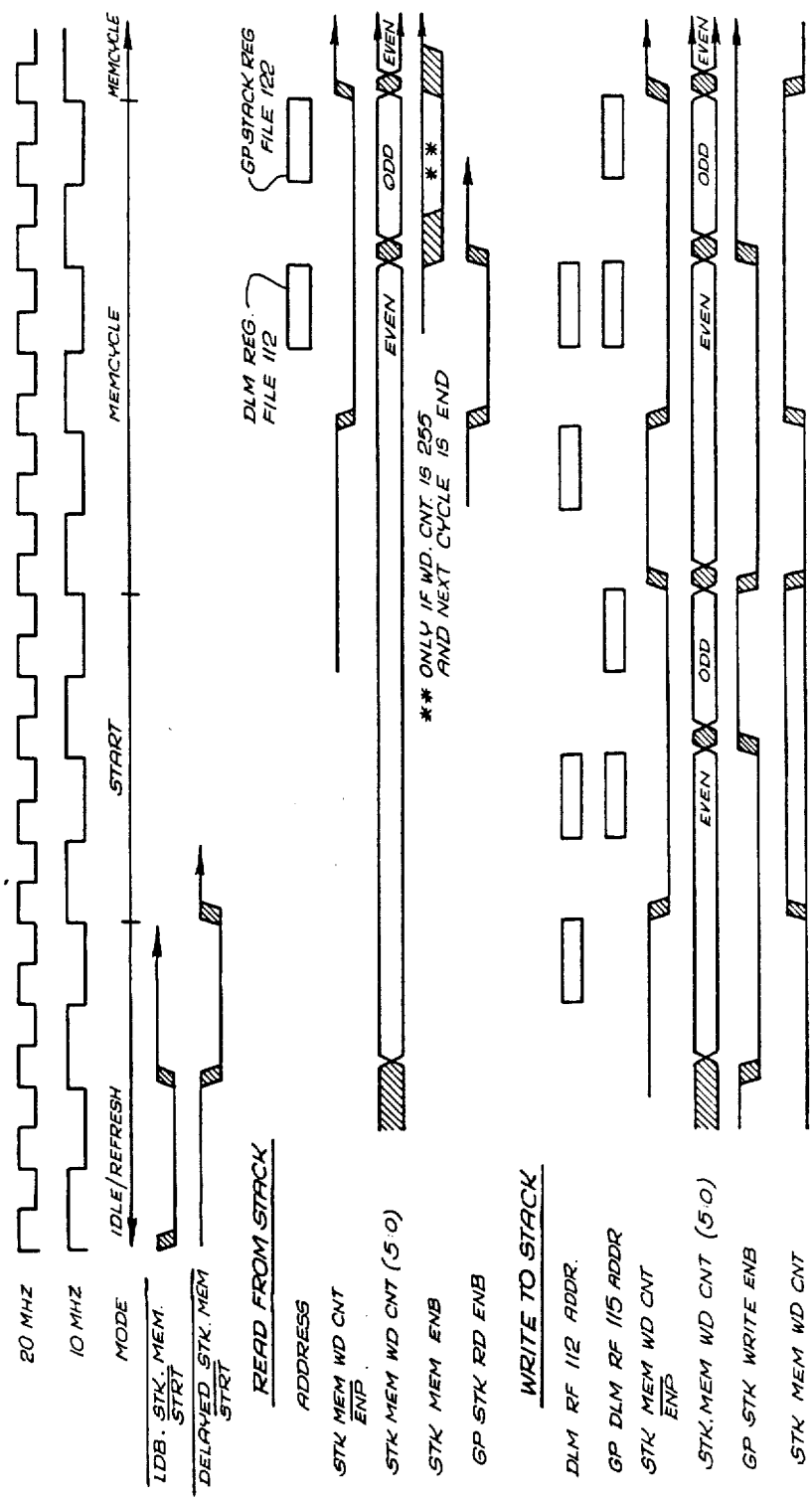

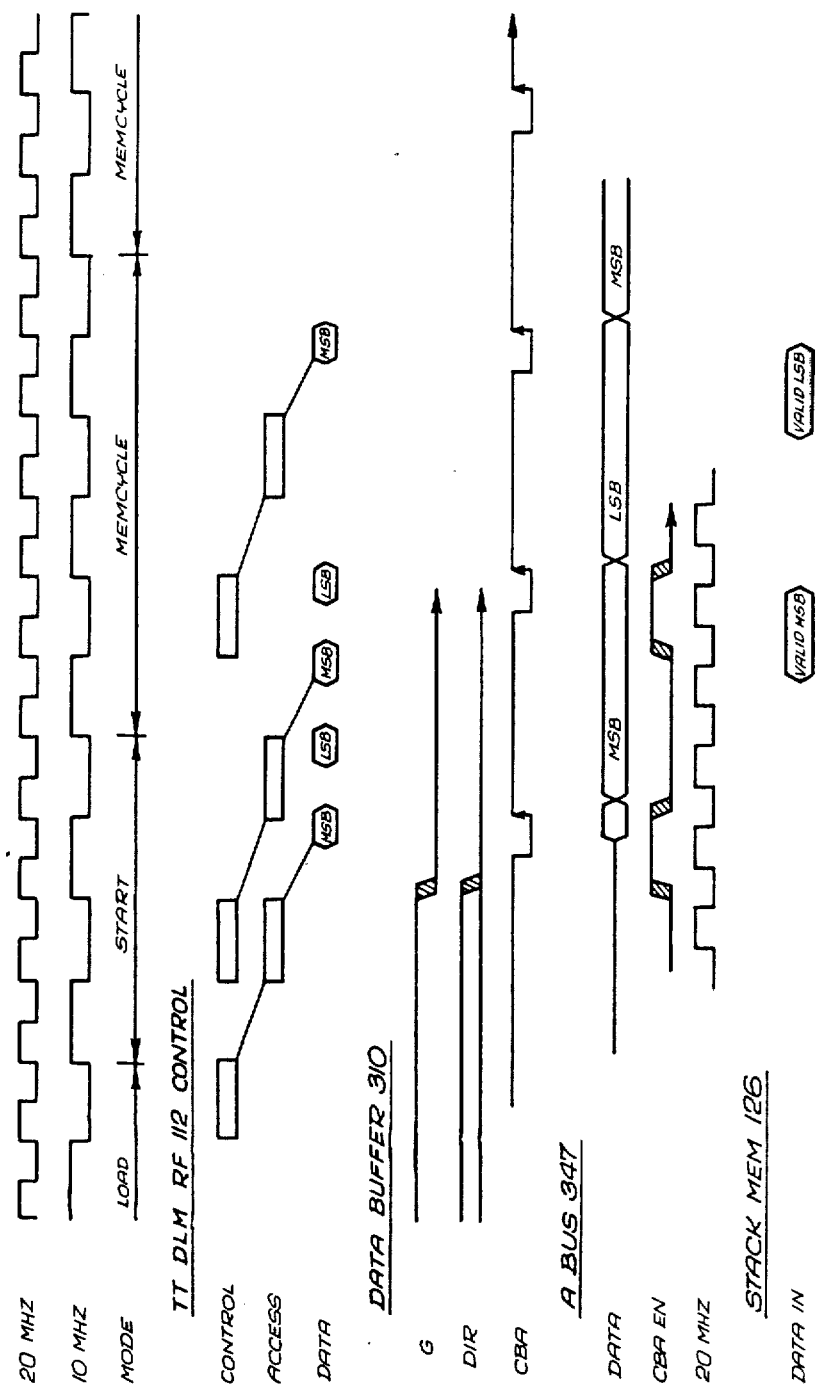

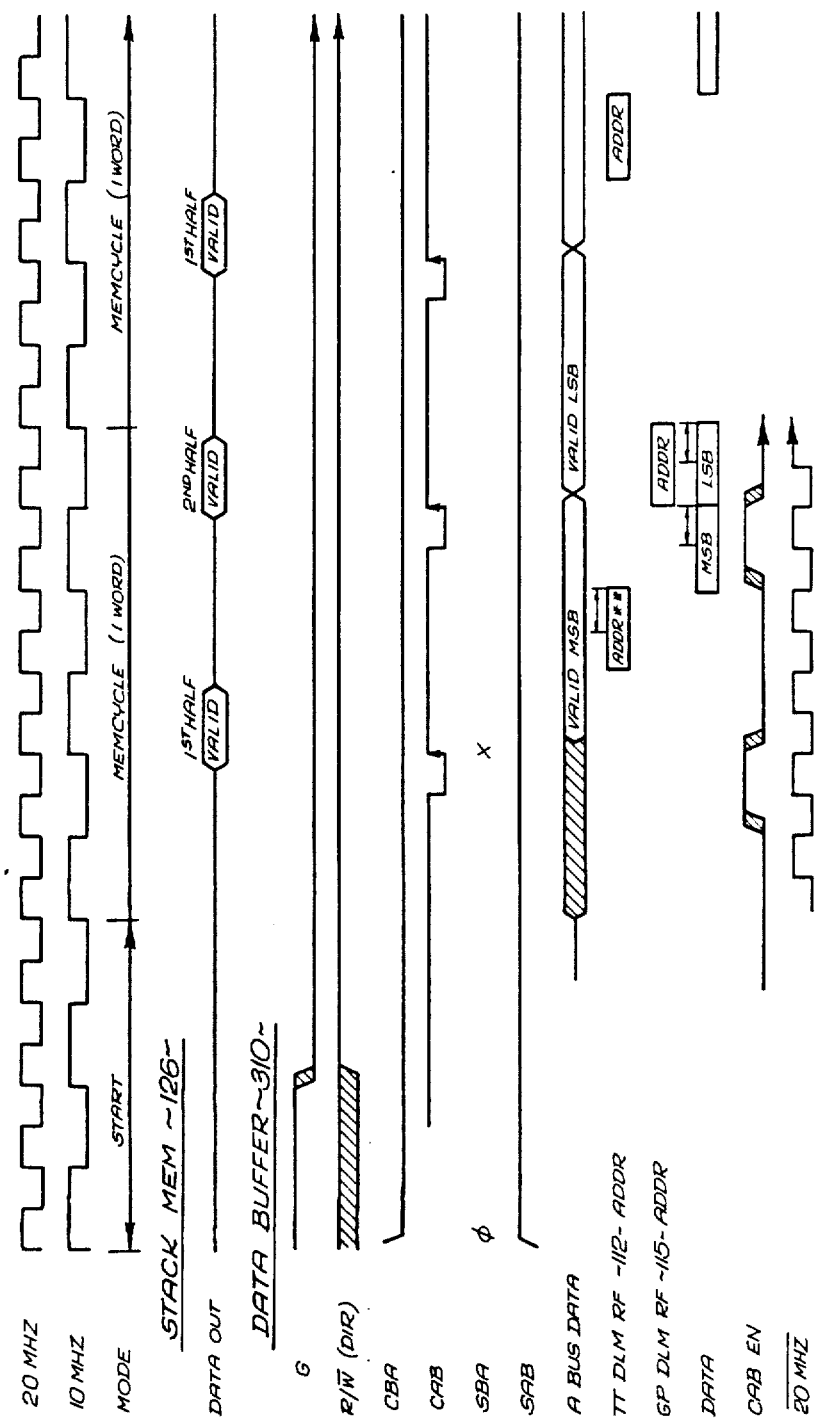

Fig. 25   ALU REGS.

| CONTENTS | LOCATION |
|---|---|
| TEMPORARY VARIABLE LOCATIONS | ALUWORD 00 |
| TEMPORARY VARIABLE LOCATIONS | ALUWORD 01 |
| TEMPORARY VARIABLE LOCATIONS | ALUWORD 02 |
| TEMPORARY VARIABLE LOCATIONS | ALUWORD 03 |
| UNDEFINED | ALUWORD 04 |
| LAST VISIBLE OBJECT SIBLING POINTER (PACKET ADDRESS - MAYBE NULL - 00000) | ALUWORD 05 |
| LAST VISIBLE OBJECT SIBLING POINTER (PACKET ADDRESS - MAYBE NULL - 00000) | ALUWORD 06 |
| LAST VISIBLE OBJECT HEADER BLOCK POINTER (PACKET ADDRESS - NEVER NULL) | ALUWORD 07 |
| STACK OBJECT CHILD POINTER (PACKET ADDRESS - MAYBE NULL - 00000) | ALUWORD 08 |
| STACK OBJECT HEADER BLOCK POINTER (PACKET ADDRESS - NEVER NULL) | ALUWORD 09 |
| CURRENT STACK LEVEL | ALUWORD 0A |
| PROCESS FACE MODE BIT (SET IF A FACE IS TO BE PROCESSED) | ALUWORD OC BIT 19 |
| PREVIOUS CYCLE RUN FLAG (SET IF A PREVIOUS CULLING CYCLE IS RUNNING) | ALUWORD OC BIT 18 |
| TREE OBJECTS EXHAUSTED BIT (SET IF TREE IS EXHAUSTED) | ALUWORD OC BIT 17 |
| INVOCATION - BIT 16 | ALUWORD OC BIT 10 |
| INSTANTIATION - BIT 17 | ALUWORD OC BIT 11 |
| GP STACK REG FILE TRANSFER PENDING (USED IN COPY OPERATIONS | ALUWORD OC BIT 8 |
| GP STACK TRANSFER PENDING | ALUWORD OC BIT 7 |
| NEXT OBJECT SEARCHED IS SIBLING/CHILD OF LAST SEARCHED OBJECT (1=SIBLING) | ALUWORD OC BIT 6 |
| LAST OBJECT SEARCHED IS SIBLING/CHILD OF LAST VISIBLE OBJECT (1=SIBLING) | ALUWORD OC BIT 5 |
| NEXT OBJECT SEARCHED FLAG | ALUWORD OC BIT 4 |
| LAST OBJECT WAS SEARCHED (LAST OBJECT DATA VALID) | ALUWORD OC BIT 3 |
| CHILD TO BE CULLED FLAG | ALUWORD OC BIT 2 |
| REVERSE AND PROCESS FLAG | ALUWORD OC BIT 1 |
| HOLDING POINTER | ALUWORD OC 0 |
| OBJECT POINTER REGISTER | ALUWORD OD |

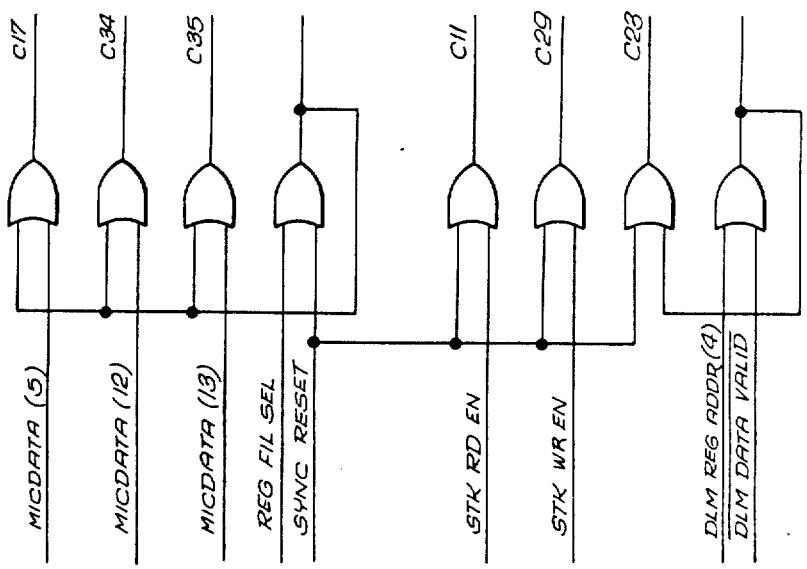

Fig. 28

Fig. 27  TREE TRAVERSER DLM REG. FILE

| LOCATION | CONTENTS |
|---|---|
| 00 | DLMI/F Packet Copy Word 00 |
| 01 | DLMI/F Packet Copy Word 01 |
| 02 | DLMI/F Packet Copy Word 02 |
| 03 | DLMI/F Packet Copy Word 03 |
| 04 | DLMI/F Packet Copy Word 04 |
| 05 | DLMI/F Packet Copy Word 05 |
| 06 | DLMI/F Packet Copy Word 06 |
| 07 | DLMI/F Packet Copy Word 07 |
| 08 | DLMI/F Packet Copy Word 08 |
| 09 | DLMI/F Packet Copy Word 09 |
| 0A | DLMI/F Packet Copy Word 0A |
| 0B | DLMI/F Packet Copy Word 0B |
| 0C | DLMI/F Packet Copy Word 0C |
| 0D | DLMI/F Packet Copy Word 0D |
| 0E | DLMI/F Packet Copy Word 0E |
| 0F | DLMI/F Packet Copy Word 0F |
| 10 | last visible object sibling pointer |
| 11 | last visible object child pointer |
| 12 | last visible object culling pointer |
| 13 | last visible object header block pointer |
| 14 | last object searched sibling pointer |
| 15 | last object searched child pointer |
| 16 | last object searched culling pointer |
| 17 | last object searched header block pointer |
| 18 | next object searched sibling pointer |
| 19 | next object searched child pointer |
| 1A | next object searched culling pointer |
| 1B | next object searched header block pointer |
| 1C | |
| 1D | Stack Copy Word |
| 1E | Stack Copy Word |
| 1F | Stack Copy Word |

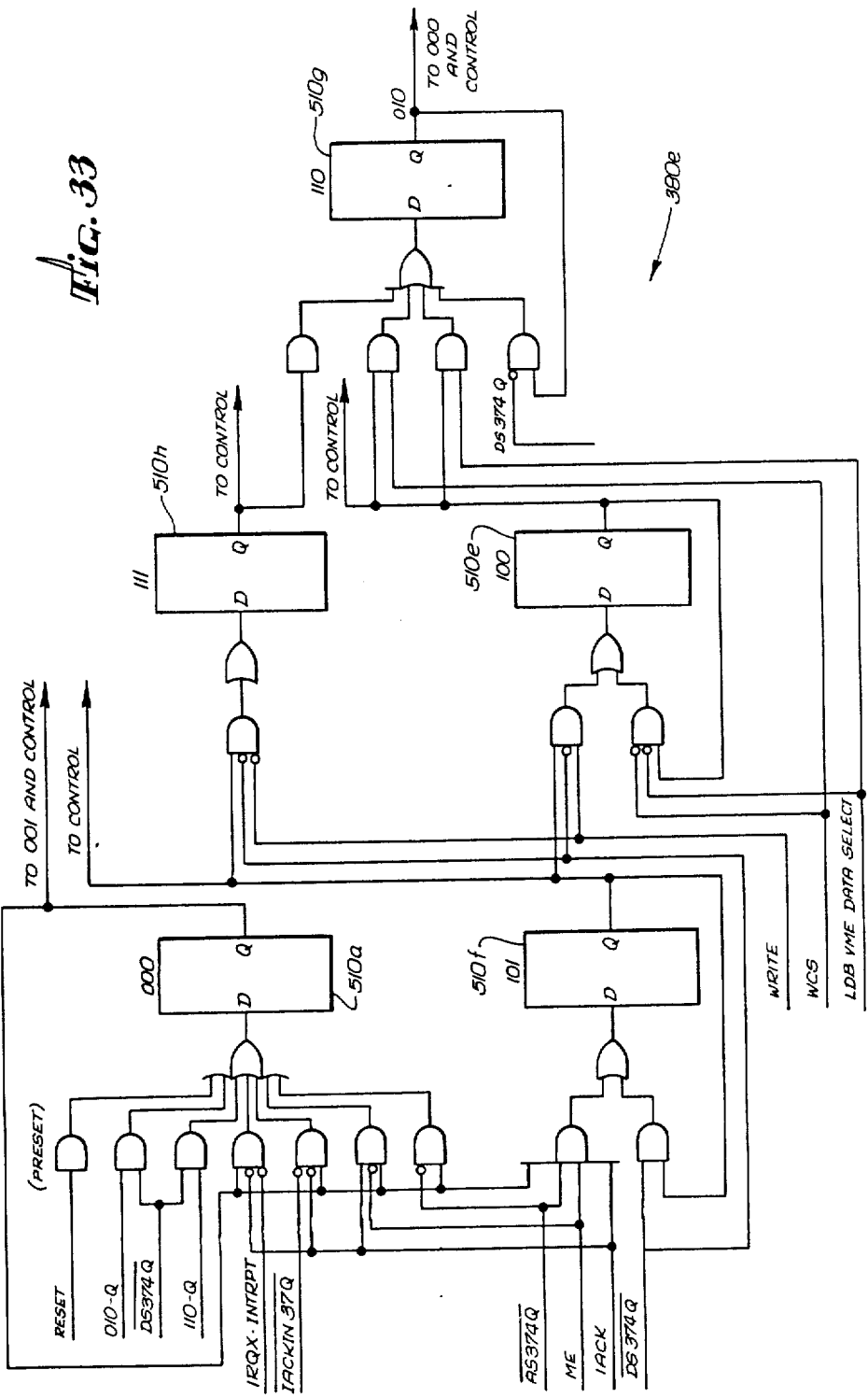

Fig. 34

VME INTERFACE INSTRUCTION FORMAT

| TREE TRAV ID | OP CODE | MICRO-SEQUENCER RUNNING | MICRO-SEQUENCER RESET | WCS SELECT | MICROSEQUENCER ADDRESS FIELD |
|---|---|---|---|---|---|
| 23   19 | 18   17 | 16 | 15 | 14 | 13   1 |
| \multicolumn{6}{l}{WRITABLE CONTROL STORE INSTRUCTION} |
| 1101   1 | 0   0 | 0 | 1 | 0/1 | A-----------A0 |
| \multicolumn{6}{l}{HALT INSTRUCTION} |
| 1101   1 | 0   1 | 0 | 1 | X | X-----------X0 |
| \multicolumn{6}{l}{RESTART INSTRUCTION} |
| 1101   1 | 0   1 | 1 | 1 | X | X-----------X0 |
| \multicolumn{6}{l}{RESET INSTRUCTIONS} |
| 1101   1 | 0   1 | X | 0/1 | X | X-----------X0 |
| \multicolumn{6}{l}{START INSTRUCTIONS} |
| 1101   1 | 1   1 | 1 | 1 | A | A-----------A0 |

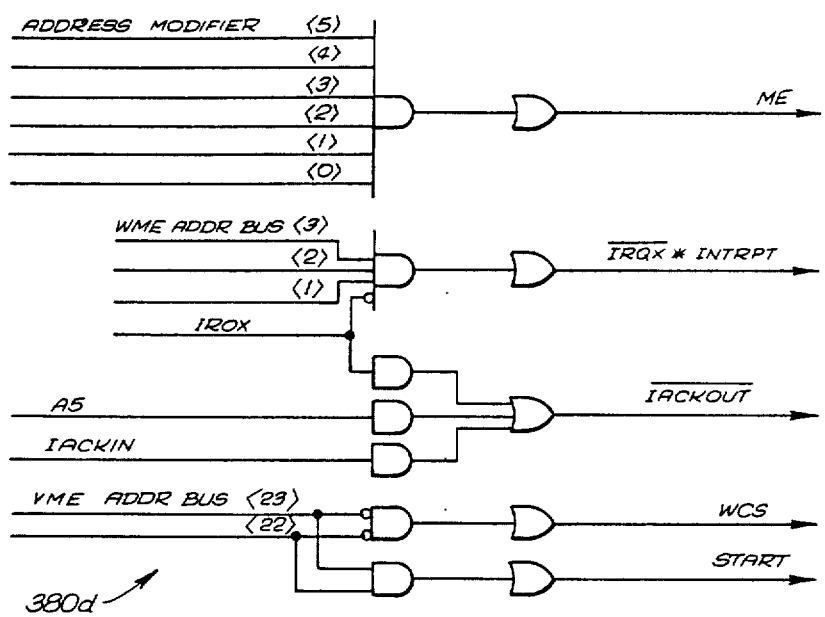

Fig. 35

FAST ARCHITECTURE FOR GRAPHICS PROCESSOR

BACKGROUND OF THE INVENTION

1. Field of the Invention

The present invention relates to peripheral processors, and more particularly, to processors for processing a hierarchical data structure.

2. Background Information

Computer systems often include peripheral processors to increase the computational speed of the overall system. Peripheral processors are typically specialized to efficiently perform one or more functions. One such peripheral processor is a graphics processor which is designed to create, modify and display a graphics data base under the control of a main or "host" computer.

Graphics processors are used in a variety of applications. For example, interactive computer-aided design (CAD) systems often utilize graphics processors to store and display a model of the object or objects to be designed. The designer directs the system through various input devices to create the model, often on a "piece" by "piece" basis. The various pieces of the model form a graphics data base which is stored by the graphics processor and displayed on command. Changes to the model by the designer cause the system to modify the data base and update the display screen to display the modified model.

One format for storing a graphics data base is referred to as a "hierarchical display list" in which graphics data describing various objects (or pieces of the objects) are stored in "segments". Each segment can be thought of as representing an object. Each segment can have one or more segments associated with it in a parent/child relationship. The "child" segment of a "parent" segment may in turn have one or more child segments associated with it. This parent/child relationship between segments results in a hierarchical "tree" structure such as that shown in FIG. 2.

Each segment of a hierarchical graphics data base typically has structural information which includes "pointers" to parent, child and "sibling" segments. Sibling segments are those segments having the same parent segment. A "pointer" to a segment identifies the starting memory location of that segment. In addition to the structural data, each segment may also contain graphics primitives and attributes of those primitives. A graphics primitive is typically a simple planar object such as a polygon or a vector defined by a list of coordinates in a convenient three dimensional coordinate system for that particular graphics primitive. The attributes data for a graphics primitive might define the color or other characteristics of the primitive, and also includes a transformation matrix which specifies the spatial position and orientation of the graphics primitive of the segment with respect to the coordinate system of the parent segment. A feature of a hierarchical graphics data base is that attribute information if not different from the parent segment, need not be defined in the child segment but can instead be "inherited" from the parent segment.

A graphics processor, in response to commands from the host computer, can create, copy or delete segments of the hierarchical data base which is typically stored in a separate memory of the graphics processor. The graphics processor further can delete, add or modify various graphics data such as the attributes, graphics primitives and transformation matrix within each segment in response to host level commands. Once the hierarchical data base has been completed, the processor reads and processes the graphics data base, producing images on the display screen of the objects represented by the graphics data base, as viewed through a "viewport" defined by the host computer. In reading the graphics data base, the graphics processor "traverses" the data base by reading data at one segment of the data base and then moving to a relative (either parent, child or sibling) segment identified by the segment pointers, in accordance with a traversal algorithm. In this manner, the graphics processor traverses the tree until the display list has been processed.

Sophisticated graphics processors can perform a number of processing functions on the graphics data of the segments. One important function is to test the graphics primitives of the segment to determine whether the primitives are within the field of view defined by the viewport. If not, the segment and its children can be ignored for purposes of further processing.

Additional graphics data processing includes concatenation of transformation matrices to produce a transformation matrix for each segment which can transform the graphics primitive coordinate set of the segment into the coordinate set of the viewport segment at the "top" of the tree. Also, the graphics processor can "clip" partially visible graphics primitives so that those portions of any primitives extending outside the field of view are not processed.

Graphics primitives which are defined in three dimensions are typically projected from the three dimensions to a two dimensional image plane of the display. Two principal projection techniques are parallel and perspective. Parallel projection can be performed by simply ignoring the third coordinate (depth) of the three dimensional coordinate set. Alternatively, perspective projection can be performed by dividing the components of the first two coordinates by the third component to give the effect of a diminishment in size for those primitives which are farther from the viewer.

Once the graphics primitives have been clipped and projected, the graphics processor converts the coordinates to the "hardware coordinates" used to display the primitives on the display screen. From the hardware coordinates, the primitives are "rasterized" which converts the hardware coordinates of the primitives into collections of pixels. Rearward facing polygon primitives are removed from further processing by the processor.

In addition, visible surfaces may be "shaded" utilizing a variety of techniques. One technique is to simply use the color attribute defined in the segment of each primitive. A second shading technique utilizes the depth of each pixel to compute an attenuation factor for the pixel. For example, primitives which are close to the viewer might be displayed at the color specified in the segment attributes. The further a primitive lies from a viewer, the darker the shade of the attribute color selected. Such a shading technique is often referred to as "depth cueing". A third type of shading is done by modeling a light source and calculating a shading intensity based on simple optical laws. When performed on a per primitive basis, this technique is often referred to as "flat shading". Performed on a per pixel basis, the technique is referred to as "smooth shading" and "Gouraud shading".

It can be appreciated from the above that an extensive amount of computation is often required to process and display a graphics primitive of a segment. Complex models can encompass a data base of thousands of segments. As a result, a graphics processor can require a significant amount of time to convert the data base to an image on the screen.

To enhance the speed at which an image may be generated, many graphics processors utilize in addition to a main CPU, one or more specially designed coprocessors often referred to as "geometry processors", to perform many of the arithmetic operations required for culling, clipping, transformation of matrices, etc. However, for many such prior graphics processors, it may still require as long as 20 seconds for large data bases to update the images on the screen once the data in the graphics data base has been changed. In many applications such a delay can seriously hamper the effectiveness of the graphics processor. For example, in computer-aided design systems, waiting 20 seconds for the display to update once a change has been input can be quite annoying and an inefficient use of the designer's time. For other applications in which changes in the data need to be displayed on more of a real time basis, a slow responding graphics processor may be entirely unusable. Thus, it is seen that a significant improvement in graphics processing speed is needed.

SUMMARY OF THE INVENTION

It is an object of the present invention to provide an improved graphics processing system in which the database processing rate is significantly improved.

These and other objects and advantages are achieved in a graphics processor having a unique architecture which facilitates the traversal of the graphics data base. In the illustrated embodiment, the graphics processor includes a first processor for creating and maintaining a graphics data base in response to commands from a host computer In accordance with the present invention, once initiated by the first processor, a second processor independently traverses the data base, rapidly reading the segments of graphics data at a rate optimized for geometry processing. To further facilitate the traversal of the data base, the graphics processor has a streamlined private data path for traversal read operations only. The private data path couples the graphics processor memory to the second processor which may include a separate geometry processor. Such an arrangement has been found to markedly increase the rate at which graphics data may be read and processed from the graphics data base.

In another aspect of the present invention, the second processor comprises address generator logic herein referred to as a "tree traverser" which rapidly addresses the graphics processor memory, providing a stream of graphics data over the private data path to a geometry processor. The geometry processor culls the data and stores the attribute data of "potentially visible" segments only over a stack bus linking the geometry processor to a stack memory resident on the tree traverser. Once the last segment of a traversal path has been reached, the tree traverser reverses direction, retracing visible segments of the path. During the reverse traversal, the attribute data of the visible segments is transferred from the tree traverser stack over the stack bus to the geometry processor. In addition, the tree traverser addresses the graphics primitives of the potentially visible segments and transfers the graphics primitives over the private data path to the geometry processor for further processing. Such an arrangement has been found to significantly increase the utilization rate of a geometry processor and the data processing rate of the system as a whole. As a result, images on the screen can be updated at a much faster rate in response to modifications to the graphics data base.

BRIEF DESCRIPTION OF THE DRAWINGS

FIG. 4 is a schematic diagram of a segment control block of the data base of FIG. 2;

FIG. 5 is a schematic diagram of an instance control block of the data base of FIG. 2;

FIG. 6 is a schematic diagram of an invocation control block of the data base of FIG. 2;

FIG. 7 is a schematic diagram of a culling buffer or data buffer packet of the data base of FIG. 2;

FIG. 9 is a schematic diagram of the data format of the stack of the tree traverser of the graphics processor of FIG. 1;

FIGS. 15A-15C are schematic diagrams for logic circuitry to implement the control logic circuits of the display list memory interface of FIG. 14;

FIG. 17 is a timing diagram illustrating a typical display list memory read operation by the tree traverser of FIG. 13;

FIG. 18 is a more detailed schematic diagram of the stack controller circuit of the tree traverser of FIG. 13;

FIG. 21 is a timing diagram illustrating the timing relationship for various address and control signals of register files during a stack transfer operation;

FIGS. 22A and 22B are timing diagrams illustrating write and read operations, respectively, of the stack memory of FIG. 18;

FIG. 25 is a schematic diagram illustrating the contents of the registers of the arithmetic logic unit;

FIG. 27 is a schematic diagram illustrating the contents of the display list memory register file of FIG. 26;

FIG. 28 is a schematic diagram illustrating the logic circuits of the address control logic of FIG. 26;

FIG. 33 illustrates logic circuitry for implementing the external slave cycle state machine of the sync and control logic of FIG. 29B;

FIG. 34 illustrates the format of instructions received by the tree traverser from the system bus;

FIG. 35 illustrates input logic circuitry for the state machine of the sync and control logic of FIG. 29B;

DETAILED DESCRIPTION OF THE DRAWINGS

Figure 1:
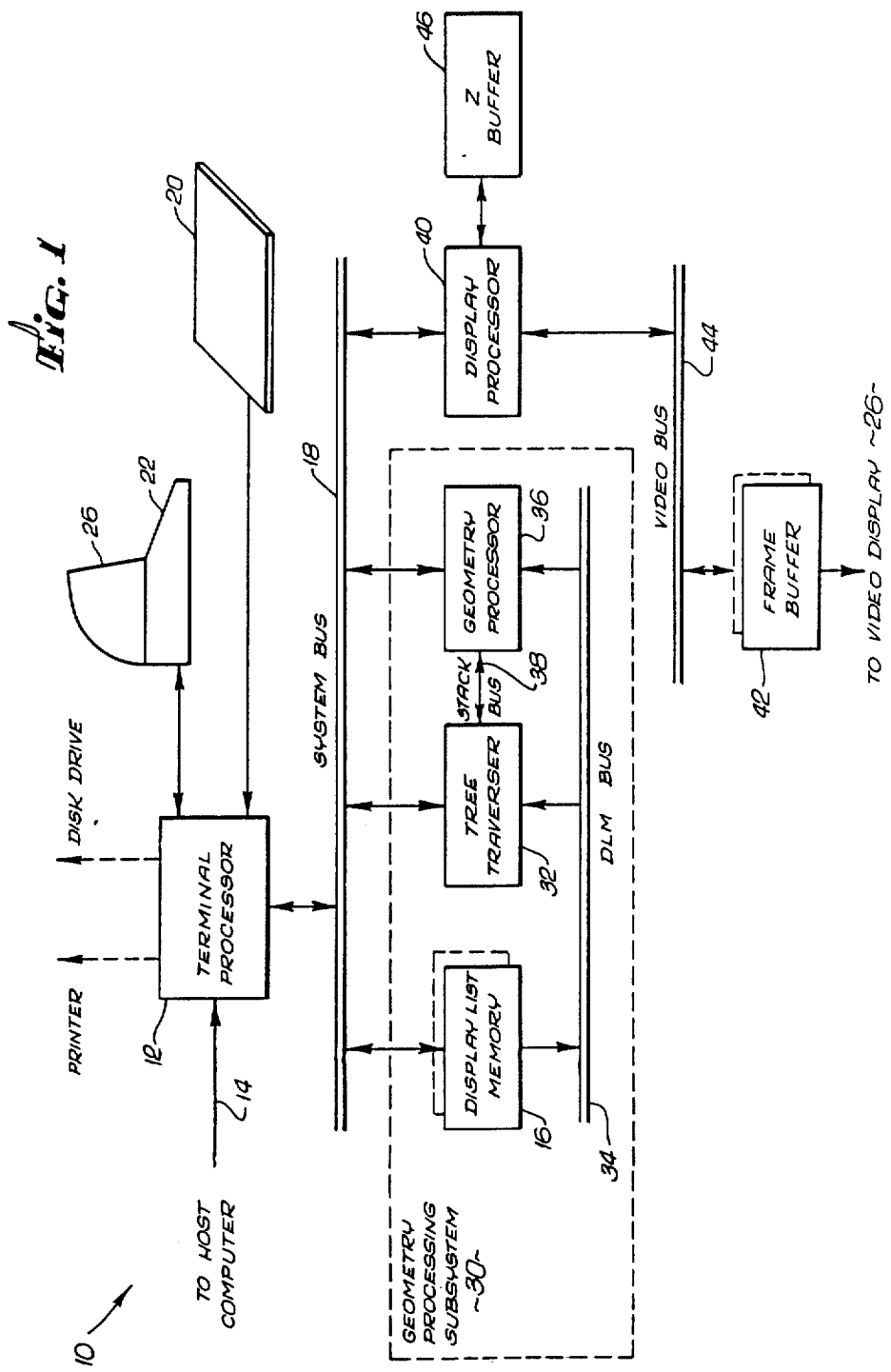
FIG. 1 is a schematic diagram of a graphics processor in accordance with a preferred embodiment of the present invention.

Referring now to FIG. 1, a graphics processing system (hereinafter referred to as the "graphics processor") in accordance with a preferred embodiment of the present invention is indicated generally at 10. The graphics processor 10 includes a first processor 12 which is designated a "terminal processor". The terminal processor 12 executes host level commands received from a host computer (not shown) through a host interface 14. A majority of the host level commands are directed to building and managing a graphics data base in the form of a hierarchical display list which is stored in a memory 16. The terminal processor 12 communicates with the display list memory 16 over a general purpose system bus 18 which, in the illustrated embodiment, is a standard 32 bit "VMEbus". The specifications for the VMEbus standard may be found in the *VBEbus Specification Manual, Rev. B,* August 1982, VMEbus Manufacturers Group.

The host level commands are sent by a host application program resident on the host computer. The user of the host application program can also input data directly into the graphics processor using a variety of graphics input devices such as a graphics tablet 20 and an alpha/numeric keyboard 22. Other input devices such as joysticks, mice, dial boxes and track balls (not shown) may also be used. The input from these devices can be utilized to issue graphics commands to modify the data base, change viewing parameters and pan or zoom the graphics display provided by a display 26. In this manner, applications such as computer-aided design may have interactive local control of the display.

In accordance with the present invention, a second processor is provided for rapidly reading the hierarchical display list stored in the memory 16. The second processor includes a geometry processing subsystem 30 comprising address generating logic 32 for addressing the display list memory. The address generating logic herein referred to as the "tree traverser" 32, traverses from segment to segment of the hierarchical display list, sequentially addressing data of each segment. This traversal converts the tree structure of the display list into a stream of data over a private data path designated the display list memory (DLM) bus 34. The DLM bus 34 directs the stream of data to the tree traverser 32, and to a geometry processor 36 which performs the processing functions of culling, clipping, projecting and transformation matrix concatenation.

Previously, many graphics processors utilized a single, programmed CPU to perform the functions of creation and maintenance of the data base as well as the traversal of the data base to read the graphics data for processing. In contrast, it has been found that the architecture of the present invention allows the data base traversal rate to be significantly improved. In one aspect, the tree traverser 32 can rapidly generate the appropriate addresses for traversal of the data base. Moreover, the DLM bus 34 provides a private, unidirectional data path from the display list memory 16 to the tree traverser 32 and geometry processor 36 such that the DLM bus 34 can accommodate extremely high data transfer rates.

In still another aspect of the present invention, a bidirectional data path referred to as the stack bus 38 couples the geometry processor 36 directly to the tree traverser 32. As will be explained in greater detail below, the geometry processor 36 does not completely process each graphics primitive before proceeding to the next primitive. Instead, the geometry processor 36 transfers graphics data such as color attributes (see FIG. 9) directly to the tree traverser over the stack bus 38 if during the culling process, the geometry processor 36 determines that the associated graphics primitives are potentially visible. The tree traverser 32 stores the graphics data from the geometry processor on a stack memory on a first-in, last-out basis. Once the tree traverser reaches the last segment of a traversal, the tree traverser reverses direction, backtracking the potentially "visible" segments, that is, the segments having potentially visible graphics primitives.

As the tree traverser 32 retraces the traversal path from segment to segment, the tree traverser transfers the graphics data stored in the stack memory back to the geometry processor 36 over the stack bus 38. At the same time, the tree traverser 32 addresses additional graphics data stored in the display list memory which, in the illustrated embodiment, are the graphics primitives themselves. The graphics primitives are transferred to the geometry processor 36 over the DLM bus 34. The geometry processor 36 utilizes the data from the tree traverser stack memory and the display list memory 16 to continue the processing of the data for display. In the illustrated embodiment, the geometry processor clips and projects the graphics primitives of a segment and performs a portion of the appropriate shading calculations. Once completed, the geometry processor passes the graphics primitives along with inherited attributes (in the format of an "edge packet") across the system bus 18 to a display processor 40. The geometry processor 36 is described in greater detail in a pending application entitled "Geometry Processor For Graphics Display System", Ser. No. 838,300 filed Mar. 7, 1986 now U.S. Pat. No. 4,862,392, by Walter R. Steiner and assigned to the assignee of the present application.

The display processor 40 performs rasterization, hidden surface removal and the remainder of the shading calculations. To rasterize a polygon graphics primitive, the primitive is divided into a series of line segments called "spans" which correspond to the raster lines of the CRT display 26. The spans are in turn subdivided into picture elements (or "pixels") which correspond to the pixels of the display 26. Shading is calculated for polygon primitives on an incremental basis along each span. Vector primitives are generally not shaded.

To illuminate a pixel, the color and intensity values calculated during the shading process for that pixel are transferred to a frame buffer 42 over a video bus 44. The frame buffer 42 has a memory location for each pixel of the video display 26. Before the pixel information is transferred to the associated memory location of the frame buffer 42, a "Z buffer" algorithm is used to perform hidden surface elimination. As a primitive is rasterized into pixels, the depth value for each such pixel is calculated. This depth value is compared to a depth value stored in a "Z buffer" 46. The Z buffer 46 has a memory location for storing a depth value for each pixel of the video display. The Z buffer stores the least depth value (that is the pixel closest to the viewer) of each pixel calculated for a particular screen pixel location. If the depth value stored in the Z buffer is less than the depth value of the new pixel, the new pixel is behind the old pixel (and therefore invisible) and the new pixel is ignored. On the other hand, if the depth value of the new pixel is less than the depth value stored in the Z buffer, the new pixel is in front of the old pixel and the calculated pixel color and intensity values are transferred to the frame buffer 42, replacing the old pixel values. Furthermore, the new pixel's depth value is stored in the appropriate memory location of the Z buffer 46. The pixel information is read from the frame buffer in synchronization with the CRT raster scan to produce the images on the video display 26. The display processor 40, frame buffer 42 and Z buffer 46 are described in greater detail in a pending application "Display Processor For Graphics Display System" Ser. No. 832,518, filed Feb. 21, 1986, now abandoned by William A. Kelly, David E. Orton and Gregory M. Stock and assigned to the assignee of the present application.

Figure 2:
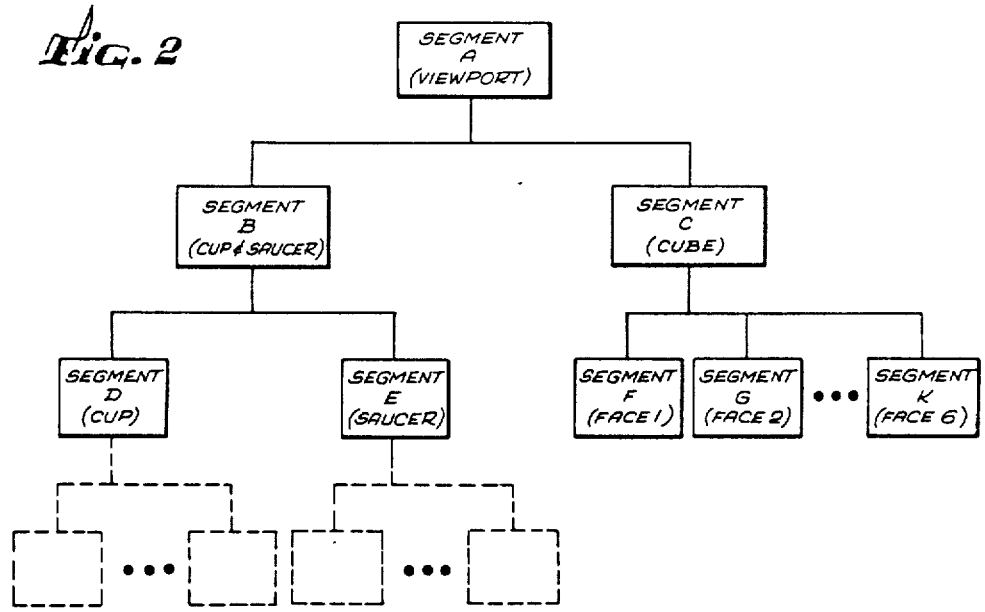
FIG. 2 is a schematic diagram of an example of a hierarchical data base.
Figure 3:
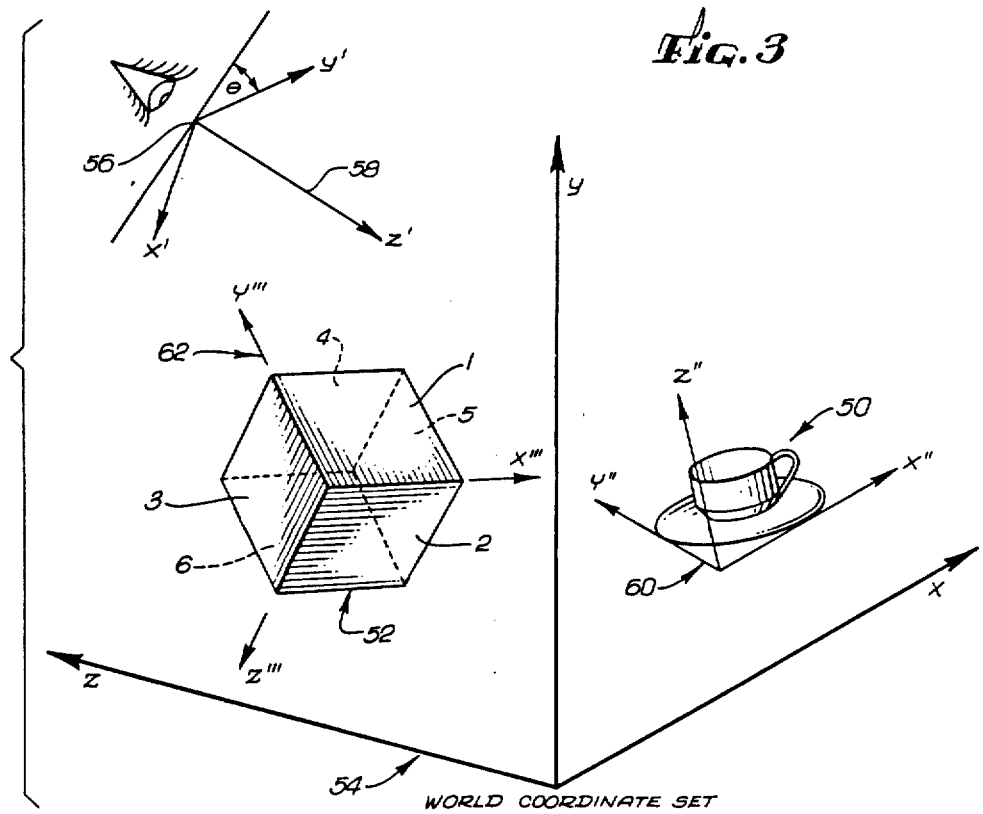
FIG. 3 illustrates two examples of objects represented by a graphics data base with associated coordinate systems.

In order to better understand the operation and design of the graphics processor 10, a simplified example of a tree-type hierarchical display list is illustrated in FIG. 2. The display list of FIG. 2 represents and describes the objects shown in FIG. 3, which include a cup and saucer 50 and a cube 52. These simple objects have been selected for purposes of illustration only. In actual practice, the objects which can be modeled may be significantly more complicated.

The cube 52 can be thought of as a collection of six faces 1–6, where each face is represented by a four-sided polygon described as having a particular color, shading and spatial relationship to the cube considered as a whole. In this manner, complex objects can be modeled by breaking the object up into simple shapes (graphics primitives) which have attribute information associated therewith.

The basic element in the display list of FIG. 2 is the segment. Each segment can have graphics primitives (such as polygons, vectors, etc.), attributes (such as polygon color, a transformation matrix, etc.) and structural information (such as pointers to related segments). Such segments are also referred to as "nodes".

The root or top segment A of FIG. 2 is the "viewport" segment which defines the vantage angle at which the objects are viewed and the volume of space visible to the viewer. This segment has associated therewith a reference coordinate set designated a "world" coordinate set and represented by the three orthogonal axes 54 in FIG. 3. The spatial relationship between the cup and saucer 50 and the cube 52 are defined in terms of their world coordinates. The vantage angle at which these objects are to be viewed is specified by a line of sight which is defined by an eye point 56 and a sight point 58. The viewing volume is defined by six "clipping planes" which typically form a frustrum.

The eye and sight points (specified in world coordinates) together with a roll angle $\theta$ define a second coordinate set, the "eye" coordinate set. The origin of the eye coordinate set is located at the eye point 56 with the Z axis extending along the line of sight in the direction of the sight point 58. The roll angle $\theta$ defines the angle of rotation of the X and Y axes about the Z axis. In this manner, the eye coordinate set identifies the vantage angle at which the objects are to be viewed.

A related coordinate set is the eye-scaled coordinate set in which the X and Y coordinates of the eye coordinate set are scaled to simplify the clipping process. The viewport segment A has a transformation matrix to transform coordinates in the world coordinate set to coordinates in the eye coordinate set and a second viewport matrix to convert the eye coordinates to coordinates in the eye-scaled coordinate set.

Below the viewport segment A of FIG. 2 is a second segment of the display list, designated segment B. Segment B is a child segment of the parent segment A and represents the cup and saucer 50 considered as a whole. Associated with the cup and saucer 50 is a "model" coordinate set 60 which is defined by placing the origin of the model coordinate set at a convenient location such as at one vertex of a polygon of the cup and saucer and aligning the axes with respect to some of the primitive data. All of the primitive data within one segment is referenced to its associated model coordinate set. Segment B has a transformation matrix which transform points in the segment B model coordinate set to the coordinate set of the parent segment A which is the world coordinate set.

Segment B also has pointers to one of its child segments, segment D, and to its sibling segment, segment C, which represents the cube 52. Segment C like segment B, is also a child segment of the parent segment A, and has its own model coordinate set 62 having an origin placed at one of the vertices of the cube 60 and three axes aligned with edges of the cube. Segment C in turn has six child segments F-K for the six cube faces 1–6, respectively. The segments F-K are quite similar. Segment F, for example, has a pointer to the parent segment C, the sibling segment G and to a child segment (if any). Segment F has its own model coordinate system in which the four vertices of the polygon defining face 1 are specified. This four-sided polygon is the graphics primitive of segment F. Segment F further defines the color and other attributes of the graphics primitive.

Each segment of the display list is formatted into a number of buffers which contain the graphics data, and a control block which has pointers pointing to the memory locations at which the buffers are located. FIG. 4 illustrates an example of a typical segment control block. Word 0 is the sibling pointer which points to the next sibling of the segment. The viewport segment A of the display list of FIG. 2 does not have a sibling and therefore word 0 of the segment A control block is set to null. Segment B does have a sibling and therefore word 0 of the segment B control block specifies the starting address of the segment C control block.

Word 1 defines a child pointer which points to the first child segment of the segment. Thus, for example, word 1 of the segment A control block points to segment B, the first child segment of segment A. Word 8 is the pointer to the segment's parent.

The segment control block location designated word 3 contains a pointer to the segment's culling buffer which stores the attributes of the graphics primitives. Among these attributes is a "bounding box" which is used by the geometry processor 36 in the culling process. The bounding box is a set of eight coordinate points which defines a volume that completely contains all of the graphics primitives for a segment and all of the graphics primitives of the children segments. The bounding box allows the geometry processor 36 and the tree traverser 32 to quickly cull out segments that are completely outside the field of view.

Each time the terminal processor 12 enters new graphics data for a segment or alters a transformation matrix, the terminal processor 12 updates the bounding boxes for the entire display list. For example, if a new polygon is entered at one segment, this may increase the size of the bounding box for that segment. If the segment bounding box increases, it may be necessary to increase the size of the bounding box of the parent to ensure that the parent bounding box includes the new bounding box of the child segment. Thus, changes in one segment may ripple up the display list tree until a segment is reached which is not affected by the change. Bit 24 of the flag word of word 2, is set when the segment has been modified, indicating that the bounding boxes for this segment's parent chain may also have to be updated.

Besides the bounding box, the culling buffer also contains the attribute data which defines certain characteristics of the graphics primitives. If a particular characteristic is not defined in the culling buffer of a segment, the definition of that characteristic is inherited from the parent segment. For example, if segment C defines its associated graphics primitives (if any) as having the color red, any of its children, the face segments F-K, which do not locally define the graphics primitive color will inherit the graphics primitive color of red. This inheritance is done dynamically during the traversal process as will be explained in greater detail below.

The culling buffer also contains the transformation matrix for transforming the local (model) coordinate set of the segment to the coordinate set of its parent segment. Light source information may also be stored in the culling buffer of a viewport segment.

Word 4 of the segment control block defines a pointer to the data buffer which includes the primitive data. The graphics primitives are defined in terms of the local model coordinate set of the segment. The name of the segment is defined in word 5.

The display list structure used by the graphics processor 10 allows the "instantiation" of segments. That is, a single segment once created, may be referenced any number of times by other segments in the display list structure. For example, a single segment defining a cube face might be invoked by each of the segments F-K of FIG. 2 rather than duplicating this information for each child of segment C. Each reference to the segment can alter the attributes of the instanced segment since attributes may be inherited during traversal. Thus, each segment F-K would have a different transformation matrix to position the instantiated face in the correct location to form the cube 60.

Two special segment structures are used for instantiation. An "instance" segment is the segment that is capable of being instantiated. Ordinary segments such as the segment represented by the control block of FIG. 4 are not instantiated. The instance segment is created separately from the display list tree. An instance segment may have children however, such that it itself can be the top segment of a subtree.

The control block for an instance segment is shown in FIG. 5 to be only slightly different from the normal control block shown in FIG. 4. Since the instance segment may be referenced multiple times, it has no single parent. Accordingly, the parent pointer of word 8 has been replaced by an "owner" pointer which points to the first segment that calls the instance segment. Also, since an instance segment has no siblings, the sibling pointer of word 0 is null.

Once an instance segment has been created, it can be tied into the display list each time it is called or referenced. Referencing is done with an instance invocation segment, the control block for which is shown in FIG. 6. The invocation segment is part of the main display list tree, and serves as the link between the main tree and the instantiated segment. When the tree is traversed, the instantiated segment can inherit attributes through the invocation segment. If, for example, instantiation is used to represent the faces of the cube 60, each of the segments F-K of FIG. 2 would be an instance invocation segment.

An invocation segment is typically used only to tie an instance segment into the display list tree. Therefore, there is no data associated with an invocation segment. Word 4 used as a data buffer pointer in the segment control blocks of FIGS. 4 and 5 is instead used as a partner pointer to point to the next invocation segment which invokes the same instance. Word 1 is used to point to the instance segment.

It is seen from the above that the control blocks of a normal segment, an instance segment and an invocation segment are very similar. These control blocks are referred generally hereinafter as "object header blocks". Bits 20, 19 and 18, respectively, of the flag word (word 2) indicate when set the particular object header block type.

Word 9 of the control blocks of FIGS. 4 and 5 contains the pointer to the last packet of data in the segment data buffer. In the illustrated embodiment, all quantities in the display list (including control blocks) are stored in fixed length packets of either 16 words or 32 words, wherein each word is 32 bits. These fixed length packets ease memory access, memory allocation and deallocation tasks.

FIG. 7 illustrates a typical packet of the culling buffer or data buffer. Padding words are used as necessary to fill out the packet to 16 or 32 words. Quantities that ordinarily would be longer than 32 words (such as many primitive data types) are broken up into 16 (or 32) word packets, and linked together via "next packet" pointers. The "last data buffer packet" pointer of the control block eliminates the need for traversing the entire linked list to find the last buffer packet in order to append segment data.

The above-described segments form a hierarchical display list which is created and stored in the display list memory 16 by the terminal processor 12 in a conventional manner. The terminal processor 12 accesses the memory 16 via the system bus 18. Once the display list has been stored in the memory, the display list may be traversed and processed to produce the desired images of the stored object representations.

Figure 8:
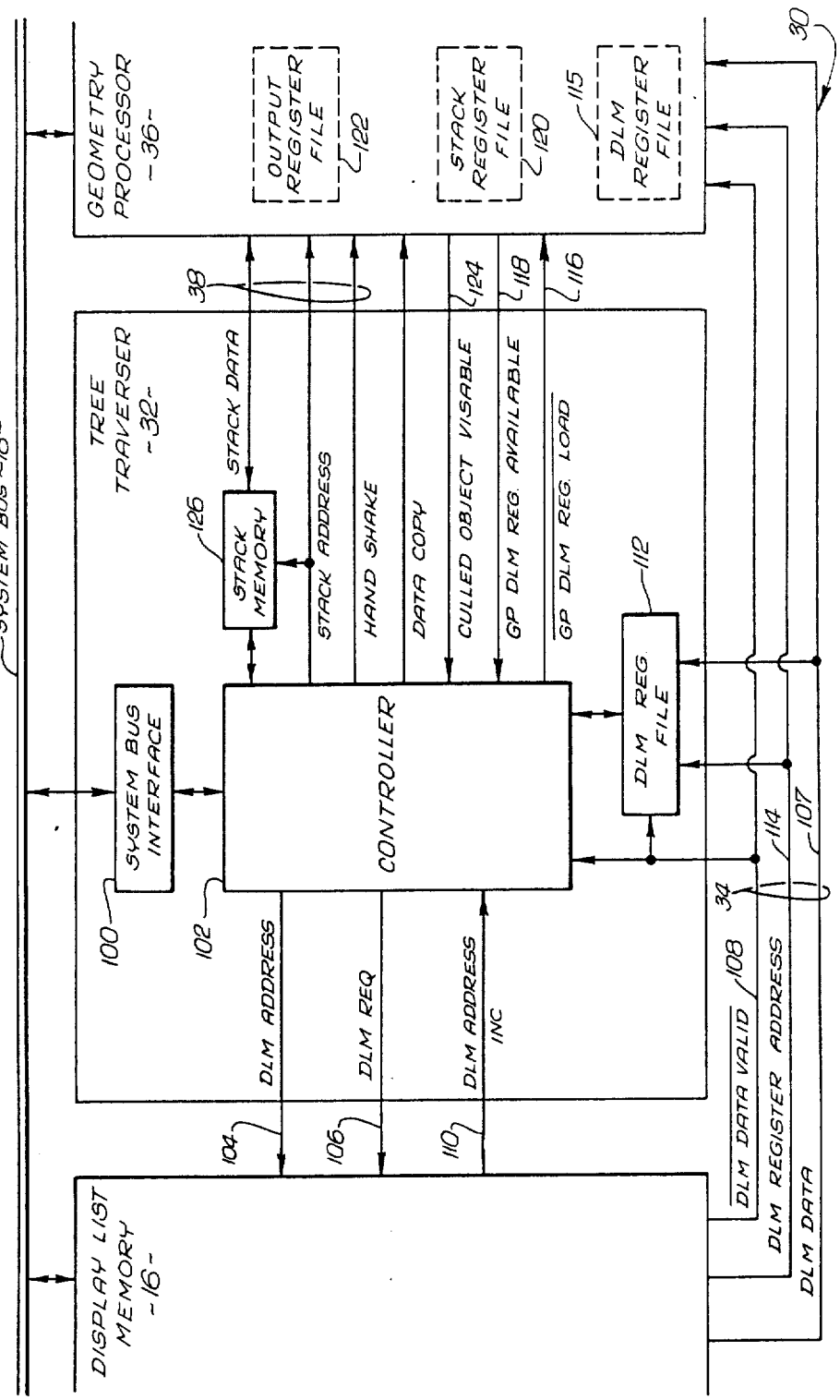
FIG. 8 is a schematic diagram of the geometry processing subsystem of the graphics processor of FIG. 1.

FIG. 8 shows in greater detail the geometry processing subsystem 30 which performs the traversal and two basic subprocesses of the overall graphics data processing. The first subprocess is the "culling" process which primarily determines whether or not the object of a segment is within the selected field of view. As previously mentioned, each segment has an associated bounding box which completely encloses the graphics primitives of the segment and all graphics primitives of the segment's children. The geometry processor 36 performs a test to determine the position of the bounding box relative to the viewing volume defined by the six clipping planes. If the segment bounding box is found to be wholly outside the viewing volume, all graphics primitives of the segment are invisible, and the segment is "culled" out. That is, the segment and all of the children of the segment are ignored and are not further processed. If the bounding box is determined to be completely or partially inside the viewing volume, the graphics primitives of the segment are potentially visible. Another test which can be performed during the culling process is based upon the projected size of the bounding box. If the projected screen size of a segment bounding box is smaller (or larger) than a predetermined number of pixels, that segment (and its children) can also be ignored.

If the bounding box intersects one or more of the clipping planes, clipping of those graphics primitives intersecting the clipping planes will be subsequently performed in the second subprocess. Clipping removes those portions of the primitives extending beyond the clipping planes from further processing.

The second basic subprocess performed by the geometry processor 36 is face processing in which graphics primitives determined to be visible (or potentially visible) during the culling process, are clipped as necessary and the primitive coordinates are projected from three dimensional coordinates to two dimensional coordinates. Also, shading calculations are performed and the clipped and projected primitives are formated into edge data packets for transmission to the display processor 40 for further processing.

To initiate the traversal and processing of the data base of the display list memory 16, the terminal processor 12 sends a "START TRAVERSE" instruction to the tree traverser 32, which specifies the starting address of the viewport segment of the display list tree. The starting address is the address of the viewport segment control block containing pointers to the culling and data buffers of the viewport segment as described above.

The terminal processor 12 transmits the START TRAVERSE instruction over the system bus 18 to a controller 102 coupled to the system bus 18 by a system bus interface 100 of the tree traverser 32. The system bus interface 100 comprises appropriate address and data buffers and control logic for governing access to the system bus 18 which, in the illustrated embodiment, is a standard VMEbus.

The controller 102 of the tree traverser 32 traverses the display list in the display list memory 16, addressing the linked packets in sequence in accordance with the traversal algorithm, and coordinates the sending of the display list data to the geometry processor 36. The controller 102 of the illustrated embodiment is implemented as a programmable bit slice controller as described in greater detail below. Alternatively, the controller 102 may be implemented with a dedicated hardware state machine or a microprocessor, and appropriate peripheral integrated circuit chips.

The tree traverser 32 can traverse the display list without further instruction from the terminal processor 12. The controller 102 places the address of word 0 of the viewport segment control block (FIG. 4) obtained from the terminal processor 12 on a DLM ADDRESS bus 104 to the display list memory 16. The controller 102 then signals the display list memory 16 on a DLM REQUEST line 106 that a memory read operation is requested and that the address on the DLM ADDRESS bus 104 is valid. In response, the display list memory 16 reads the DLM address and signals the controller 102 to increment the DLM address by means of a DLM ADDRESS INCREMENT signal line 110 to the controller 102. In the illustrated embodiment, the display list memory 16 is a 4-way interleaved memory. As explained in greater detail below, the memory 16 can accept four addresses sequentially and conduct four overlapping read operations to increase the rate at which the graphics data may be read from the memory. After the initial four addresses have been read, the display list memory 16 places word 0 (containing the sibling pointer) of the segment control block on a private data path or bus 107 of the DLM bus 34 to the tree traverser 32, signalling that the data is valid on a DATA VALID line 108. The display list memory 16 then reads the next address in sequence (the address of word 4) and outputs the next word-in-sequence (word 1).

The graphic data from the memory 16 is stored in a multiport register file 112 of the tree traverser 32 at a register address supplied by the display list memory 16 on a REGISTER ADDRESS bus 114 to the register file 112. The controller 102 continues to increment the DLM addresses and the display list memory 16 continues to output the words stored at those memory locations until all 16 words of the segment control block are stored in the DLM register file 112. Meanwhile, the controller 102 examines word 3 of the segment control block (FIG. 4) to identify the starting address of the first culling packet of the viewport segment culling buffer. In this manner, the controller 102 is ready to transmit the starting address of the first culling buffer packet as soon as the last word of the segment control block has been addressed.

The first culling packet of 16 (or 32 words) is sent to the tree traverser register file 112 and to a similar register file 115 in the geometry processor 36 to initiate the culling process of the viewport segment A. The controller 102 examines the "next packet" pointer in word 0 (FIG. 7) of the first culling packet to determine the starting address of the next packet of the culling buffer. The tree traverser 32 also examines the "byte count" of word 1. If a thirtytwo word packet is indicated, the tree traverser increases the number of words to be transferred from sixteen to thirty-two. Once the first packet has been loaded into the geometry processor DLM register 115, this fact is communicated to the geometry processor 36 by the controller 102 via a GP DLM REGISTER LOAD signal line 116. The geometry processor 36 then begins processing the data in the culling packet and subsequently indicates that the geometry processor DLM register file 115 is available via a control signal line 118. In response the controller 102 transfers the next culling packet to the geometry processor 16.

The DLM bus 34 transfers addresses and data from a single source, the display list memory 16, and in only one direction, that is, to the tree traverser 32 and geometry processor 36. Consequently, the DLM bus has no bus arbitration or handshake delay and therefore can accomodate extremely high data transfer rates. In the illustrated embodiment, the DLM bus 34 can transfer 40 megabytes of data per second as compared to 6 megabytes per second for the VMEbus 18.

The tree traverser 32 sends the culling buffer packets one at a time from the memory 16 to the geometry processor 36 via the DLM data bus 107. As shown in FIG. 7, each culling and data primitive packet has an opcode (bits 8-15 of word 1) which indicates to the geometry processor 36 the particular processing required for the data of the packet. The geometry processor reads and decodes the opcode for each packet, and performs the appropriate operation. The processing operations of the geometry processor 36 are discussed briefly below, and are discussed in greater detail in the aforementioned copending "Electronic Geometry Processing System" application.

In the illustrated embodiment, the culling buffers contain up to five different types of culling packets, each packet having its own opcode. Two of these packets are typically placed only in the root (or viewpoint) segment culling buffer.

The first packet of the culling buffer sent to the geometry processor contains the segment attributes. Those segment attributes which are not locally defined in the segment attribute packet may be "inherited" by obtaining the segment attributes from the parent attributes which have been previously stored in a stack register file 120. The geometry processor 36 stores a set of attributes (either locally defined or inherited) in an output register file 122 for later transfer to the tree traverser 32 over the stack bus 38 if the segment is determined to be visible during the culling processing of the segment. Since the viewport segment A does not have a parent segment, all attributes stored in the output register file 122 for the segment A were locally defined in the attribute packet of the segment A culling buffer.

The culling buffer of each segment also usually has a transformation matrix packet. The transformation packet contains a local transformation matrix which transforms the segment data from the local (model) coordinate set into the coordinate set of the parent segment. In the case of the viewport segment, the local transformation matrix transforms the world coordinate set to the eye coordinate set of that viewport.

The geometry processor 36 performs a matrix concatenation which multiplies the local matrix by the previously concatenated matrix of the parent segment which transforms the coordinate set of the parent segment into the coordinate set at the top of the display list tree, that is, the coordinate set of the viewport segment. The resulting concatenated matrix is a transformation matrix that transforms the graphics data of the segment into the coordinate set of the viewport segment. This concatenated matrix is stored in the output register file for transfer to the tree traverser 32 should the graphics primitives of the segment be determined to be visible.

One culling buffer packet typically found only at the viewport segment is the "viewport" packet. This packet defines the viewport providing the projection terms (such as the field of view, orthographic projection size, clipping plane definitions, etc.), screen scaling terms (such as the size of the final image on the CRT display 26) and appropriate flag bits. The projection terms are typically stored in a four by three matrix. When the viewport packet is received by the geometry processor 36, the geometry processor stores the input viewport scaling matrix in the stack register file 120 and stores the input scaling terms and flag bits in the output register file 122. In addition, a viewport definition packet is transmitted from the output register file 122 to the display processor 40 over the system bus 18.

An additional packet present only in the viewport segment is the "light source" packet. A light source defined in terms of the world coordinate set, is rotated into the eye-scaled coordinate set by multiplying the light source coordinates by the current transformation matrix stored in the output register file 122, and the results are saved.

The last culling buffer packet sent to the geometry processor 36 by the tree traverser 32 is the bounding box packet. When received, the geometry processor 36 commences the visibility test if the bounding box of the parent segment was not totally visible. As previously mentioned, the bounding box of a segment completely encloses the graphics primitives of the segment and all child segments of the segment. The use of such a bounding box simplifies the visibility test.

If the bounding box defined by the bounding box packet is determined to be within the field of view defined by the viewport packet, and the size of the box is determined to be within a user defined interval (i.e., the object is not too large or too small), the geometry processor 36 activates the CULLED OBJECT VISIBLE signal line 124 to the tree traverser 32, indicating that the object within the bounding box is potentially visible. Note, since the segment bounding box encloses the objects or graphics primitives of the child segments, the visibility test need not be repeated for the child segments of a segment for which the segment bounding box is determined to be wholly visible. If on the other hand, the bounding box is entirely outside the field of view or the size of the box is not within the defined interval, the CULLED OBJECT VISIBLE signal line is reset. This latter "invisible" segment and all its child segments need not be further processed.

While the geometry processor 36 is processing the culling packets, the tree traverser 32 stores the header block pointer, the child pointer (word 1) of the header block of FIG. 4 and a "tree level" indicator for the segment in a stack memory 126 as shown in FIG. 9. The "tree level" is the level of the segment within the heirarchical structure and is calculated by the controller 102. Thus, for example, sibling segments have the same tree level. The tree level for a child segment is incremented by one from the tree level of the parent segment.

If the segment object is determined to be visible by the geometry processor 36, the tree traverser 32 copies the flag word, concatenated transformation matrix and the attributes of the object from the geometry processor output register file 122 to the stack memory 126 over the stack bus 38. This information is copied to stack locations immediately above the tree traverser supplied data as shown in FIG. 9.

If the culled segment is a child segment of the prior culled segment, the information is also copied to the stack register file 120 to make it available to be inherited. A "data copy" output 127 to the geometry processor 36 effectuates this copy.

If the object of the segment being culled is determined to be invisible, the tree traverser 32 supplies a memory loaded signal (one of the handshake signal lines 128) to the geometry processor 36 without transferring the data to avoid a transfer of useless data. Thus the attributes for invisible objects are not stored on the stack 126. As will be discussed in greater detail below, the graphics data which is stored on the stack memory 126 for each segment determined to have visible objects, will be subsequently retransferred back to the geometry processor over the stack bus 38 as the associated graphics primitives are transferred from the display list memory 16 to the geometry processor 36. Since the attributes for invisible objects are not stored on the stack memory 126, those segments are not further processed.

After the culling buffer of a segment has been processed, the tree traverser proceeds to another segment of the display list. In the illustrated embodiment, the tree traverser uses a sibling preferred method in which the traverser will process the sibling of a segment before processing the child of the segment. If a segment has no siblings, the tree traverser will then process the first child of the segment. For example, referring to FIG. 2, the viewpoint segment A does not have any sibling segments. Accordingly, after the segment A culling buffer data has been processed, the tree traverser will traverse to the first child segment, segment B. After transmitting the segment B culling buffer packets to the geometry processor 36 for processing, the tree traverser will proceed to the sibling segment, segment C, and will commence to forward the culling buffer packets of segment C to the geometry processor 36. Segment C not having any additional sibling segments, the tree traverser will then proceed to the first child segment, segment F, if the parent segment C bounding box containing the cube 52 is determined to be visible. The tree traverser 32 will continue traversing in this manner sending the culling buffer packets of the sibling segments F-K in order.

If a segment does not have any further sibling segments, and does not have a child segment (or the segment bounding box is invisible), the tree traverser 32 will begin to backtrack. For example, all the sibling segments of segment K have been traversed once the tree traverser 32 reaches segment K. Since segment K does not have a child segment, the culling processing phase terminates at segment K. If face 6 (the graphic primitive of segment K) is determined to be potentially visible, the tree traverser 32 transfers the concatenated transformation matrix and attribute data for segment K from the geometry processor output register file 122 to the geometry processor stack register file 120 and in addition, begins transferring the graphics primitives packets (for face 6) of the segment data buffer via the DLM bus 34 to the geometry processor 36 for face processing.

The data buffer packets, like the culling buffer packets, are linked by pointers as shown in FIG. 7. Each data packet is copied from the display list memory 16 via the DLM data bus 107 into the DLM register file 115 (FIG. 8) of the geometry processor 36 and the DLM register file 112 of the tree traverser 32. The tree traverser 32 uses the pointer address of each data packet to obtain the next packet in the stream. A null pointer indicates that the present data packet is the last packet in the data stream.

The geometry processor 36 interprets the opcode of each data primitive packet and selects the appropriate data packet face processing algorithm. The geometry processor signals that it is in condition to accept the next data packet by activating the GP DLM REGISTER AVAILABLE signal line 118. Face processing is performed by the geometry processor 36 on an edge by edge basis and the data for each edge when completed is transferred to the display processor 40 over the system bus 18 in an edge packet format.

Once the geometry processor 36 indicates that it is ready for face processing the next segment, the tree traverser 32 pops the attribute and transformation matrix data for the next visible segment J off the top of the stack memory 126 and transfers this data via the stack bus 38 to the stack register file 120 of the geometry processor 36. The tree traverser 32 uses the stored object header block pointer from the stack memory 126 shown in FIG. 9 to first address the header block to obtain the data buffer pointer for segment J. Using the data buffer pointer, the tree traverser addresses and transmits the data buffer packets for the face 5 graphics primitive of segment J from the memory 16, over the DLM data bus 107 and to the geometry processor 36 for face processing.

The face processing algorithm implemented by the geometry processor of the illustrated embodiment, transforms vertices (and vertex normals, if shaded) to screen coordinates, discards the polygon, if the polygon is determined to be facing away from the viewer, and clips the polygon to the field of view boundaries (clipping planes) if necessary. In addition, the geometry processor 36 projects the vertices by either a perspective or parallel method into a two dimensional image plane and scales the vertices to the viewport.

The tree traverser 32 during the retraversal of the display list, will continue backtracking over the "visible" segments, popping the header block pointers, matrices and attributes off the stack 126 and sending the data packets and stack data to the geometry processor for face processing the segments until a segment having an "untraversed" child segment is encountered. As previously mentioned, the tree traverser 32 does not examine (and hence, traverse) the child pointer of a segment if the segment has a sibling pointer under the sibling preferred traversal. Accordingly, if during retraversal the next segment-in-line to be retraversed has a child segment and the segment presently being retraversed is the sibling segment of the segment next-in-line to be retraversed, the child segment was not traversed in the prior traversal. Once an untraversed child segment is encountered, the tree traverser 32 switches back to the culling mode traversal, traversing the display list starting at the untraversed child segment.

For example, the tree traverser 32 after culling segment B traverses to the sibling segment C rather than the child segment D during the initial traversal in accordance with the sibling preferred method. During retraversal, the traversed segments are face processed until the retraversal returns the tree traverser to segment C. Face processing is terminated after segment C since the next segment-in-line to be retraversed, segment B, has an untraversed child segment, segment D. Thus, the tree traverser 32 does not transmit the data primitive for segment B for face processing but instead switches back to the culling mode traversal, traversing and culling starting at segment D.

An untraversed child segment is detected by an examination of the tree level indicator of word N+2 (FIG. 9) of the current segment being retraversed, and the tree level of the next segment on the stack (i.e., the next segment-in-line to be retraversed). If both tree levels are the same (i.e., the segments are siblings), and the next segment on the stack has a valid child pointer, then that child segment was not traversed.

The tree traverser 32 will continue traversing and retraversing the display list until each segment has been either culled out or face processed. The last data buffer packet of the viewport segment contains an "end-of-traverse" primitive. The tree traverser sends the data buffer packets for the viewport segment to the geometry processor last. Thus, the end-of-traverse primitive will be the last packet transferred to the geometry processor 36. Alternatively, once the stack memory 126 has been depleted, indicating that the entire tree has been traversed, the tree traverser can address and transmit an "end-of-traverse" packet from the display list memory 16 to the geometry processor 36. Once received by the geometry processor, the geometry processor 36 in turn sends the end-of-traverse primitive or packet to the display processor 40 over the system bus 18. The display processor 40 will then begin screen processing and will issue an interrupt to the terminal processor 12.

Figure 10:
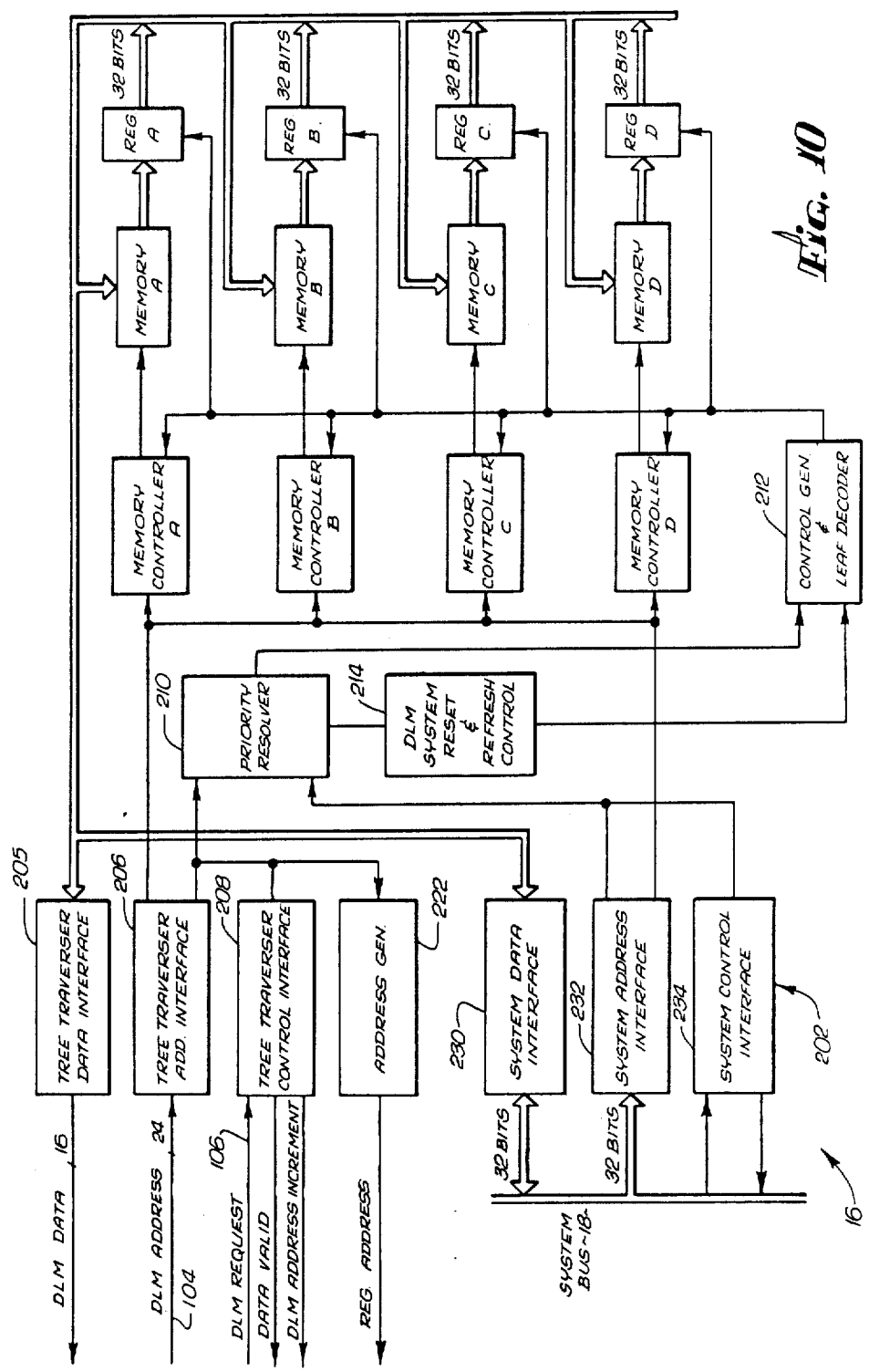
FIG. 10 is a schematic diagram of the display list memory of the graphics processor of FIG. 1.

The display list memory 16 is a dual port, fourway interleaved memory board in the illustrated embodiment. FIG. 10 shows a more detailed schematic block diagram of the display list memory 16. The memory 16 includes four banks or "leaves" of dynamic random access memory A-D. These memories may be accessed from the system bus 18 through a first port 202 which includes data, address and control interfaces 230, 232, and 234, respectively. These memories may also be accessed from the tree traverser 32 through a second port 204 which also includes data, address and control interfaces 205, 206, and 208, respectively. The interfaces of the ports 202 and 204 comprise the usual input and output buffers.

The addresses of the memories A-D are interleaved so that address locations 0,1,2 and 3 are located in memories A, B, C and D, respectively, memory locations 4, 5, 6, and 7 are in memories A, B, C and D, respectively, etc. Accordingly, the 16 (or 32) words of each packet may be stored in this interleaved fashion with word 0, the first word of each packet, being stored in memory A.

To read a data packet from the memories A-D, the starting address of the packet, i.e. the address of word 0 of, the packet, is transmitted by the tree traverser 32 via the DLM ADDRESS bus 104 to the tree traverser address interface 206 of the tree traverser port 204. The tree traverser address interface 206 further includes a board select logic. In the illustrated embodiment, two bits of the 24 address bits supplied by the tree traverser 32 are examined by the board select logic of the interface 206 to determine if those bits match a DLM memory board address code that has been programmed with, for example, DIP switches (not shown) on the memory board. In addition to correctly addressing the display list memory 16, the tree traverser 32 activates the DLM REQUEST line 106 received by the tree traverser control interface 208 of the tree traverser port 204. When these two conditions are met, the request is sent to a priority resolver logic circuit 210 which "referees" conflicting requests by the tree traverser 32 and the system bus 18. If either the system bus 18 or the tree traverser 32 requests access to the memories A-D while the other is already accessing these memories, the other is granted access to the memories upon completion of the ongoing memory access before the former is granted access again. However, both the tree traverser 32 and the system bus 18 can be denied access if a refresh of the memories A-D is required.

Figure 11:
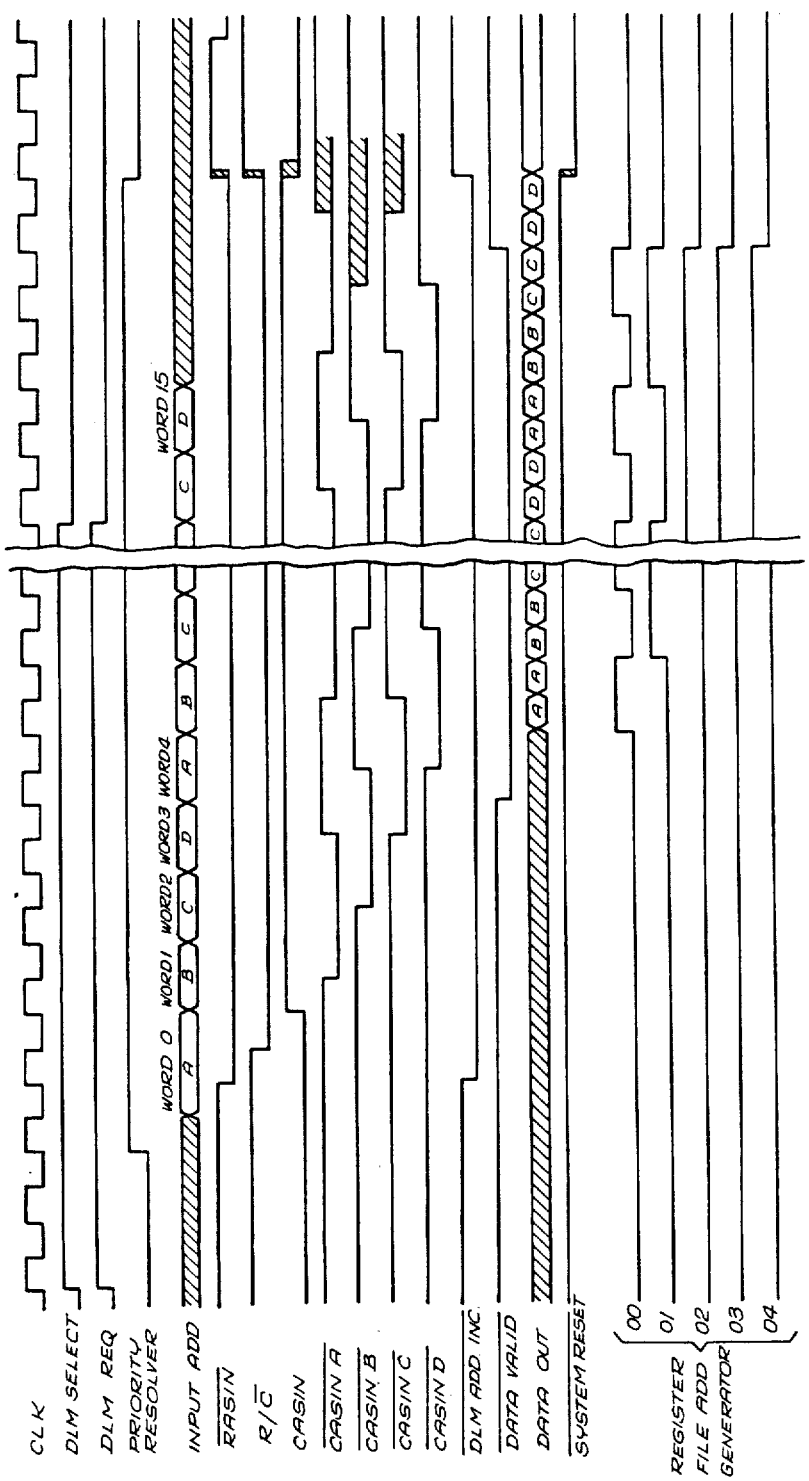
FIG. 11 is a timing diagram illustrating a read operation by the tree traverser of the graphics processor of FIG. 1.

FIG. 11 is a timing diagram illustrating the operation of the display list memory 16 during a tree traverser read operation. The correct addressing of the display list memory 16 is represented by the positive transition of the timing line designated DLM SELECT. The activation of the DLM REQUEST line 106 is represented by the positive transition of the timing line of the same name in FIG. 11. Once the display list memory 16 has been correctly addressed and the DLM REQUEST line from the tree traverser 32 is active (and any ongoing access of the display list memory by the system bus 18 has been completed), the priority resolver logic 210 grants access to the memory as represented by the positive transition of the PRIORITY RESOLVER timing line. The address of the first word of the packet is then transmitted to each of four memory controllers A-D for the memories A-D, respectively, of FIG. 10. The memory controllers A-D may be each implemented with a 74S409 integrated circuit chip, for example.

Each memory location of the memories A-D is defined in terms of a row address and a column address. A portion of the address bits presented to the memory controllers A-D specifies the row address and another portion of the address bits specifies the column address. A row/column (R/C̄) control signal generated by a control generator and leaf decode logic 212 and presented to the controllers A-D is initially high as shown in FIG. 11 so that the row address bits are outputted to the memories A-D first. On the next positive transition of a 10 megahertz clock pulse after the priority resolver 210 has granted priority to the tree traverser 32, the control signal generator 212 activates a row address strobe input signal (RASIN) which is used by the controllers A-D to generate a row address enable signal for each of the memories A-D. In this manner, a row of address locations is selected in each memory A-D. On the negative transition of the same clock pulse, the row/column (R/$\overline{C}$) signal line to the memory controllers A-D changes state so that the column address bits are gated to the memories A-D. However, only one of the four leaves of memory A-D is enabled to read the column address bits after a column address strobe input signal ($\overline{CASIN}$) is activated by the control generator 212. The particular memory A-D is selected by two address bits of the 24 address bits provided by the tree traverser 32. The control generator and leaf decode logic 212 decodes these two address bits and activates one of four column address strobe input lines ($\overline{CASIN\ A}$, $\overline{CASIN\ B}$, $\overline{CASIN\ C}$ or $\overline{CASIN\ D}$) in accordance with the leaf select address bits. Since the first word of the packet is stored in memory A, the first column address strobe input to be selected is the column address strobe input A or $\overline{CASIN\ A}$ on the negative transition of the same clock pulse as that which activated $\overline{CASIN}$. The $\overline{CASIN\ A}$ signal causes the memory controller A to enable the memory leaf A to input the column address bits, completing the addressing of the memory A. The row and column address bits input by the memory A selects a 32 bit word which is output to a register A.

At the time the $\overline{RASIN}$ signal is activated, the display list memory 16 activates the DLM ADDRESS INCREMENT signal to the tree traverser 32 so that the tree traverser increments the DLM address to the address of the next word of the DLM packet which is stored in memory B. One clock period after the first address (for word 0) has been input by the memory 16, the second address (for word 1) is input by the memory 16. In the illustrated embodiment, each word of the packet has the same row address with only the column addresses changing. Accordingly, one clock pulse after the $\overline{CASIN\ A}$ signal is activated, the column address strobe input signal for memory controller B, $\overline{CASIN\ B}$, is activated as shown in FIG. 11. The control signal $\overline{CASIN\ B}$ causes the memory controller B to enable the memory B to input the column address bits of the second address, resulting in the addressed 32 bit word (word 1) being output to an associated output register B. In a similar manner, the memory 16 inputs two additional addresses, directing these addresses to the memories C and D, respectively, and outputing words 2 and 3 of the packet to the output registers C and D. The cycle repeats with the tree traverser 32 addressing memories A-D in sequence until all 16 (or 32) words of the packet have been read.

The words are read in sequence from the registers A-D and are stored in an output register of the tree traverser data interface 205. The data interface 205 outputs a 16 bit half word on the DLM data bus 107 each half cycle of the clock period. As shown in FIG. 11, the first halfword is output on the DLM bus 107 on the order of 5 clock pulses after the first address is input by the memory 16. However, thereafter the memory 16 outputs a half word every half cycle until all the words of the packet have been read. The display list memory 16 indicates on the output line 108 to the tree traverser 32 that the data is valid one clock pulse prior to the emergence of the data.

The display list memory 16 also has a register address generator 222 which provides the register addresses of the tree traverser DLM register file 112 and geometry processor DLM register file 115 (FIG. 8). These register addresses identify the locations at which the data words of the packets from the display list memory 16 are stored. As shown in FIG. 11, the register file addresses are generated synchronously with the words being output by the display list memory 16. Since the addresses are generated sequentially, the address generator 222 may be implemented with a counter for example.

The display list memory 16 also has a system reset and refresh control logic circuit 214 which initiates a two cycle refresh at the end of each read request of the tree traverser or at the end of each read or write request of the system bus 18, as shown by the timing line designated $\overline{SYSTEM\ RESET}$ in FIG. 11. If no read or write request is made, a counter within the system reset and refresh control logic 214 forces a system reset after 64 counts of the system clock to ensure that a two cycle refresh will occur.

As a dual port memory, the display list memory 16 may also be accessed by the system bus 18 through the system bus port 202. The terminal processor 12 of FIG. 1 writes and maintains the display list data through the system bus port 202. As previously mentioned, the system bus 18 is a standard VMEbus. Accordingly, the interfaces 230, 232 and 234 of the system bus port 202 are designed to accommodate the particular signal lines of a VMEbus.

To gain access to the display list memory 16 through the system bus port 202, the address and control signals of the system bus 18 must pass three tests in the illustrated embodiment. First, VME address bits AE22-AE29 of the VME address bus must match the board select code that has been programmed with DIP switches (not shown) on the DLM memory board. Second, the address modifier bits of the VME system bus must meet four preset codes, and at the same time, the VME input acknowledge (IACK) control signal must be high, and address bits AE30, AE31 must be low and the VME address strobe ($\overline{AS}$) must go low. Third, coincidentally with the transition of the address strobe $\overline{AS}$ (or within one clock cycle after the address strobe $\overline{AS}$ goes low), the VME long word, AE01, and the data strobes DS00 and DS01 must go low or a bus error ($\overline{BERR}$) alarm will occur and the system bus 18 will not be granted access. The satisfaction of these three conditions is represented by positive transitions of three timing lines, designated $\overline{BOARD\ DECODE}$, $\overline{ERROR\ DECODE}$ and $\overline{ADDRESS\ MODIFIER\ DECODE}$, respectively, in FIG. 12 which shows a timing diagram of a typical system bus data write operation.

If all three of the above-described conditions are met, the system bus memory request is sent to the priority resolver 210 (FIG. 10). Immediate access is granted by the priority resolver logic 210 unless the display list memory is being refreshed by the tree traverser 32.

Figure 12:
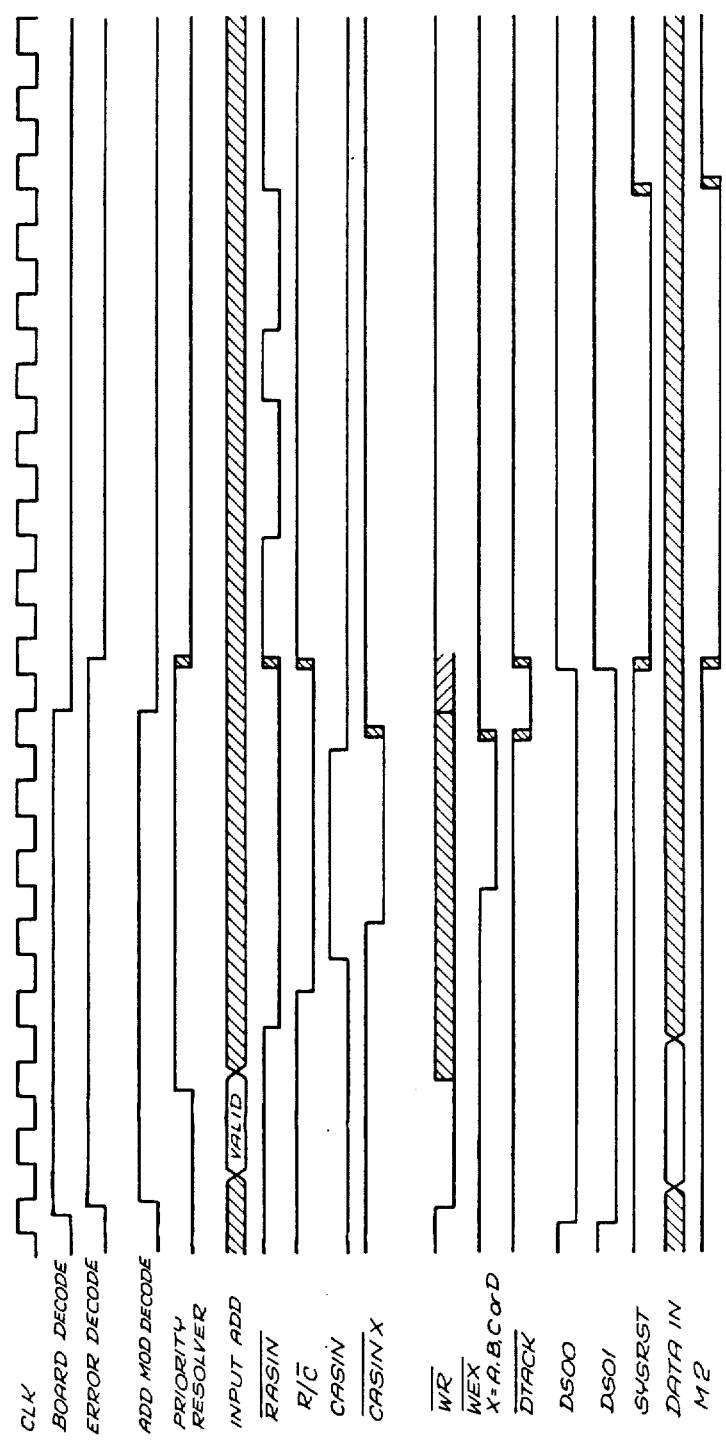
FIG. 12 is a timing diagram illustrating a write operation via the system bus of the graphics processor of FIG. 1.

The granting of access to the system bus 18 is represented by the positive transition of the $\overline{PRIORITY\ RESOLVER}$ timing line of FIG. 12. The system bus input address is clocked into input registers (not shown) of the system bus address interface 232 on the preceding negative clock edge. The clock signals to the address interface input registers are then gated off by the priority resolver output until the memory request has been completed.

At the next positive transition of the clock after priority has been granted to the system bus, the row address strobe input signal ($\overline{RASIN}$) is activated by the control generator logic 212, enabling the memories A-D to input the row address bits. One half clock cycle later, the row/column enable signal (R/$\overline{C}$) is toggled low to change the address data transmitted by the controllers A-D to the memories A-D from the row address bits to the column address bits. The next positive transition of the clock initiates the column address strobe input (CASIN) control signal which is used by the control generator and leaf decode logic 212 to generate one of four leaf specific column strobe signals $\overline{\text{CASIN A}}$, $\overline{\text{CASIN B}}$, $\overline{\text{CASIN C}}$ or $\overline{\text{CASIN D}}$, designated $\overline{\text{CASIN X}}$ in FIG. 12. VME address bits AB02 and AB03 of the system bus address are decoded by the control generator and leaf decoder 212 to determine which column address strobe, $\overline{\text{CASIN A}}$, $\overline{\text{CASIN B}}$, $\overline{\text{CASIN C}}$ or $\overline{\text{CASIN D}}$, is generated.

The negative transition of the leaf specific column strobe $\overline{\text{CASIN X}}$ clocks the column address bits into the appropriate memory leaf A, B, C or D. In writing data to the memory 16, the write ($\overline{\text{WR}}$) control signal goes low at the beginning of the write operation. The control signal generator and leaf decode logic 212 generates a write leaf specific enable control signal $\overline{\text{WEA}}$, $\overline{\text{WEB}}$, $\overline{\text{WEC}}$ or $\overline{\text{WED}}$ designated $\overline{\text{WEX}}$ in FIG. 12 for the four memory controllers A-D. One half clock cycle after the $\overline{\text{CASIN X}}$ control signal has gone low, the associated write enable signal $\overline{\text{WEX}}$ for the selected memory A-D will go low allowing the data supplied by the system bus 18 to be written into the selected memory A-D at the selected memory location. At the end of the write enable pulse $\overline{\text{WEX}}$, the VME data acknowledge signal, DTACK, to the system bus master goes low indicating the completion of the write cycle.

For a read operation, the data acknowledge signal DTACK goes low one clock period after the column address strobe input signal $\overline{\text{CASIN X}}$ returns to the high state. In either the read or write operation, the VME system bus control signals DS00 and DS01 go high before the data acknowledge signal DTACK terminates and a system reset occurs.

The positive transition edge of the $\overline{\text{CASIN X}}$ signal loads the data read from the memory into the proper output registers A-D and the register tristate output is enabled until the system reset is initiated by the system bus control signals DS00 or DS01 going high. As previously mentioned, system reset will initiate a two cycle refresh at the end of each read or write request. A system bus request of the display list memory 16 can be made each 15 clock periods to write data and each 16 clock periods to read data. The system bus accesses are longer than the tree traverser accesses because of the delay caused by the priority resolver logic and the system reset times.

Dual port and four-way interleaved memories are well known in the art. Accordingly, specific combinational logic for generating the control signals of FIGS. 11 and 12 are well within the skill of those of ordinary skill in the art. FIGS. 44-56 illustrate specific board level logic circuits and integrated circuits to implement the display list memory 16.

Figure 13:
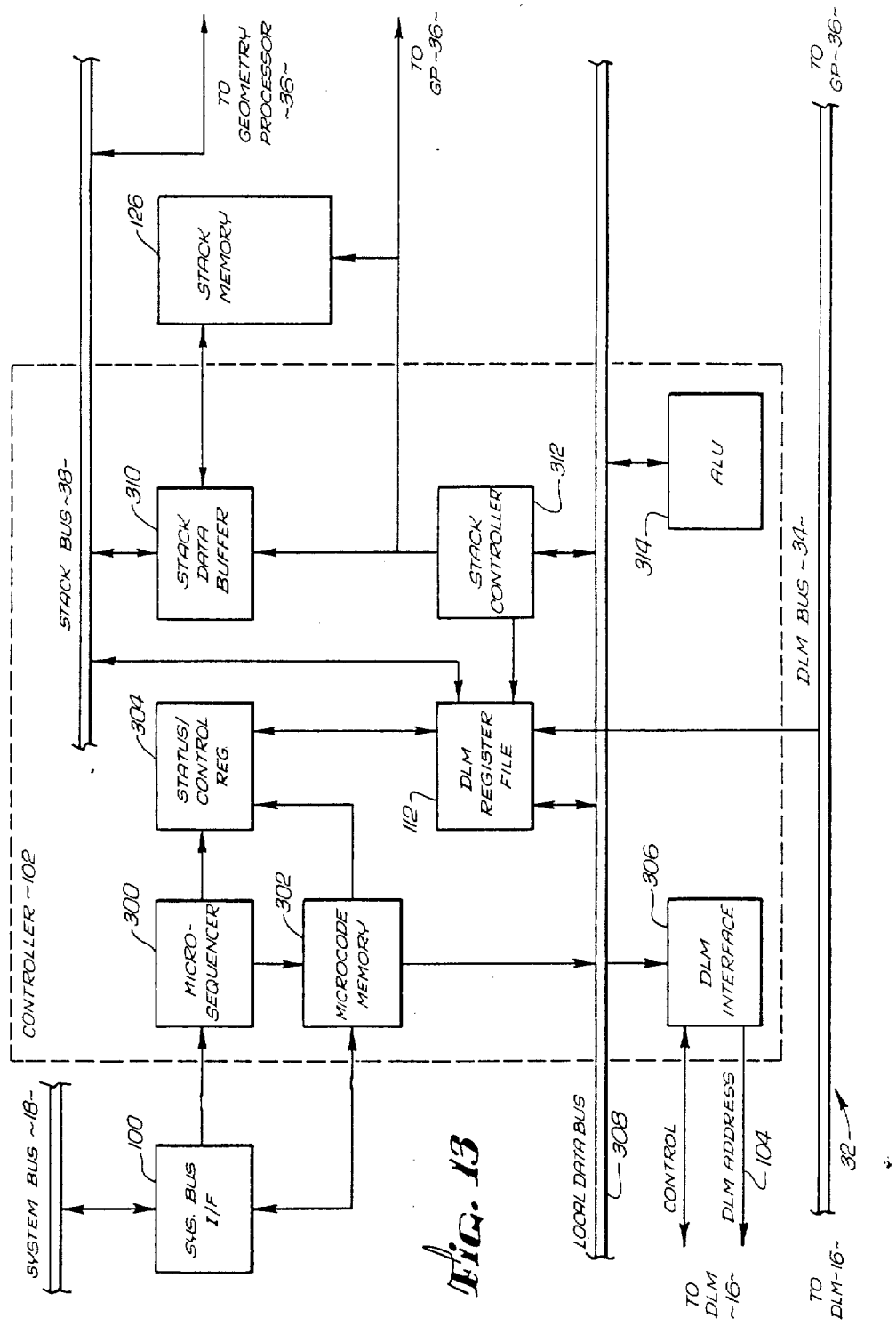
FIG. 13 is a more detailed schematic block diagram of the tree traverser of FIG. 8.

FIG. 13 shows a more detailed schematic diagram of the controller 102 of the tree traverser 32. The controller 102 includes a microsequencer 300 which when enabled, executes the program stored in a microcode memory 302. The microsequencer 300 controls the operation of the various devices of the tree traverser 32. Alternatively, a microprocessor or logic state machine might be substituted for the microsequencer 300 and associated peripheral devices.

The microsequencer 300 outputs various control signals through a set of status and control registers 304. Status signals are also inputed by the microsequencer 300 through the registers 304. One device which receives control signals from the microsequencer 300 and outputs status signals to the microsequencer 300 is a display list memory (DLM) interface circuit 306. In the illustrated embodiment, the DLM interface 306 is a picocontroller which generates a group of contiguous display memory addresses to read the packets of data from the display list memory 16. As will be explained in greater detail below, a display list memory read operation is initiated by the microsequencer 300. The DLM interface 306 loads a starting packet address transferred by the microsequencer 300 from a local data bus 308 of the tree traverser 32. The DLM interface 306 can generate the remaining addresses of the packet without further intervention by the microsequencer 300.

The packets read from the display list memory 16 are transferred to both the geometry processor 36 and the DLM register file 112 of the tree traverser 32. The DLM register file 112 of the illustrated embodiment is a multiport register file which permits the microsequencer 300 to examine the initial results of a data transfer from the display list memory 16 while the transfer is in progress. Specifically, the microsequencer 300 can obtain the starting address of the next packet from the packet being stored in the DLM register file 112 as previously described. The next packet starting address is transferred over the local data bus 308 to the DLM interface 306 to initiate another packet read operation. As will be described in greater detail below, the register file 112 also permits rapid data exchanges between the tree traverser 32 and the geometry processor 36, acting as a data buffer during stack transfers between the geometry processor 36 and the stack memory 126 of the tree traverser 32.

As previously described, the stack memory 126 provides a memory buffer between successive traversal and retraversal data processing operations. Thus, in the illustrated embodiment, the data obtained during the culling traversal is stored on the stack memory 126 until it is transferred back to the geometry processor during the face processing retraversal of the display list.

Data transfers between the geometry processor 36 and the stack memory 126 of the tree traverser 32 occur over the stack bus 38 through a bi-directional stack data buffer 310. Because these data transfers are independent of the data packet transfers over the DLM bus 34, the DLM bus 34 of the illustrated embodiment can be a unidirectional bus which simplifies and therefore significantly increases the speed of the DLM bus 34 operation. Moreover, the two separate buses, the stack bus 38 and DLM bus 34, effectively double the input bandwidth of the geometry processor 36. Thus, both the data loading time and idle time for the geometry processor 36 are correspondingly reduced.

Control of the stack memory transfer operations is provided by a stack controller 312 which in turn is controlled by the microsequencer 300. The starting address, number of words to be transferred, direction and destination of the stack transfer are provided by the microsequencer 300 over the local data bus 308. The stack controller 312 can complete the stack transfer without further microsequencer control.

The tree traverser 32 also includes a standard arithmetic logic unit 314. Under control of the microsequencer 300, the ALU 314 provides addition, subtraction, shifting, masking and data storage functions.

Figure 14:
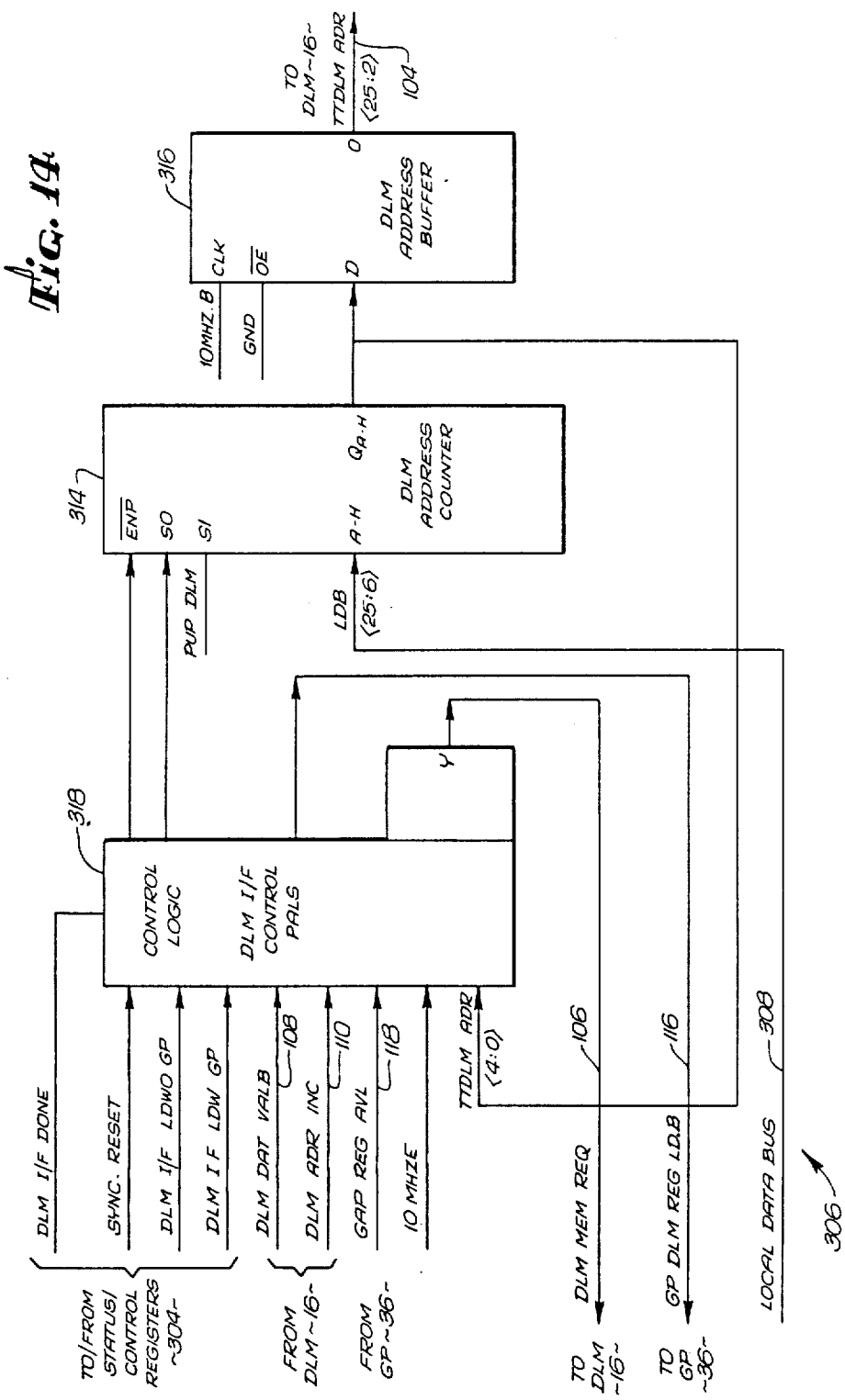
FIG. 14 is a schematic diagram of the display list memory interface for the tree traverser of FIG. 13.

FIG. 14 shows the DLM interface 306 in greater detail. The DLM interface 306 includes a 24-bit counter 314 which generates contiguous 24-bit addresses for addressing the display list memory 16. The 20 most significant bits of the starting address of a packet to be read from the display list memory 16 are loaded into the 20 most significant bit positions of the DLM address counter 314 from the data lines 25-6 (25:6) of the local data bus 308. In the illustrated embodiment, the packets are stored in the display list memory 16 so that the four least significant bits of the starting address of each packet are all zero. Hence, the four least significant bit positions of the DLM address counter 314 are initially set to 0. A buffer driver circuit (such as an AS374 integrated circuit) 316 couples the output of the DLM address counter 314 to the display list memory address bus 104. Once the display list memory 16 inputs the initial address, the DLM address counter 314 is incremented to provide the next contiguous address of the packet to the display list memory 16.

The control signals for loading the 20 most significant address bits from the local data bus 308 and for incrementing the DLM address counter 314 are provided by a logic circuit 318 which is implemented with programmed array logic (PAL) circuits. One manner in which the PALs may be programmed is represented by the logic diagrams of FIGS. 15A–15C. The logic circuits 318 and the DLM address counter 314 together form a logic state machine, the logic state transitions for which are illustrated in FIG. 16. The logic state transition diagram of FIG. 16 represents the next state transitions reduced to a basic form. It is recognized of course that other logic state machines may be designed to provide the appropriate control signals of the DLM interface 306.

As shown in FIG. 16, the logic state machine has four basic states or modes designated RESET, COUNT, EXTEND and END which are represented by two state variables, "G" and "F". The RESET state (GF=00) occurs at power up. The reset state is entered when the synchronous reset (SYNCH RESET) input line to the logic circuits 318 (FIGS. 14 and 15a–c) is active. The SYNC RESET control signal is provided by the system bus interface 100 (FIG. 13).

The programmed array logic of FIG. 15A includes four flip flops 320–323 which when set, indicate the four states, RESET, COUNT, EXTEND and END, respectively. The inputs to the state flip flops 320–323 are coupled to the outputs of appropriate combinational logic which employs various control signal inputs including SYNCH RESET, provided to the DLM interface 306.

In the RESET state, the states of the logic state variables, G and F, are both 0 as shown in FIG. 17 which is a timing diagram illustrating the transfer of a packet of data from the display list memory 16 to the tree traverser and geometry processor. The COUNT state is entered by enabling either of two "load packet" strobe lines from the status/control registers 304 and provided to the logic circuits 318. The first load packet enable line designated $\overline{\text{DLM IF LD W/O GP}}$ initiates a data transfer from the display list memory 16 to the tree traverse 32 only. The second load packet enable line designated $\overline{\text{DLM IF LD W GP}}$ initiates a data transfer to both the tree traverser 32 and the geometry processor 36. In the example of FIG. 17, it is the $\overline{\text{DLM IF LD W/GP}}$ signal which is activated such that the packets are transferred to both the tree traverser and the geometry processor.

A data transfer to geometry processor 36 over the DLM bus 34 requires the geometry processor DLM register file 115 (FIG. 8) to be available. The availability of the geometry processor DLM register file 115 is indicated on a GP DLM REG AVL control signal input 118 to the logic circuits 318 from the geometry processor 36.

Either load packet strobe causes the 20 most significant bits of the starting DLM packet address to be loaded into the DLM address counter 314 of FIG. 14. This address load strobe signal is generated by combinational logic having an output designated SO (FIG. 15b) and provided to the address counter 314 (FIG. 14). The activation of the address load strobe control signal SO is also represented in the timing diagram of FIG. 17.

On the positive transition of the $\overline{\text{DLM IF LD W/GP}}$ load packet control signal, a flip flop 324 (FIG. 15b) of the DLM interface logic circuits 318 is set as represented by the W/GP Q timing line of FIG. 17, indicating that the packet transfer is to both the geometry processor and the tree traverser. (If the other load packet strobe, $\overline{\text{DLM IF LD W/0 GP}}$, had been activated, a second flip flop 325 would have been set indicating that the data transfer was not to be copied to the geometry processor 36.) In addition, the transition state variable F is set indicating transition to the COUNT state as shown in FIGS. 16 and 17.

Figure 15B:
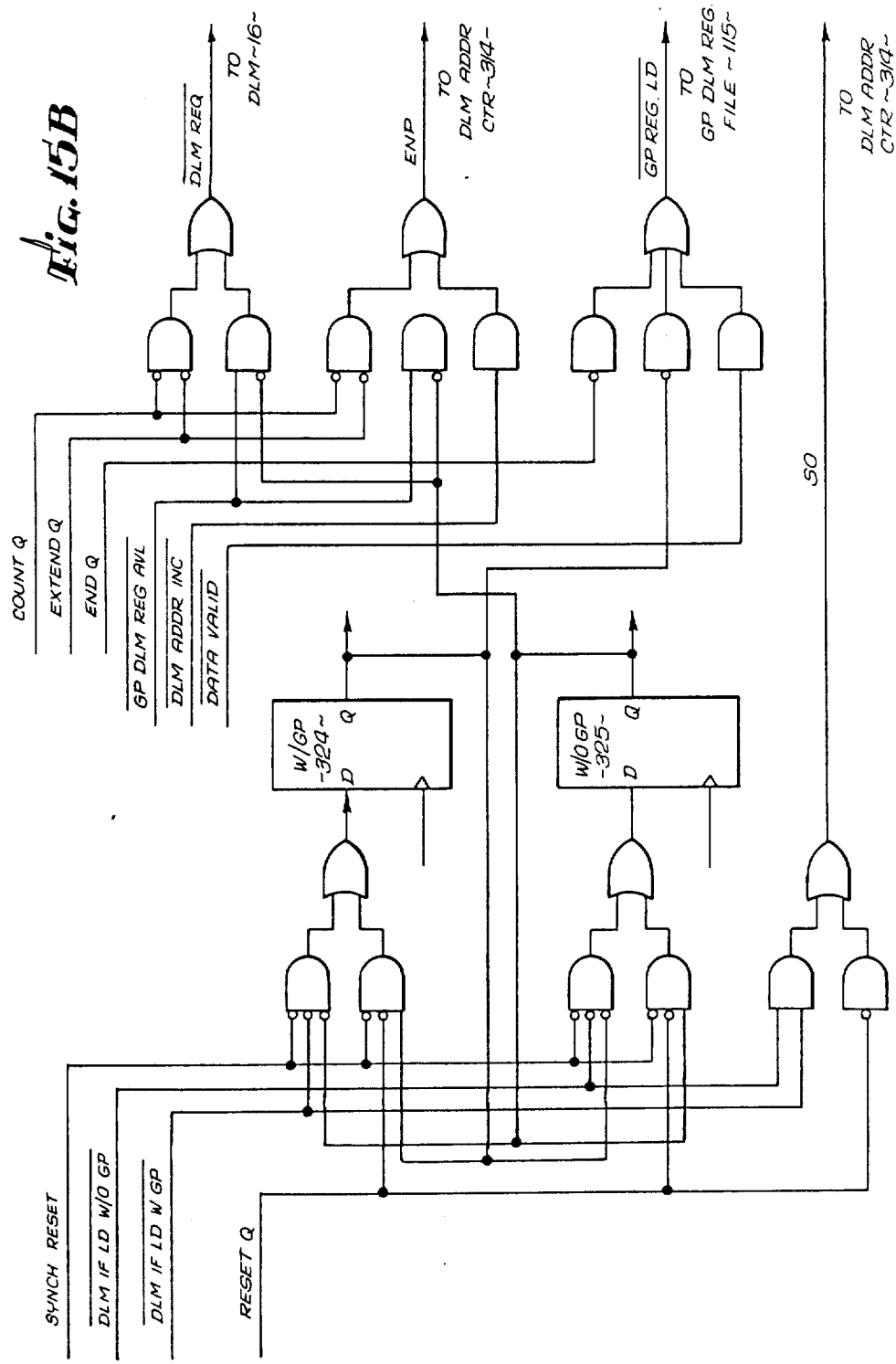
Figure 15C:
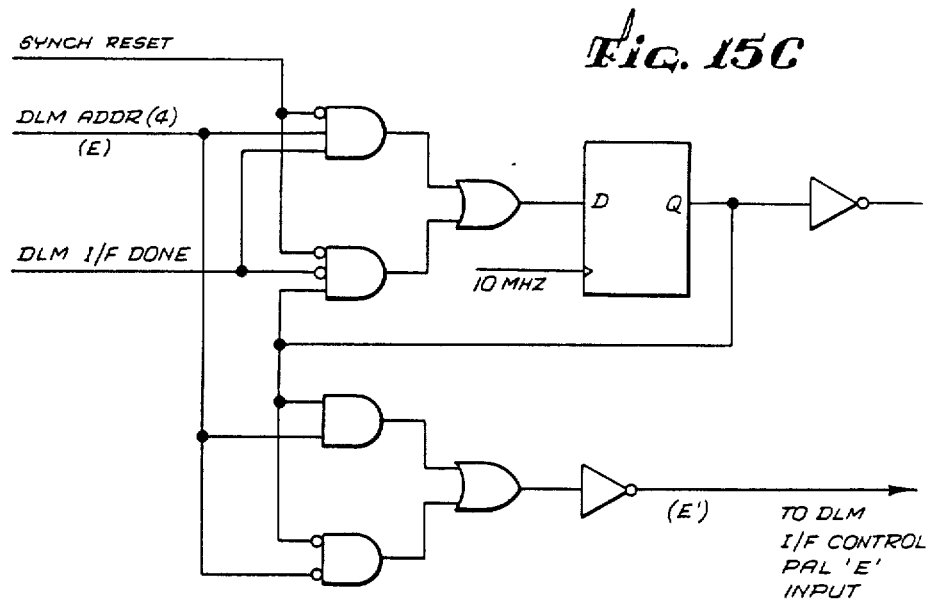
Figure 16:
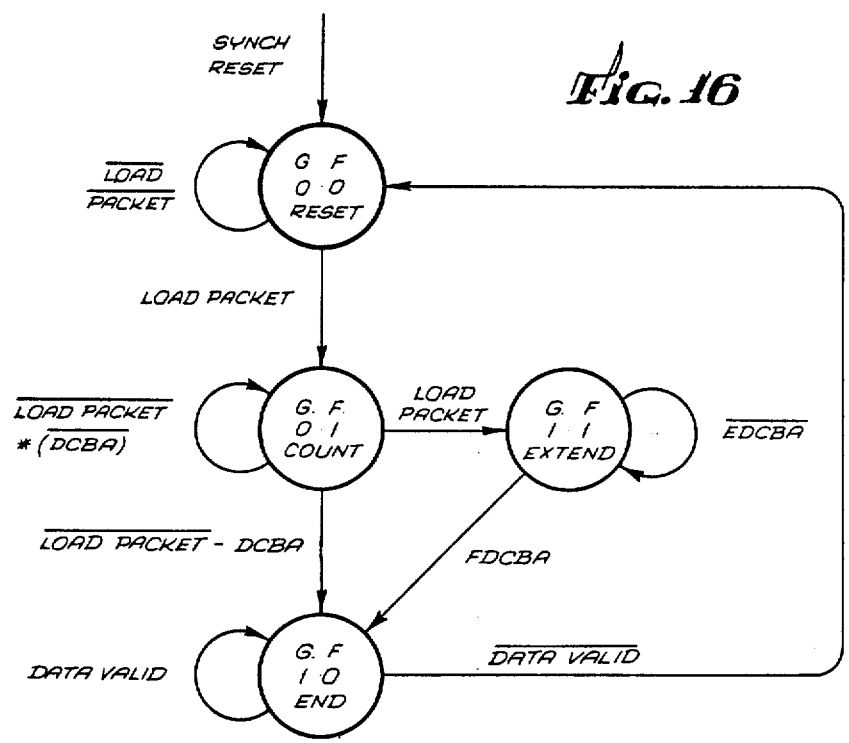
FIG. 16 is a reduced state transition diagram for the control logic circuits of FIGS. 15A-15C.

In the illustrated embodiment, the DLM interface logic circuits 318 of FIGS. 15A–15C are synchronous and use a system ten megahertz clock signal to assure compatability with the inputs of the DLM register files 112 and 115 of the tree traverser 32 and geometry processor 36, respectively. Thus, on the negative transition of the clock pulse during the termination of the load packet strobe the $\overline{\text{DLM I/F LD W GP}}$, the $\overline{\text{DLM REQUEST}}$ control signal is activated, indicating to the display list memory 16 that the address provided by the DLM interface 306 is valid. The $\overline{\text{DLM REQUEST}}$ control signal is generated by combinational logic of the DLM interface logic circuits 318 of FIG. 15b. Since the data transfer will copy the data to the DLM register file 115 of the geometry processor 36, the geometry processor register available control signal $\overline{\text{GP REG AVL}}$ must be active before the DLM request control signal is activated by the DLM interface logic circuits 318.

During the COUNT state, the DLM interface 306 awaits the activation of the DLM address increment (DLM ADR INC) control signal from the display list memory 16. On the positive transition of the first clock pulse after the activation of the DLM address increment signal, a pulse enable signal $\overline{\text{ENP}}$ generated by the DLM interface logic circuits 318 of FIG. 15b causes the DLM address counter 314 of FIG. 14 to begin incrementing as shown in FIG. 17. The address counter 314 will continue incrementing the addresses supplied to the display list memory 16 until the 16th packet address has been transmitted or, if an extended transfer has been initiated, after 32 addresses have been transmitted.

As previously mentioned, the packets of the illustrated embodiment are all of 16 or 32 words in length. An extended transfer is initiated by activating either load packet strobe signal while a data transfer is in progress. Thus, as shown in FIGS. 16 and 17, the second positive transition of the load packet control signal $\overline{\text{DLM IF LD W/GP}}$ causes a positive transition of the state variable G placing the logic state machine into the EXTEND state. As shown in FIG. 14, the five least significant address bits EDCBA of the output of the counter 314 are fed back to the logic circuits 318 to enable these circuits to determine when the 32nd (or 16th) address has been transmitted. Once the 32nd address (or the 16th address if non-extended) has been transmitted, the DLM interface logic circuits 318 terminate the $\overline{\text{DLM REQUEST}}$ and $\overline{\text{ENP}}$ control signals. The logic state machine also transitions to the END state as shown in FIGS. 16 and 17. The DLM interface 306 will remain in the END state until the $\overline{\text{DATA VALID}}$ signal from the display list memory 16 terminates, resetting the DLM interface 306.

At the start of the data transfer from the DLM 16, the DLM interface logic circuits 318 provide a $\overline{\text{GP DLM REGISTER LOAD}}$ signal to the DLM register file 115 of the geometry processor 36 to enable that register file to input the data packet. Once the data transfer has been completed, the DLM interface logic circuits 318 activate a DLM I/F DONE control signal which is received by the status/control registers 304 of FIG. 13. The status/control registers 304 also receive the least significant DLM address bits from the DLM interface 306. This permits the tree traverser once a packet transfer has been initiated, to examine the packet word count and increase the number of words in the packet transfer, if required.

If a 32 word packet does not lie within the normal 32 word boundaries, a special circuit shown in FIG. 15C may be used. The circuit of FIG. 15C alters the most significant input address bit E to the control logic circuit 318. The E bit will always be 0 at the start of a transfer cycle. After the 16th address has been transmitted, the circuit output will toggle to a one. This circuit output is substituted for the most significant bit E of the DLM address from the DLM address counter 314 of FIG. 14. However, if the data packets remain within single page boundaries, the circuit of FIG. 15C is unnecessary.

Because the DLM interface 306 can generate the 16 (or 32) addresses of the data packet once given the starting address by the microsequencer 300 without further control by the microsequencer, the microsequencer can turn to other tasks while the packet is automatically read from the display list memory 16. This further increases the overall data processing rate of the traversal or retraversal of the display list.

FIG. 18 is a schematic diagram illustrating the stack controller 312 and its interconnections to the stack memory 126 and stack data buffer 310 in greater detail. There are two principal stack data transfer modes. In the first mode, data is transferred between the stack memory 126 and the geometry processor 36. Data transfers between the stack memory 126 and the DLM register file 112 (FIG. 13) of the tree traverser 32 are performed in the second stack data transfer mode.

In the illustrated embodiment, data is written into the stack memory 126 from the register file 112 and the geometry processor 36 during the traversal and culling of the display list stored in the display list memory 16. Specifically, the child pointer, object header block pointer and tree level words are transferred from the register file 112, and the flag word, transformation matrix and other attributes are transferred from the geometry processor, for objects determined to be potentially visible during the culling process. The process is reversed during the face processing portion of the display list in which the pointer and tree level words are returned to the register file 112 to enable the tree traverser to determine if the segment has an unexamined child segment. If so, the tree traverser reverts to the culling mode, culling the child of the segment. Otherwise, the tree traverser transfers the data packets of the segment via the DLM bus 34 to the geometry processor 36 for face processing. In addition, the transformation matrix and other attribute data words are transferred by the tree traverser from the stack memory 126 to the geometry processor 36 for face processing the object of the segment.

As previously mentioned, the stack memory transfer operations for each segment can proceed independently once initiated by the microsequencer 300 (FIG. 13). The stack controller 312 includes an address counter 330 which generates the sequential addresses for the read or write operations of the stack memory 126. The microsequencer 300 loads the starting address into the address counter 330 from the local data bus 308. The address is loaded by a local data bus stack address load signal (LDBSTKADLD) from the status/control registers 304 (FIG. 13).

The stack memory address (STKMEMAD) generated by the address counter 330 is applied to the row/column (R,C) address inputs of a memory controller circuit 332. In the illustrated embodiment, the memory controller circuit 332 is a 74S409 integrated circuit which contains the appropriate refresh counter, address multiplexers and line drivers to support the dynamic random access memory of the stack memory 126. The stack memory address output of the address counter 330 may also be read back by the microsequencer 300 through a read back buffer 334 upon activation of a local data bus stack address select (LDBSTKADSEL) signal from the status/control registers 304 (FIG. 13). The ALU 314 can compare the read back address to detect an impending stack overflow condition.

The number of words to be transferred is defined by 5 bits of an 8-bit control word. The control word is loaded into a control word register 336 upon activation of a local data bus stack word counter load (LDBSTKWDCNTLD) control signal from the status/control registers 304. Three other bits of the control word define the destination (either geometry processor 36 or register file 112), direction (read or write) and copy mode (whether or not data from the geometry processor output register file 122 is to be also copied to the stack register file 120 of the geometry processor 36). The control word can be read back by the microsequencer 300 over the local data bus 308 upon activation of a local data bus stack word counter select (LDBSTKWDCNTSEL) control signal from the status/control registers 304.

The three transfer control bits of the control word are supplied to a stack control logic circuit 338 which in combination with state registers 340, provides a state machine which determines the control sequence of the controller 312. The stack control logic 338 and state registers 340 generate the appropriate control signals for the memory controller 332, the stack data buffer 310, the address counter 330, and a word counter 342. The word counter 342 loads the 5-bit word count (in two's complement) from the control word register 336 and is incremented as each word is transferred. A comparator 346 monitors the output of the word counter 342 and provides a transfer end ($\overline{\text{DEND}}$) signal to the stack control logic circuit 338 when the word counter output (WDCNT) reaches all 1's, indicating that the specified number of words has been transferred. The word counter output WDCNT also provides the register addresses for the DLM register file 112 of the tree traverser 32 and the register files 120 and 122 of the geometry processor 36. The microsequencer 300 can also monitor the word count through the status/control registers 304.

The stack memory 126 of the illustrated embodiment is a 256 K by 32 bit dynamic RAM memory. As shown in FIG. 9, 23 words are stored in the stack memory for each object determined to be potentially visible during the culling process. Thus, the stack memory 126 can accommodate over 11,000 objects in a single traversal path without experiencing overflow. Data is preferably stored in the stack memory 126 so that each sequential access lies within a single, 256 halfword (byte) page. If not, a data transfer may need to be interrupted to permit a page rollover. Such a rollover condition is signalled by the address counter 330 via the counter ripple carry output (designated "ROLLOVER") signal line to the stack control logic 338 of FIG. 18. If a rollover interruption occurs, the row address strobe (RAS) output line from the controller 332 to the memory 126 is raised and then lowered as a new row address from the address counter 330 is placed on the stack memory address (STKMEMAD) bus to the memory controller 332.

The tree traverser register file 112 of the illustrated embodiment inputs and outputs 16 bit timemultiplexed data. The stack data buffer 310 is a bidirectional buffer which buffers the data out of the stack memory 126 to match the time-multiplexed data bus cycle of the stack data bus 38 to the tree traverser register file 112 and to the geometry processor 36.

Figure 20:
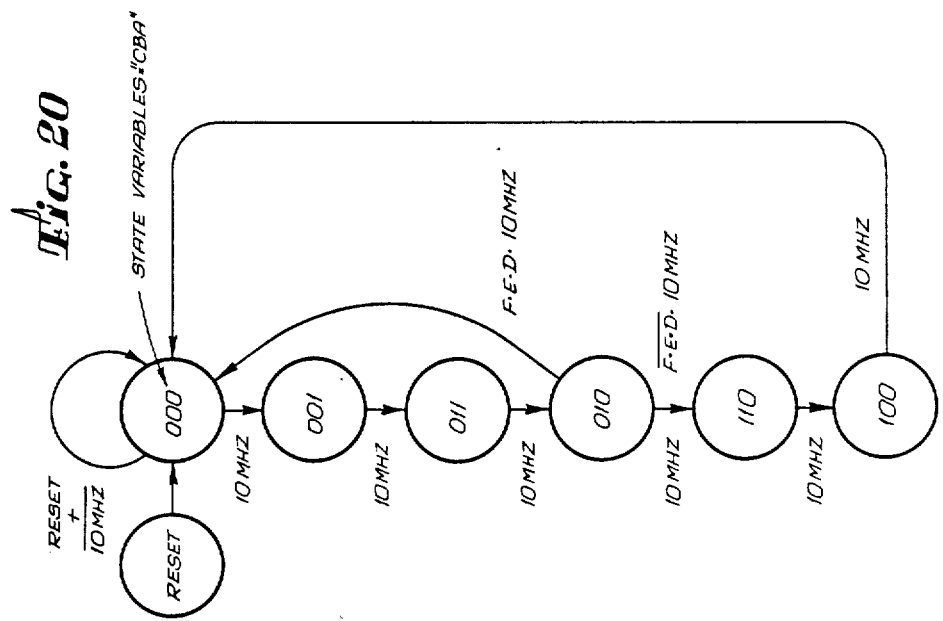
FIGS. 19 and 20 are state transition diagrams for the state machine of the stack controller of FIG. 18.
Figure 19:
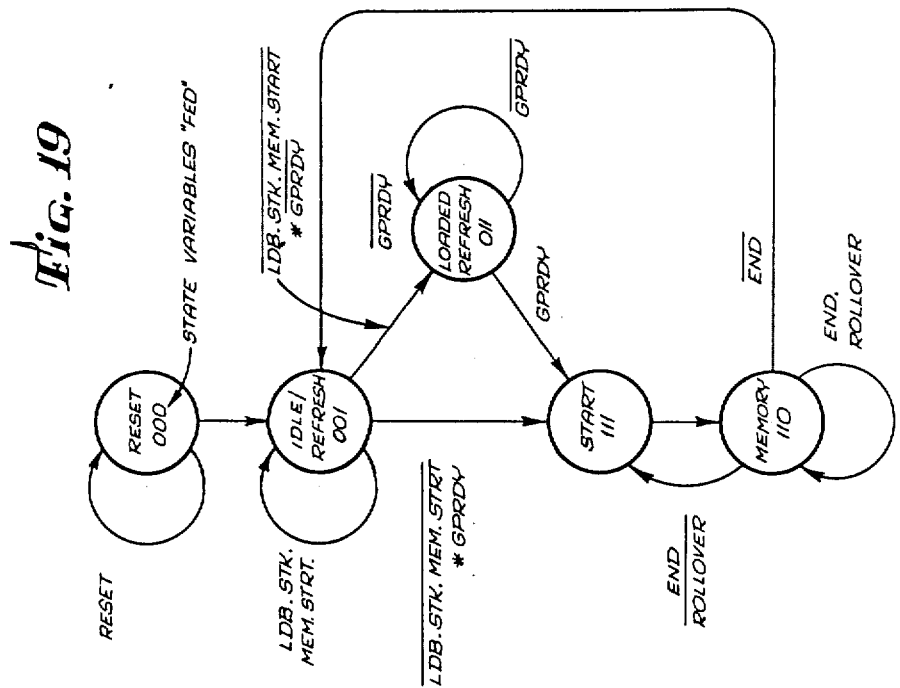

The state machine of the stack control logic 38 and state registers 340 has five major states designated RESET, IDLE/REFRESH, LOADED/REFRESH, START and MEMORY CYCLE as shown in FIG. 19. The major states are designated "mode" states and are defined by the state variables F, E and D. Each mode state may include up to 6 minor or "counter" states defined by the state variables C, B and A and illustrated in FIG. 20. The mode and counter states of the state machine are used to generate the control signals output by the state registers 340 of FIG. 18.

The RESET mode state is entered on power up and the stack controller state machine immediately enters the IDLE/REFRESH mode state as shown in FIG. 19. In this state, the stack controller state machine cyclicly refreshes the stack memory 126 while waiting for the microsequencer 300 to initiate a stack data transfer. A data transfer is initiated when the microsequencer 300 activates a local data bus stack memory start (LDBSTKMEMSTRT) control signal to the stack control logic circuit 338 and the word counter 342 of FIG. 18. If the geometry processor is selected as the destination or source and is not ready to receive or transmit data, the stack controller state machine is side tracked to the LOADED/REFRESH mode state (FIG. 19) in which the refreshing action of the stack mode state 126 is continued until the geometry processor is ready. The readiness of the geometry processor is indicated by a geometry processor ready (GPRDY) control signal which is a function of the destination, direction and copy bits of the control word register 336, and the GP OUTPUT REGISTER LOADED and GP REGISTER AVAILABLE control lines (FIG. 29A) of the stack bus 38 from the geometry processor 36. Activation of the stack memory start (STKMEMSTRT) control signal causes the word counter 342 to load the word count from the control word register 336.

Once the geometry processor 36 indicates that it is ready (GPRDY active), the stack controller state machine proceeds to the START major state as shown in FIG. 19. The transition to the START state is also shown in FIG. 21 which is a timing diagram illustrating the generation of the register file addresses for a typical read operation from the stack memory 126 and a typical write operation to the stack memory 126.

From the START major state, the stack state machine of the stack control logic 338 and state registers 340 proceeds to the memory cycle (MEMCYCLE) during which the data from the stack memory 126 is accessed. Data read from the stack memory 126 is written to the DLM register file 112 of the tree traverser and/or the stack register file 120 of the geometry processor 36 (FIG. 8). The register file addresses are provided by the five most significant bits of the 6-bit output (WDCNT) of the word counter 342 (FIG. 18). During the memory cycle (MEMCYCLE), the stack state machine generates a stack memory word counter enable pulse (STKWDCNTENP) control signal to the word counter 342 to increment the counter 342 until the designated number of words have been read from the stack memory 126. Each register file inputs a 32-bit word in two sequential 16-bit half words at each "even" (least significant bit of WDCNT inactive) address from the output of the word counter 342. Transfers to and from the geometry processor register files are delayed by one clock cycle. In the illustrated embodiment, the DLM register file 112 of the tree traverser 32 is a Weitek 1066 multiport register file integrated circuit. The stack register file 120 and the output register file 122 of the geometry processor 36 are implemented with an MEC multiport register file integrated circuit. As shown in FIG. 21, the stack and output register files of the geometry processor 36 are addressed one 10 megahertz clock period after the DLM register file 112 is addressed. Hence the geometry processor stack read or write enable (GP STACK READ ENB or GP STACK WRITE ENB) signals generated by the stack state machine of FIG. 18 are coincident with the activiation of the least significant bit ("odd address") of the output WDCNT of the word counter 342. If the data being read from the stack memory 126 is being written to the tree traverser DLM register file 112, a stack read enable (STK RDEN) control signal output of the state registers 340 (FIG. 18) is activated. If the data is being written to the stack memory 126 from the DLM register file 112, a stack write enable (STK WRITE ENB) output of the state registers 340 is activated. Once all the words have been transferred, the $\overline{END}$ output signal of the comparator 346 is activated.

FIG. 22A illustrates a typical write operation to the stack memory 126 from the tree traverser DLM register file 112. During the LOAD cycle, the appropriate control (including address) signals are applied to the DLM register file 112. One clock cycle later during the START cycle, access is granted to the memory cells of the register file and the data is produced one clock cycle later in two time-multiplex 16-bit half words (MSB and LSB). In the illustrated embodiment, the address is applied a second time one clock period after the initial application of the address so that the data is again supplied one clock period after the initial data is supplied. The addresses for the remaining words of the data transfer are applied to the DLM register file 112 during the memory cycle.

The state machine of the stack control logic circuit 338 and the state registers 340 generates the control signals $\overline{G}$ bar, clocked B to A (CBA) and clocked A to B (CAB) for the bi-directional stack data buffer 310 of FIG. 18. The stack data buffer 310 transmits the data from the DLM register file 112 to an A bus 347 coupling the A input/output of the buffer 310 to the stack memory 126. As shown in FIG. 22A, the activation of the clocked B to A signal outputs the most significant byte MSB from the DLM register file 112 onto the A bus for approximately one 10 megahertz clock cycle. A second activation of the clocked B to A (CBA) signal places the least significant byte LSB on the A bus for approximately another 10 megahertz clock cycle. These bytes are inputed by the data input port of the stack memory 126 during the latter half of the 10 megahertz clock cycle as shown in FIG. 22A. FIG. 22B illustrates the transfer of data in the other direction, that is, a read operation transferring data from the stack memory 126, through the bidirectional stack data buffer 310 to the tree traverser register file 112 and/or the stack register file 120 of the geometry processor.

Figure 23:
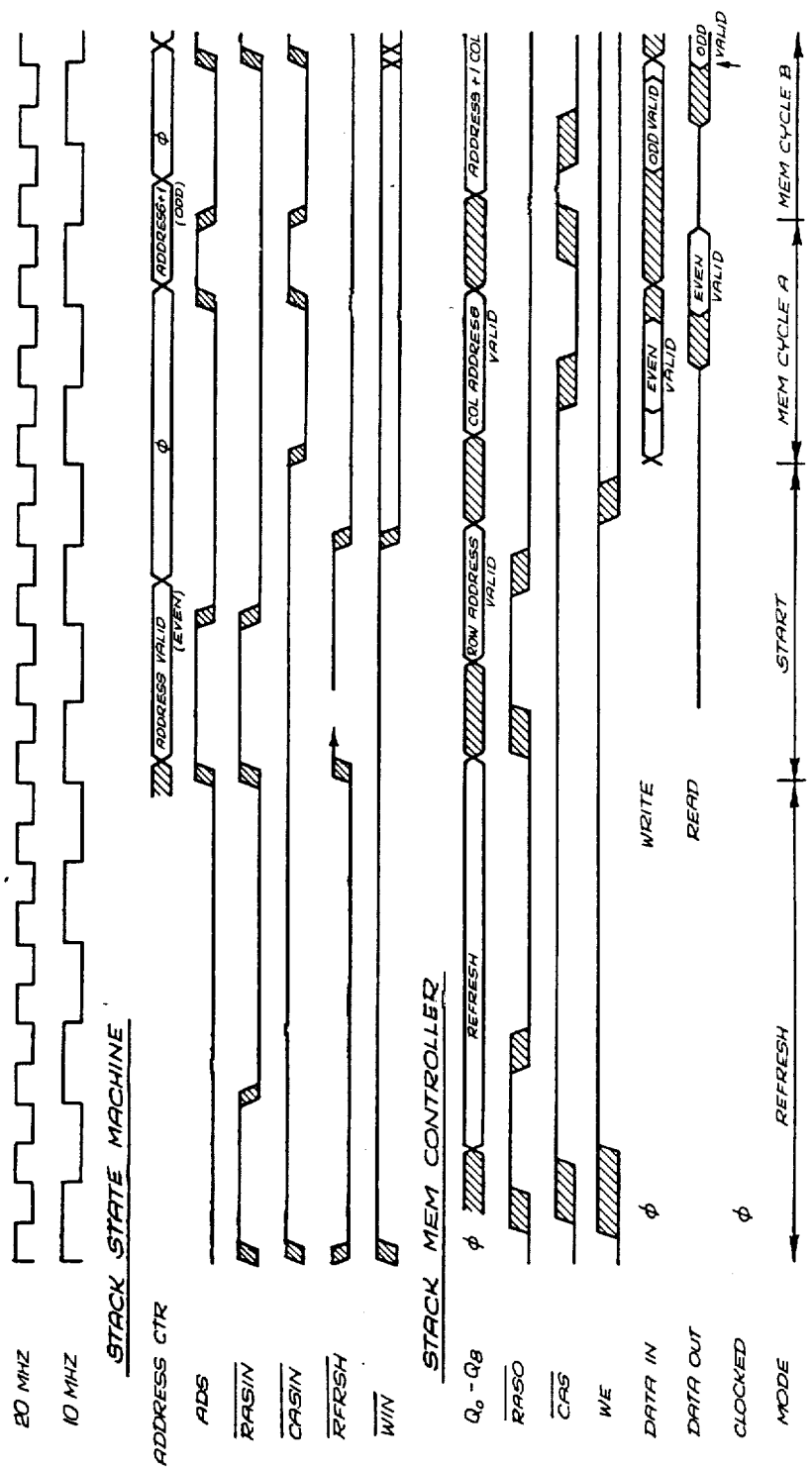
FIG. 23 is a timing diagram illustrating the timing relationship for address, data and control signals of the stack memory controller of FIG. 18.

The timing of the generation of the appropriate input signals for the stack memory controller 332 by the state machine of FIG. 18 is illustrated in FIG. 23. The output signals generated by the memory controller 332 for accessing the stack memory 126 are also illustrated in FIG. 23.

State equations for the major or "mode" states and the minor or "counter" states, illustrated in FIGS. 19-22, are set forth in Appendix A. As shown therein, the mode state variable $\tilde{D}$ is a function of not only the major state variables F-D and the minor state variables C-A, but also the conditions designated "$\overline{END}$, "$\overline{ROLL\ OVER}$" and "$\overline{RESET}$". The "$\overline{END}$" condition occurs when the word counter 342 of FIG. 18 overflows indicating that the designated number of words has been transferred. The "$\overline{ROLLOVER}$" condition occurs when the address counter 330 of FIG. 18 indicates that the end of a page has been reached. The major state variables E and F are also functions of a condition designated "$\overline{STARTBIT}$" which is a function of the condition "$\overline{START}$" which occurs when the microsequencer activates the $\overline{STK\ MEM\ STRT}$ signal to initiate a stack memory transfer. The generation of the input control signals for the stack memory controller 332 and bidirectional stack data buffer 310 are also defined in Appendix A.

Figure 24:
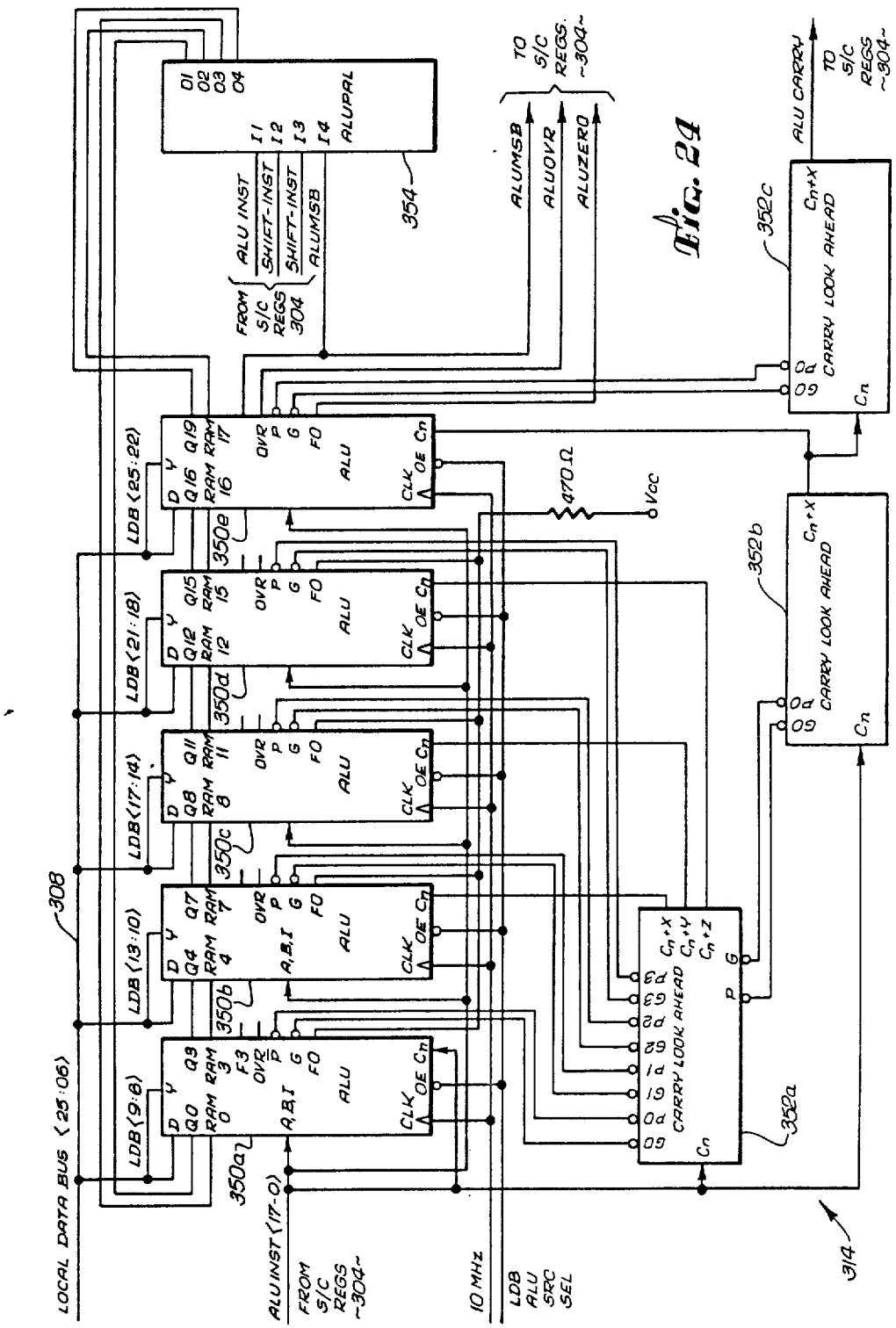
FIG. 24 is a more detailed schematic diagram of the arithmetic logic unit of FIG. 13.

The arithmetic and logic operations for the microsequencer 300 of FIG. 13 are performed by the arithmetic logic unit (ALU) 314. These functions include checking for null pointers, incrementing and decrementing values, checking for stack overflow and testing flag bits. As shown in FIG. 24, the ALU 314 is comprised of five 4-bit ALU (AMD 2901) integrated circuits 350a-350e interconnected in a conventional bit splice design to produce a 20-bit ALU. The operation of the bit splice design of FIG. 24 is explained in greater detail in a data book by Advanced Micro Devices entitled *Bipolar Microprocessor Logic and Interface* (1983) pages 5—5 to 5-31.

The ALU units 350a-350e contain 16 storage registers and a shift unit. The operation of these units is controlled by the microsequencer 300 of FIG. 13. A 17 bit ALU instruction (ALUINST) word from the status/control registers 304 specifies the source register, operation selection, destination register and A and B register selections.

The outputs of the ALU units 350a-350e are connected to the local data bus 308. This output is enabled by a local data bus ALU source register select (LDBA-LUSRCSEL) signal from the status/control registers 304 when data is to be written to the DLM register file 112.

The carry propagation time of the ALU 314 has been reduced by employing a 3-stage carry look-ahead circuit comprising AMD 2902 carry look-ahead integrated circuits 352a-352c. The 3-stage carry look ahead circuit reduces the carry propagation time to a single clock cycle.

A single programmed array logic unit 354 provides a wrap around shift control unit for the ALU 314. Inputs for the PAL unit 314 included bit seven of the ALU instruction (ALUINST) word from the status/control registers 304, which specifies the shift as up or down. The PAL 314 also inputs the ALU most significant output bit (ALU MSB) and a two-bit (S0, S1) shift instruction (SHIFT INST) word which defines the shift as a zero, one, rotate or arithmetic shift. These functions are defined on page 5-22 of the aforementioned AMD data book. Control equations which define the PAL outputs 01-04 of the unit 354 are set forth in Appendix C. The status/control registers 304 of FIG. 13 form a test condition multiplexer which can test any one of the ALU most significant bit (ALU MSB), overflow (ALUOVR), zero (ALUZERO) or carry (ALU-CARRY) flags.

FIG. 25 identifies the data stored in the registers of the ALU's 350a-350e of the illustrated embodiment. The manner in which this data is utilized for the traversal and retraversal operations is explained in greater detail below in connection with the description of the operation of the microsequencer 300.

Figure 26:
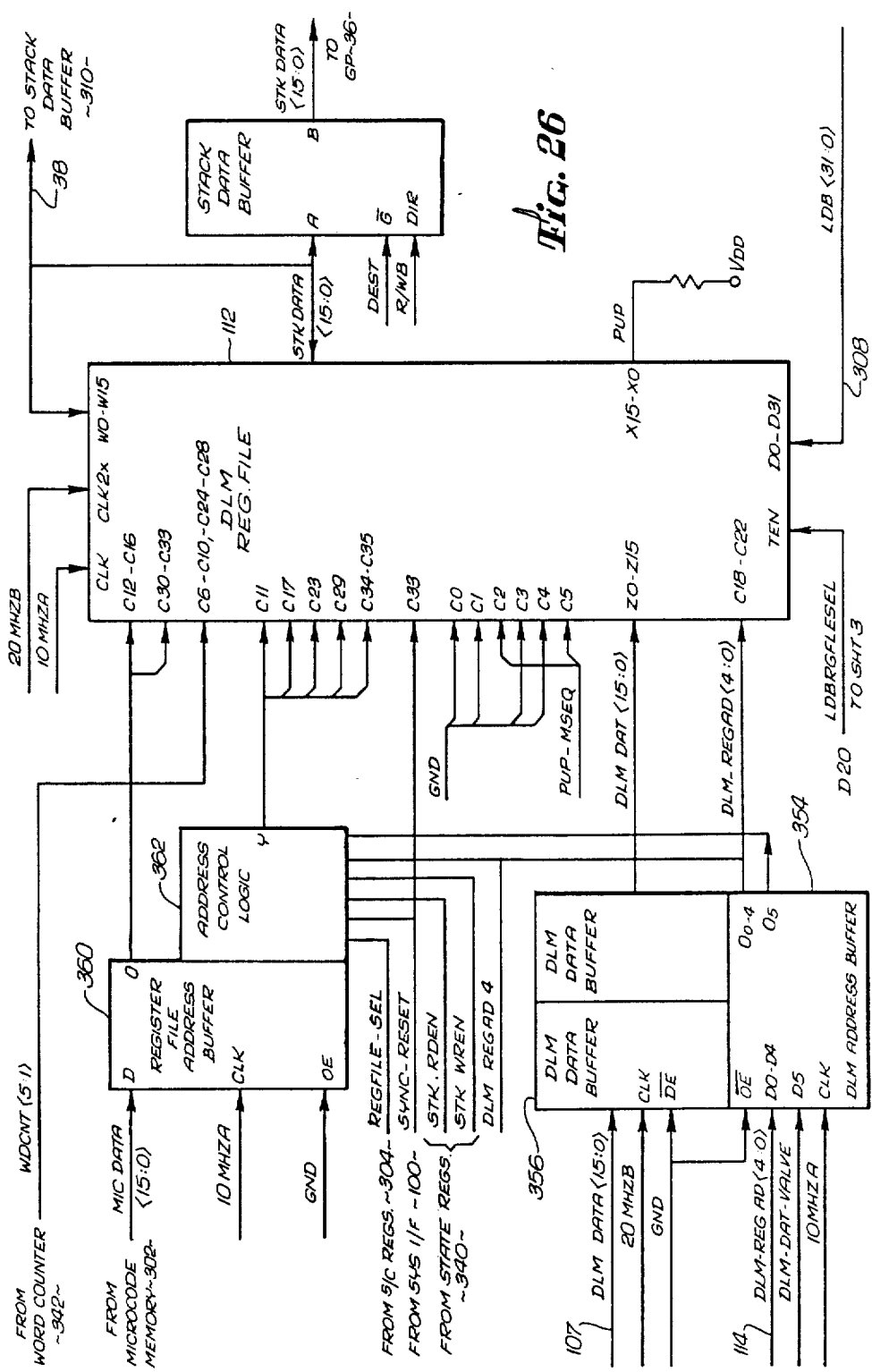
FIG. 26 is a schematic block diagram of the display list memory register file and associated buffer circuits of FIG. 13.

In the illustrated embodiment, the DLM register file 112 of FIG. 13 is implemented with a Weitek 1066 integrated circuit. As shown in FIG. 26, the DLM register file 112 has a write port Z0-Z15 coupled by a data buffer 356 to the DLM data bus 107 of the DLM bus 34. The first 16 words of each packet read from the display list memory 16 during the culling and face processing operations are stored in register addresses 00-0F as shown in FIG. 27 which illustrates the location allocation of the register file 112. The register addresses for the DLM packet words are inputed through a control port C18-C22 coupled by an address buffer 358 to the register address bus 114 from the display list memory 16.

As previously mentioned, the packet words stored in the DLM register file 112 from the display list memory 16 contain pointers to other data. Thus, for example, a segment control block such as that shown in FIG. 4 has pointers to sibling and child segments and to culling and data buffers. Similarly, each culling or data buffer packet has a pointer to the next packet of the buffer. The DLM register file 112 has a 32-bit read/write port D0-D31 coupled to the local data bus 308. Pointers are transferred over the local data bus 308 to the ALU 314 to check for null pointers and to be temporarily stored. Pointers may also be transferred over the local data bus 308 to the DLM interface 306 to initiate a transfer of a packet from the display list memory 16. As the tree traverser traverses through the display list of the display list memory 16, various pointers are stored in the register address locations 10-1D as shown in FIG. 27 in accordance with the traversal algorithm.

The DLM register file 112 also has a 16-bit read port W0-W15 and a 16-bit write port Y0-Y15 coupled to the stack data bus 38. Address pointers checked and stored in the ALU 314 and the tree level (ALU word 0A)

calculated by the ALU 314 are transferred to the stack memory 126 through the DLM register file 112 for segments determined to be potentially visible during the culling process. Data is read from the ALU 314 as a 32-bit word through the read port W0–W15 and is written to the stack memory 126 through the write port Y0–Y15 in a 16-bit time-multiplexed format.

Data from the stack memory 126 is read by the DLM register file 112 through the read port W0–W15. The output of the word counter 342 representing the register addresses for the data read from the stack is coupled to the control inputs C6–C10 and C24–C28 of the DLM register file 112. Words from the stack memory 126 are stored in register address locations 1D–1F as shown in FIG. 27.

The register file 112 is also addressed by the microcode memory 302 of the microsequencer 300 (FIG. 13). Addresses from the microcode memory 302 are buffered by an address buffer 360 and are input by a control port C12–C16 and C30–C33 of the DLM register file 112. Address control logic 362 shown in greater detail in FIG. 28, comprises a plurality of OR gates 363. The address control logic 362 receives the DLM data valid (DLM DAT VAL) control signal and bit 4 of the DLM register addresses from the DLM 16, the stack read enable STK RD EN and stack write enable (STK WR EN) control signals from the state registers 340 of the stack controller of FIG. 18, and the sync reset (SYNCH RESET) control signal and a register file select (REGFILE SEL) control signal from the status/control registers 304 to generate the appropriate register file control signals inputed at the C11, C17, C23, C29, C34–C35 and C33 control signals.

Figure 29A:
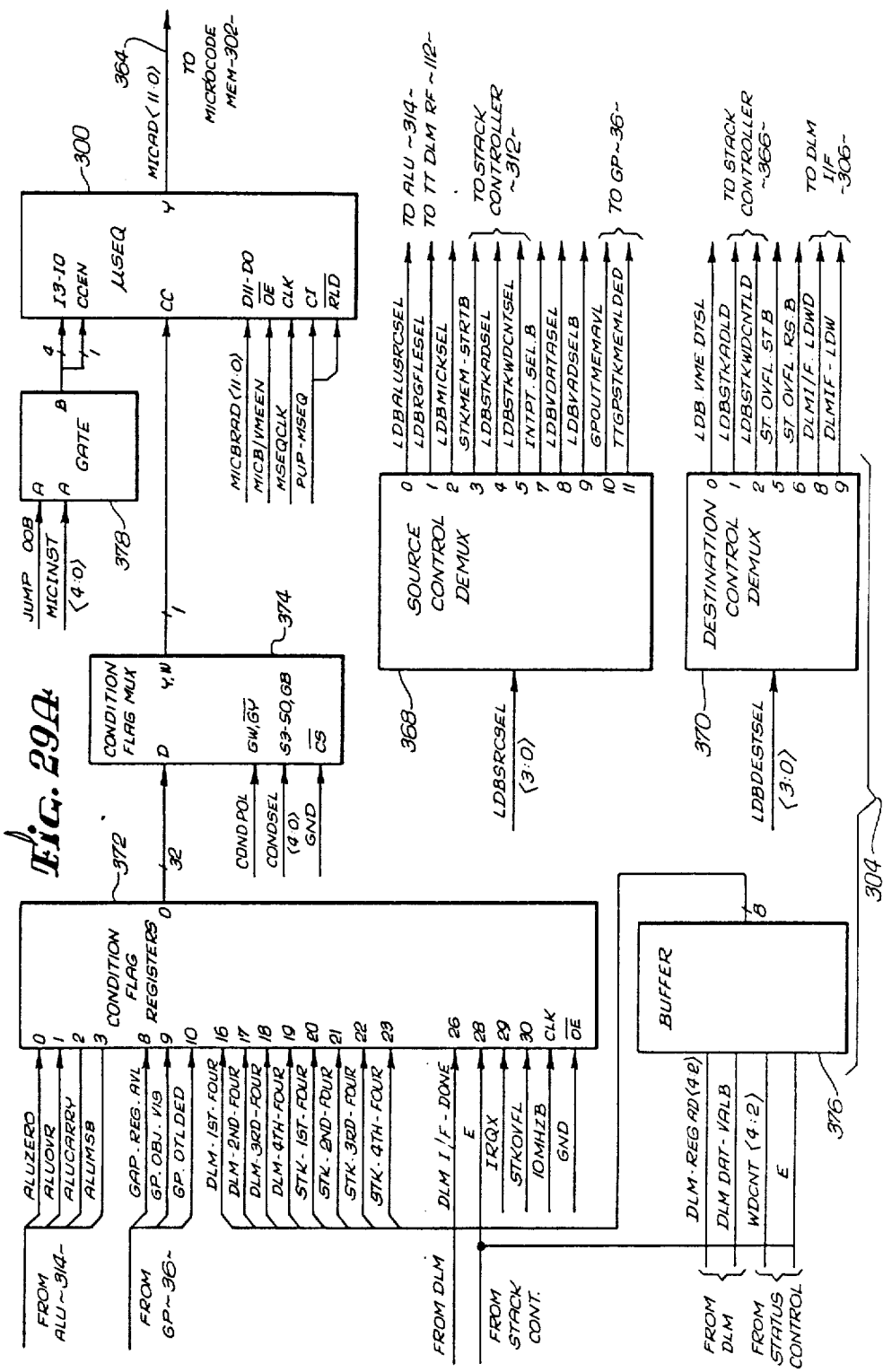
FIGS. 29A and 29B are block diagrams illustrating the microsequencer, status/control registers and microcode memory of FIG. 13.
Figure 29B:
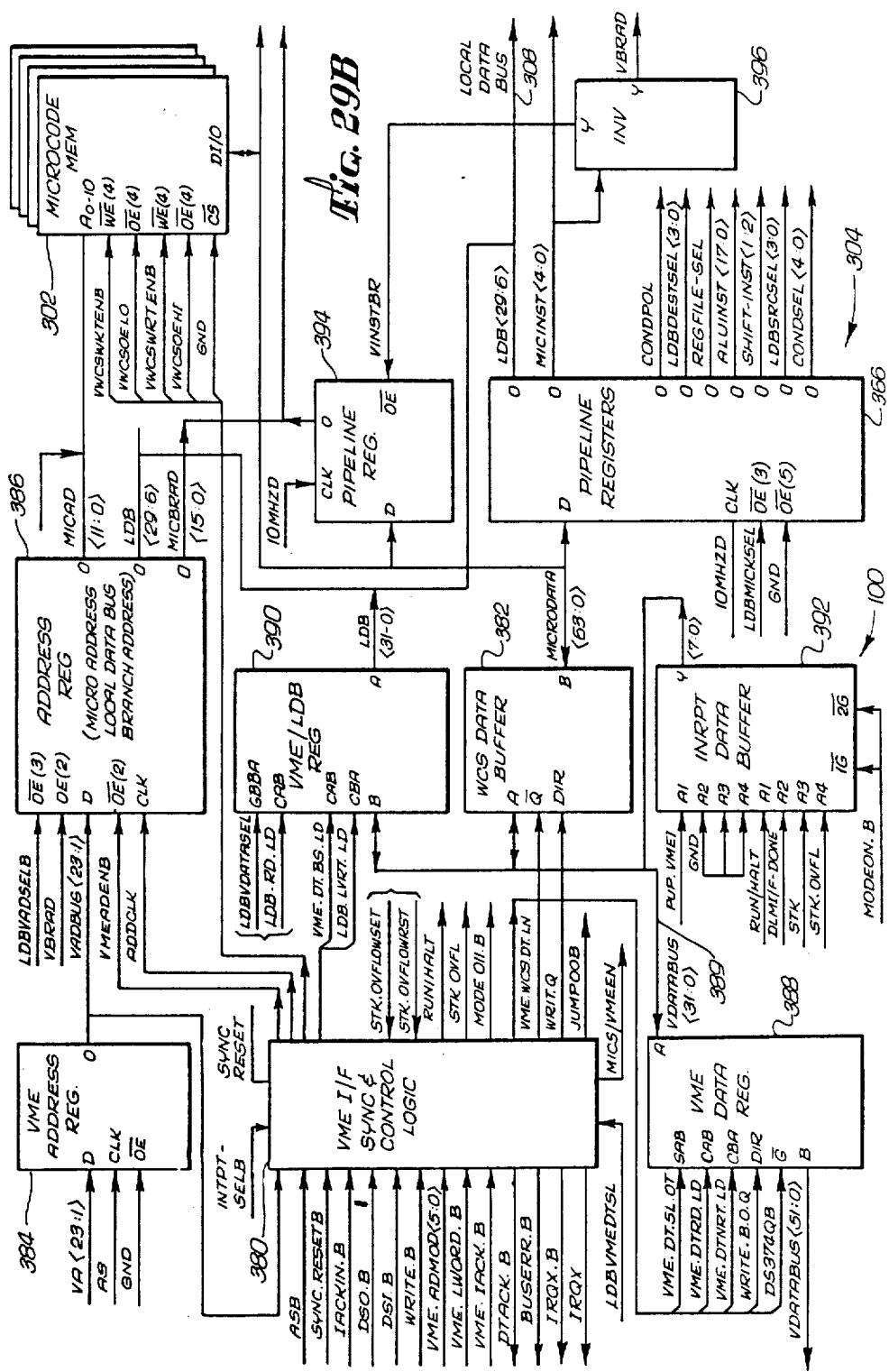

FIGS. 29A and 29B show the microsequencer 300, system bus interface 100, microcode memory 302 and status/control registers 304 in greater detail. The microsequencer 300 of the illustrated embodiment is implemented with an AMD 2910 microsequencer integrated circuit. The status/control registers 304 and the microsequencer 300 are organized in a single level pipeline configuration, the general operation of which is described in greater detail in the aforementioned AMD data book at pages 5-123 to 5-139.

In response to a four bit instruction received at an input port I3-I0 and the internal state of the microsequencer, the microsequencer 300 outputs a 12-bit microcode address (MICAD) on a bus 364 to the microcode memory 302. In the illustrated embodiment, the microcode memory 302 is organized into a 2K × 64 bit static random access memory. The microcode memory 302 is also referred to as a writable control store.

In response to the microcode address from the microsequencer 300, the microcode memory 302 outputs a 64-bit control word to pipeline registers 366 of the status/control registers 304. Through the outputs of the pipeline registers 366, the control word from the microcode memory 302 controls the operation of the tree traverser 32.

The pipeline registers 366 have 24 output lines (LDB (29:6)) connected to the local data bus 308. Data may be loaded onto the local data bus 308 from the pipeline registers 366 upon the activation of a local data bus microcode select (LDBMICKSEL) control signal from a source control demultiplexer 368 of the status/control register 304. The source control demultiplexer 368 has 12 output lines (0–11), each of which may be activated one at a time. Many of the control signal outputs of the source control demultiplexer 368 enable a particular device such as the pipeline registers 366 to output data onto the local data bus 308. The particular output line activated is determined by four bits of the pipeline register output control word designated the local data bus source select (LDBSRCSEL (3:0)) in FIGS. 29A and 29B.

A destination control demultiplexer 370 enables a particular device to input the data from the local data bus 308. The particular output enabled of the destination control demultiplexer 370 is selected by the local data bus destination select (LDBDESTSEL (3:0)) bits of the control word output of the pipeline registers 366.

The status/control registers 304 further include condition flag registers 372 which input condition and flag signals from the various devices of the tree traverser 32 and also from the geometry processor 36. These signals include the ALU zero (ALUzero) ALU overflow (ALU OVR), ALU carry (ALUCARRY) and ALU most significant bit (ALUMSB) control signals from the ALU 314 of FIG. 24. The microsequencer 300 monitors these signals to control the execution of the microprogram. The condition and flag signals of the registers 372 are read one at a time by the microsequencer 300 through a condition flag multiplexer 374. The particular signal passed to the microsequencer 300 is selected by the condition select bits (CONDSEL) of the microcode control word of the pipeline registers 366. Each signal from the condition flag registers 372 may be inverted (or not inverted) in accordance with the condition polarity (CONDPOL) bit of the microcode control word output of the pipeline registers 366.

The ALU instruction word defining the source, operation, destination, and A register and B register selections, is provided by the ALUINST bits of the microcode control word of the pipeline registers 366. Bit seven of the ALU instruction word determines whether the shifts are down or up. The ALU shift instruction (SHIFT INST) word which defines the shift type (zero, one, arithmetic or rotate) is also provided by the microcode control word of the pipeline registers 366. The microsequencer 300 places the output of the ALU 314 on the local data bus 308 by activating the local data bus ALU source selection (LDBALUSRCSEL) control signal output line of the source control demultiplexer 368 of the status/control registers 304.

The microsequencer 300 initiates a data packet read from the display list memory 16 by supplying the DLM starting address from either the DLM register file 112 or the ALU 314, over the local data bus 308 and to the DLM interface 306. The microsequencer 300 also activates either the display list memory interface load without geometry processor copy (DLM I/F LDWO GP) control line or the display list memory interface load with geometry processor copy (DLM I/F LDW GP) control line of the destination control demultiplexer 370, depending upon whether the packet is to be copied to the geometry processor. The data packet transfer is monitored through the condition flag registers 372 and the condition flag register multiplexer 374. The three most significant bits of the DLM register file addresses (DLM REGAD) and the DLM data valid ($\overline{\text{DLM DAT VAL}}$) signals provided by the display list memory 16 are input via a buffer 376 to the condition flag registers 372. The DLM data transfer complete control signal (DLMI/F DONE) generated by the DLM interface 306 and the mode state variable "E" generated by the state registers 340 of the stack controller 312 are input directly by the condition flag registers 372.

To transfer data to or from the stack memory 126, the microsequencer 300 first loads the starting stack address into the address counter 330 of the stack controller 312 of FIG. 18. The stack address is calculated by the ALU 314 and is loaded from the local data bus 308 upon the activation of the local data bus stack address load (LDBSTKADLD) control signal from the destination control demultiplexer 370. The microsequencer 300 also loads the control word defining the number of words to be transferred, the destination and copy mode into the stack control word register 336 upon the activation of the local data bus stack word counter load (LDBSTKWDCNTLD) control line of the destination control demultiplexer 370.

For transfers from the geometry processor output register file 122 (FIG. 8) to the stack memory 126, the geometry processor 36 activates a geometry processor output register loaded (GP OTLDED) signal to the condition flag registers 372. The actual transfer is initiated by the activation of the stack memory transfer start (STKMEM STRT) control output line of the source control demultiplexer 368. Once the transfer is complete, the tree traverser 32 activates the geometry processor output register available (GPOUTMEMAVL) control output line of the source control demultiplexer 368.

Data is transferred from the geometry processor only if the object of the segment is indicated as potentially visible on the culled object visible (GP OBJ VIS) control line from the geometry processor 36 to the condition flag register 372. During face processing, stack data is transferred to the geometry processor stack register file 120. Once the register file 120 is loaded, this fact is communicated to the geometry processor 36 by the activation of the TT GP STK MEMLDED control output line of the source control demultiplexer 368.

To read back the address output of the address counter 330, the local data bus stack address select (LDBSTKADSEL) output control line of the source control demultiplexer 368 is activated. Activation of the local data bus stack word counter select (LDBSTKWDCNTSEL) control signal output line of the source control demultiplexer 368 allows the control word output of the control word register 336 to be read back over the local data bus 308.

To address the DLM register file 112, the register file select (REGFILE SEL) control line output from the microcode pipeline registers 366 to the address control logic 362 of FIG. 26 is activated. The address is provided by 16 bits of the microcode control word data bus (MICDATA) from the microcode memory 302. The address is supplied 2 cycles before the associated data is available. To transfer data to or from the DLM register file 112 over the local data bus 308, the local data bus register file select (LDBRGFLESEL) control output line of the source control demultiplexer 368 is activated.

Five bits of the microcode control word of the pipeline registers 366 contain the next microcode instruction (MICINST) for the microsequencer 300. In response to the microcode instruction word received through a logic gate 378, the microsequencer 300 outputs the next microcode address (MICAD) to the microcode memory 302. The addressed microcode control word is read from the microcode memory 302 and is stored in the pipeline registers 366 to provide the next set of control signals for the tree traverser operation.

A program design language description of the tree traverser microcode stored in the microcode memory 302 is set forth in Appendix B. The tree traverser microcode comprises a "Main" program and seven subroutines or procedures. Comments to the microcode are given in the form of /*comment*/.

The first step of the Main program is to initialize the registers and flags. As shown in FIG. 25, the ALU data storage register word OC has a "reverse and process" flag (bit 1) which is set if the tree traverser is to switch to the face processing mode. In addition, a "process face" mode bit (bit 19) is set if a particular face is to be processed. These are both initially reset at the beginning of the culling traversal of the display list.

The first segment to be traversed is the viewport segment. The viewport is initialized by transmitting the viewport packet of the viewport segment to the display processor 40 (FIG. 1).

The DLM register file 112 (FIG. 13) has a number of register locations 10-1B (FIG. 27) for storing segment and buffer pointers during the culling traversal and face processing retraversal of the display list. In DLM register address locations 10-13, the sibling, child, culling buffer and header block pointers are stored for the last segment object determined to be visible (or potentially visible) during the culling procedure. Initially, however, the pointers of the first segment (i.e. the viewport segment) are loaded into the last visible object storage registers.

The address counter 330 of the stack controller is a stack pointer pointing to the current memory location in the stack memory 126. If the stack pointer returns to the first location of the stack memory 126, this indicates that all segments (tree objects) have been traversed and retraversed, exhausting the display list. If all objects of the display list have been exhausted, flag bit 17 of the ALU word OC (FIG. 25) is set. The Main program checks this "tree objects exhausted" flag bit and performs the "do loop" routine until the tree objects are exhausted (that is, until the tree objects exhausted bit is set).

Another do loop routine is nested within the tree objects exhausted do loop. The routine is repeated until the reverse and process mode bit (ALU word OC, bit 1) is set. This mode bit is set when a visible segment having no sibling or child segments is encountered during the culling traversal. Then, the tree traverser switches to the face processing retraversal of the display list. Assuming that the reverse and process face mode bit has not been set, the Main program checks the stack pointer to determine if the maximum capacity of the stack has been exceeded indicating a "stack overflow" condition. If not, the Main program transfers control to the "Object Cull" Procedure set forth in appendix B.

The ALU 314 maintains another flag bit (ALU word OC, bit 3) which indicates whether "the last object was searched". The sibling, child, culling buffer and header block pointers for a segment to be culled are stored in the "last object searched" register address locations 14–17, respectively, of the DLM register file 112 of FIG. 27. This segment is designated the "last object searched". If the segment is subsequently determined to be potentially visible during the culling process, these pointers are transferred to the "last visible object" locations of addresses 10–13 of the DLM register file 112. The segment is then referred to as the "last visible object".

If the "last object was searched" flag is not set, the Object Cull Procedure transfers control to the "Last Searched Object Select" procedure of Appendix B. If the last visible object has a sibling segment (i.e. sibling pointer is valid), the last Searched Object Select procedure obtains the sibling pointer from the last visible object register (address 10) and stores the sibling pointer in the last object searched header block pointer register (address 17) of FIG. 27. This header block pointer of the sibling segment is transferred to the DLM interface 306 (FIG. 13) to initiate a transfer of the header block packet to the DLM register file 112. From this header block packet, the sibling, child and culling buffer pointers (FIG. 4) of the sibling segment are copied to the appropriate last object searched pointer registers (addresses 14–16) of FIG. 27. The tree traverser then transmits the culling buffer pointer to the DLM interface 306 to initiate a transfer of the sibling segment culling buffer packets to the geometry processor 36 for culling. Next, the "last object was searched" flag (bit 3, ALU word OC) is set and a "last searched object sibling/child" flag (ALU word OC, bit 5) is set to indicate that the last object searched was the sibling of the last visible object.

If the last visible object does not have a sibling segment but does have a child segment, the tree traverser fetches the header block of the child segment and then transfers the culling buffer of the child segment to the geometry processors 36 for culling, storing the appropriate pointers of the child segment in the last object searched registers (14–17).

If the last visible object does not have any sibling or child segments, the tree traverser has reached the end of a culling traversal path and will set the process face mode bit (ALU word OC, bit 19). In addition, the "last object was searched" flag and a "next object to be searched" flag (bits 3 and 4, respectively) are reset.

The Last Searched Object Select procedure then returns control back to the Object Cull procedure of appendix which in turn returns control to the Main program. Assuming that the stack has not overflowed, the do loop again calls the Object Cull procedure.

With the last object having been searched (segment culled), the tree traverser of the Object Cull procedure determines whether the geometry processor 36 has completed the culling process of the last object searched and stored the segment attribute data in the output register file 122 of the geometry processor 36 (FIG. 8).

If the geometry processor output is not available, the tree traverser determines whether the pointers of the next object to be searched have been loaded into the next object searched pointer registers 18-1B of FIG. 27. If not, the Next Object Searched procedure of page B-7 of appendix B is called, which updates (line 5) the "next object searched" header block pointer (DLM register file address 1B) to the "last object searched" sibling pointer (DLM register file address 14) if the sibling pointer is valid, that is, if the "last object searched" has a sibling. If the "last object searched" segment does not have a sibling, the "last object searched" child pointer is copied to the "next object searched" header block pointer, if valid.

The next object searched header block pointer provides the starting address for the header block of the next segment to be traversed. This header block pointer is transferred to the DLM interface 306 (FIG. 13) to initiate a transfer of the header block to the DLM register file 112. From the header block packet, the sibling, child and culling buffer pointers are copied to the appropriate next object searched register address locations 18-1A respectively of FIG. 27. The "next object searched" flag (ALU word OC, bit 4) is also set indicating that this segment has already been searched. If the last object searched does not have either a valid sibling or child pointer, the tree traverser culls the appropriate registers of the next object searched registers and sets the "face to be processed" flag bit. This completes the "Next Object Searched" procedure.

Referring back to the Object Cull procedure, if the geometry processor output is available, the tree traverser tests the geometry processor culled object visible (GP OBJ VIS) control output line 124 from the geometry processor to the condition flag register 372 (FIG. 29A), to determine whether the last object was determined by the geometry processor 36 to be potentially visible during the culling procedure. If so, the tree traverser begins the "Unconditional Update" procedure set forth on page B-6 of appendix B. In this procedure, after incrementing the tree level pointer if the last searched sibling/child flag is set to "child", the first step is to store the last object searched pointers in the stack memory 26 as shown in FIG. 9. Also, the last object searched pointers are transferred to the last visible object pointer registers 10-13 of FIG. 27. If the last object searched was a sibling, the geometry processor transfers the attribute data from the geometry processor output register file 122 to the stack memory 126 (FIG. 8) only. Alternatively, if the last object searched was a child segment, the data is also stored to the geometry processor stack register file 120 as well. As previously mentioned, the data in the stack register file 120 is used for inheritance of attributes.

The tree traverser then resets the last object searched pointer registers 14-17 (FIG. 27). If the pointers of the next object to be searched are available and valid, the tree traverser stores (line 19) the next object searched pointers (register addresses 18-1B) into the last object searched pointer registers (addresses 14-17). After resetting the next object searched flag (ALU word OC, bit four) the culling buffer of the new last object searched is sent to the geometry processor 36.

Control returns to the "Object Cull" procedure. If the last searched object was reported to be invisible by the geometry processor 36, that segment and all its progeny are ignored and are not further processed. Hence, the tree traverser in the Object Cull procedure replaces the sibling pointer (DLM register file location 10) of the last visible object with the sibling pointer of the last searched object, if the last searched object was a sibling. Otherwise, the child pointer of the last visible object is replaced with the sibling pointer of the last searched object. In addition, the last object searched visible flag is reset.

If the next object in line to be traversed has been searched, the last searched object pointer registers are updated with the next object searched pointers if the next object is the sibling of the last searched object. However, if the next object is the child of the last searched object, the next object is not culled since its parent object was determined to be invisible. Also, the face process flag is set. The Object Cull procedure returns control to the Main program.

Unless the stack overflows, the main program will continue looping through the do loop, culling the segments of the display list until the face process bit is set, indicating that the tree traverser has encountered a segment having no sibling or child segments. At that point, the Main program invokes the "Reverse and Process Face" procedure, by which the tree traverser retraverses the display list, face processing the potentially visible objects of the culled segments of the traversal path.

If during the culling procedure, the stack memory 126 does overflow, the Main program sets an overflow flip flop and interrupt request flip flop of the system bus interface 100 (FIG. 13). These flip flops are set by activating a stack overflow set $\overline{\text{ST OV FL ST}}$ control output line of the destination control demultiplexer 370 of FIG. 29A. The tree traverser then branches to an infinite loop to await action by the terminal processor 12 in response to the interrupt request by the tree traverser 32.

Briefly, the face processing procedure comprises reloading the attributes and transformation matrix for the last culled potentially visible object from the top of the stack into the geometry processor stack register file 120 (FIG. 8), and transferring the data buffer packets for the object into the geometry processor DLM register file 115 in order for the geometry processor 36 to face process the object. After face processing is completed for the last culled object, the remaining culled objects stored on the stack are similarly processed by the Reverse and Process Face routine in the reverse order in which they were culled and stored on the stack, that is, on a "first-in, last-out" basis. Face processing of the culled potentially visible objects continues until a stack object having a valid child pointer is encountered. At that point, a "child to be culled" flag is set and the Reverse and Process Face routine is exited, returning control to the Main program.

The Reverse and Process Face procedure is set forth on pages B-9 to B-12 of Appendix B. In the first step, the "Pop Stack" procedure of page B-13 is invoked. The Pop Stack procedure transfers the first four words containing the child pointer, object header block pointer, tree level and flag word (see FIG. 9) of the object at the top of the stack to the DLM register file 112 (FIG. 8). The flag word is transferred to the ALU 314 to determine if the object was determined to be potentially visible during the culling procedure. If the flag word indicates that the object is potentially visible, the tree traverser transmits the object header block pointer to the DLM interface 306 (FIG. 13) to initiate the transfer of the header block to the DLM register file 112. If the header block has a valid data buffer pointer, the tree traverser transfers the attributes and transformation matrix for the object from the stack memory 126, over the stack bus 38, to the geometry processor 36 for the face processing operation of the object. If the object header block does not have a valid data buffer pointer indicating that the segment has no primitives, the stack address (ALU word OD) is decremented to point at the next object on the stack. Similarly, if the object flag word indicates that the object was determined to be locally invisible, the stack address is decremented. If decrementing the stack address will cause an underflow, the face processing procedure has returned to the top of the stack and the "tree exhausted" flag is set. This completes the Pop Stack procedure returning control to line 7 of the Reverse and Process Face procedure.

If the object header block is an invocation control block, the partner pointer (word 4, FIG. 6) is set to null. If the data buffer pointer is valid indicating that the object has data primitives and the local visibility flag (word two of the culling buffer attribute packet) indicates that these primitives are potentially visible, the tree traverser initiates the transfer of the data packets stored in the display list memory for the object. The tree traverser transmits the data buffer pointer to the DLM interface 306 which transmits the first 16 words of the packet to the DLM register file 112 and to the DLM register file 115 of the geometry processor 36. If the packet is 32 words in length, the additional 16 words are transferred to the DLM register file 115 of the geometry processor 36. To transfer the next packet from the data buffer, the tree traverser extracts the next packet pointer from the first packet stored in the tree traverser DLM register file 112 and transfers the pointer to the DLM interface 306 to initiate the transfer of the next packet. This process continues until the next data buffer pointer is null indicating no additional packets in the data buffer for the object. Using the data packets from the display list memory 16 and the attributes and transformation matrix from the stack memory 126, the geometry processor 36 face processes the object. The tree traverser then resets the child to be culled (ALU word OC, bit 2) and the reverse and process (ALU word OC bit 1) flags.

Continuing the tree traverser next determines whether the next object on the stack should be face processed (if visible), or skipped (if invisible), or whether the tree traverser should revert to the culling mode. The tree traverser first calculates the stack address of the next object on the stack. The tree level and child pointer for this next object is transferred to the ALU 314. If the ALU determines that the tree level of the current object (the previously face processed object) is not equal to the tree level of the next stack object, then the next stack object is the parent of the previously processed object (current object). If the next stack object is not an invocation segment, the reverse and process face flag is set and the last object searched child and last object searched sibling pointers are nulled to "trick" the tree traverser into re-entering the "Reverse and Process Face" routine to process the face of the next stack object. (It will appear to the tree traverser that it has encountered a segment having no child or sibling segments and will then automatically enter the "Reverse and Process Face" routine as previously described.)

If the current object tree level is equal to the next stack object tree level, the objects are siblings. If the next stack object has a valid child pointer, the tree traverser reverts to the culling traversal (to cull the child segment of the next stack object) by setting the last object searched sibling pointer to null, setting the last object searched child pointer to the child pointer of the next stack object, and setting the child to be culled flag. If the next stack object does not have a valid child pointer, the next stack object is face processed by setting the flags and pointers to reinvoke the "Reverse and Process Face" procedure as described above.

The tree traverser will continue re-invoking the Reverse and Process Face routine, face processing each culled and visible segment, until a visible stack object with a valid child pointer is encountered (or the stack is exhausted). At that point, the Reverse and Process Face routine will be exited and unless the stock is exhausted, the tree traverser will revert to the culling traversal, starting at the child of the stack object.

Referring now to FIG. 13, the system bus interface 100 of the tree traverser 32 responds to external requests from the system bus 18. These requests originate from the terminal processor 12 in the illustrated embodiment. The system bus interface 100 decodes the address lines, address modifier lines and handshake signals of the system bus 18 to determine the required tree traverser operation and to develop the appropriate system bus handshake signals of the tree traverser. In that the system bus 18 is a VMEbus, the system bus interface 100 permits the tree traverser 32 to perform the functions of a VME slave and VME interrupter.

The hardware and handshake formats of the system bus interface 100 conform to the standard VME interface requirements as stated in the aforementioned VMEbus specification manual. The system bus interface 100 implements the A24, D32, and long word transfer VME options. In the illustrated embodiment, the system bus interface 100 does not implement the sequential addressing mode nor short word transfers. The tree traverser 32 recognizes the recommended non-I/O address modifier codes (09, 0A, OD, and OE) during system bus requests.

The VME initiated requests or instructions to the tree traverser 32 can be divided into three categories. Each category contains instructions which are implemented in a similar fashion. The three categories are:

1. microcode memory or writable control store (WCS) read and write operations;
2. microsequencer halt, microsequencer restart and tree traverser reset operations; and
3. microsequencer start operations.

At system startup, the terminal processor 12 issues a series of WCS write instructions which pass microcode from the system bus 18 into the microcode memory 302 of the tree traverser. As shown in FIG. 29B, a microcode store/VME enable (MICS/VMEEN) control line output of a VME interface sync and control logic 380 of the interface 100 is coupled to an input of the microsequencer 300 of FIG. 29A. When the MICS/VMEEN control line is active, the address outputs of the microsequencer 300 are forced into a high impedance state which allows the system bus interface 100 to gain control of the microcode address (MICAD) bus and to transfer microcode over the microcode data (MICDATA) bus to the microcode memory 300. The read and write writable control store instructions immediately halt the microsequencer 300 if it is running. The VME system bus write signal (WRITE) defines the direction of data flow between the microcode memory 302 and a WCS data buffer 382 coupled to the system bus 18.

The VME interface sync and control logic 380 is implemented by a state machine comprising a plurality of programmable array logic devices (PALs). The state machine decodes the interrupt and slave request instructions from the terminal processor 12, which are transmitted over the VME address (VA) bus of the system bus 18. The state machine of the VME interface sync control logic 380 further decodes local status signals from within the control logic 380 and generates local signals to control the interface 100 and the microsequencer 300.

The VME address (VA) information from the system bus 18 is latched into a VME address register 384 when the VME address strobe (AS) rises. The address is then enabled onto the VME interface address bus (VADBUS) from which it is accepted into a plurality of address registers 386 for the microcode address (MICAD) bus, the local data bus (LDB) and a microcode branch address (MICBRAD) bus.

Incoming VME data from the VME data bus (VDATABUS) is latched into bidirectional bus transceiver buffers 388 and enabled onto the VME interface internal data bus 389. From the internal data bus 389, data is accepted into the WCS data buffer 382 or a local data bus (LDB) register 390. During interrupts, the tree traverser status flags such as DLM I/F DONE and STK OVFL are available to the data bus 389 from an interrupt data buffer 392. The WCS data buffer 382 and the local data bus register 390 are bidirectional so that data from the tree traverser 32 may also be made available to the system bus 18.

Figure 30:
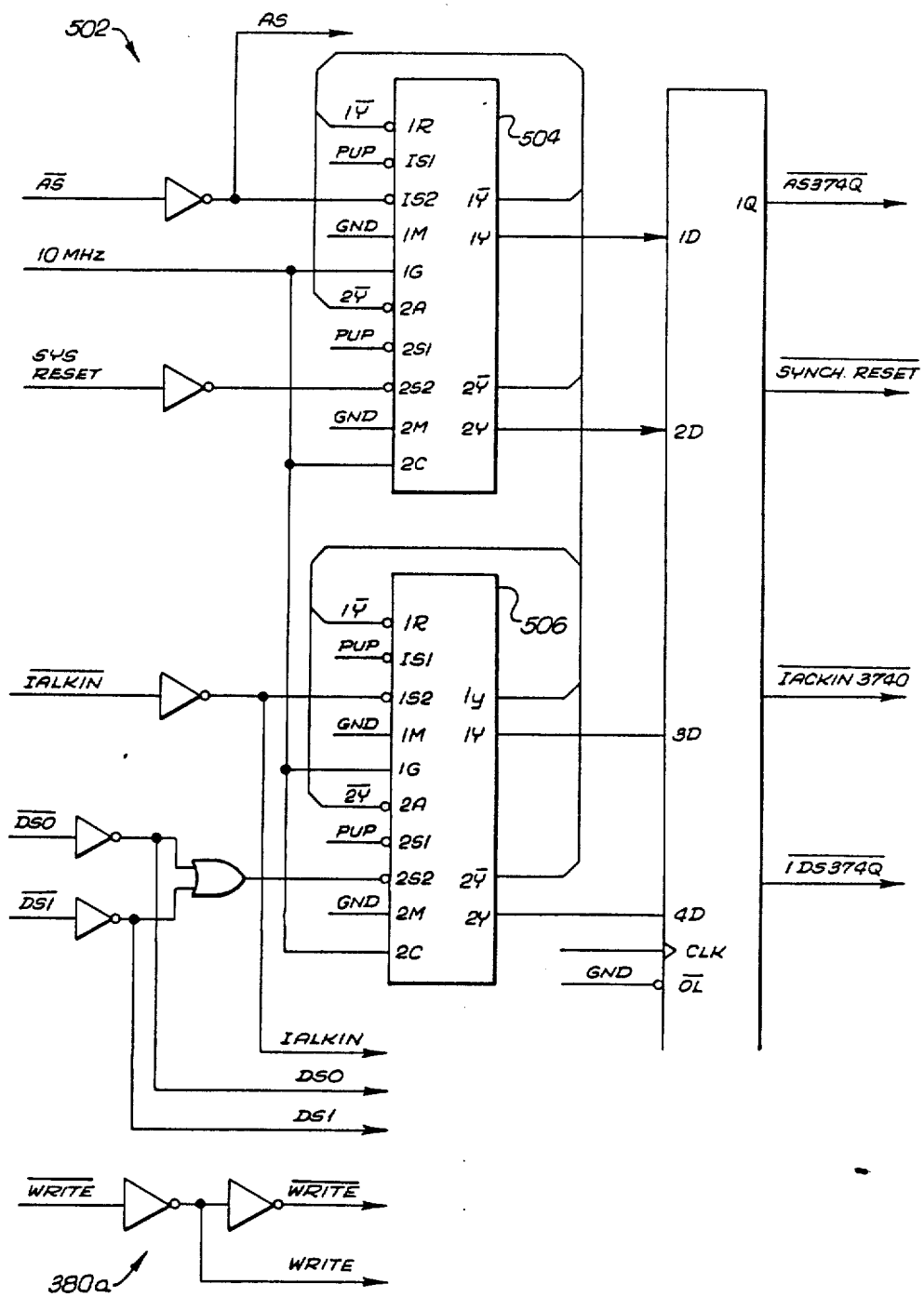
FIG. 30 is a schematic diagram of a synchronizer circuit of the system bus interface of FIG. 13.

The external VME data and address buses of the system bus 18 are asynchronous with respect to the 10 megahertz clock signal which drives the tree traverser 32. The VME interface sync and control logic 380 includes a pulse synchronizer circuit 380a (FIG. 30) which synchronizes the asynchronous VME handshake signals of the VME system bus 18 to the VME interface state machine. As shown in FIG. 30, the synchronizer circuit 380a includes a plurality of inverters 502, a pair of 74120 pulse synchronizer integrated circuits 504 and 506, and an AS 374 register integrated circuit 508 using an inverted clock. That is, the register 508 is clocked at the midpoint of the clock cycle. The synchronized signals are not inverted but are delayed for a minimum of 50 nanoseconds after the original signal is received. The synchronizer circuit 380a utilizes the VMS address stable (AS), combined data strobes (DS0 and DS1) and interrupt aknowledge input (IACKIN) signals. The associated synchronized output signals are designated with the suffix "374Q."

As previously mentioned, the writable control store read/write instructions halt the operation of the microsequencer 300. The state machine of the control logic 380 halts the microsequencer by resetting the microsequencer clock flip-flop 514 of FIG. 38, thereby disabling the microsequencer clock signal MSEQCLK. The DLM interface 306 and the stack controller 312 of FIG. 13 are not halted but instead are permitted to continue to prevent data loss or corruption in the stack and the DLM interface due to interrupted cycles.

The microsequencer 300 is left in a halted condition at the end of a writable control store (WCS) operation. The microsequencer 300 is restarted by issuing a start or restart instruction.

Figure 38:
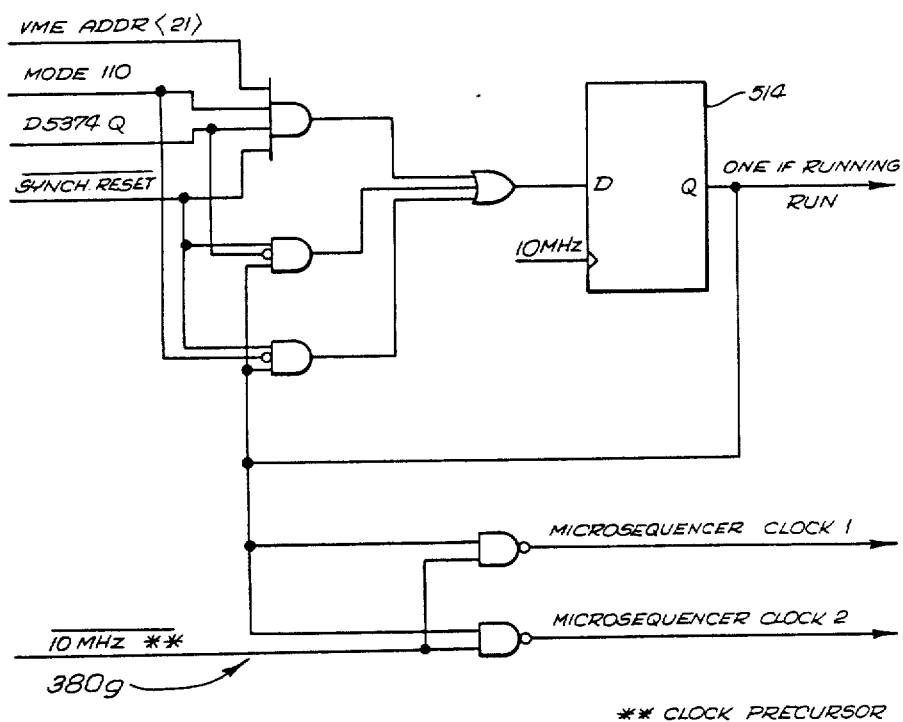
FIG. 38 illustrates a portion of the sync and control logic of FIG. 29B, for controlling the microsequencer clock line.

The microsequencer restart and halt instructions set and reset, respectively, the microsequencer clock flip-flop (FIG. 38). The tree traverser reset instruction activates the reset (SYNC RESET) signal line of the tree traverser 32. Both the VME reset (SYS RESET) signal and the tree traverser reset instruction halt the clock signal (MSEQCLK) of the microsequencer 300.

The third category of instructions includes the start instructions which in the illustrated embodiment are quite similar in operation. The start instructions enable the system bus 18 to read or write to various locations of the tree traverser 32. These start instructions include operations to read from or write to the stack memory 126; read from or write to the stack address counter 330 (FIG. 18) of the stack controller 312; read from the stack word counter 342 or write to the control register 336 of the stack controller 312 (FIG. 18); read from or write to the registers of the ALU 314 (FIG. 13); read from or write to the local data bus status registers; read from or write to the local data bus flag registers; read from or write to the DLM register file 112 (FIG. 13) initiate the culling/face processing and pick/ident operations; read the DLM interface 306 status; and start the microsequencer 300 at a new address.

In executing a microsequencer start instruction, the VME interface state machine sets the microsequencer clock (MSEQCLK) flip flop to enable the microsequencer clock signal (MSEQCLK). The VME state machine also stores the VME address and makes it available to the local data bus (LDB). If a write start operation is selected, the VME data word from the VME data bus (VDATABUS) is also stored and made available to the local data bus.

For example, an important write start instruction is the instruction which initiates the culling/face processing and pick/ident operation. In this instruction, the VME data word made available to the local data bus contains the display list memory root segment packet address and is employed by the DLM interface 306 to initiate these operations. If a read operation is selected, any data placed in the VME data register 390 from the local data bus will be returned to the VME data bus of the system bus 18.

In a start instruction, the state machine sets a control (JUMP000) output line to the gate 378 which forces a jump to the microsequencer location 000H, and places the least significant bits of the VME address onto the microbranch address (MICBRAD) bus to the microsequencer map register. The microsequencer 300 then performs a map directed jump instruction (microsequencer opcode 2) to an instruction service routine. This routine is stored in the microcode memory at the address identified by the 12 least significant bits of the VME address supplied by the microbranch address (MICBRAD) bus. This address is sufficient to select any tree traverser microcode location.

The microbranch address can also be supplied by a second pipeline register 394 which stores a portion of the microcode word from the microcode memory 302. The particular source of the microbranch address is selected by the microcode instruction (MICINST) output of the pipeline registers 366, which is provided to an inverter 396. The inverter 396 in turn has two outputs, VBRAD and VINSTBR, which alternatively enable the outputs of the address register 386 and the pipeline register 394, respectively.

One special start instruction is a trap instruction which forces the microsequencer 300 to loop at one location and return to the VME data bus the address at which it is looping. The trap instruction selects the multipurpose field, which contains the branch location, as a data source. The VME data register 390 is also selected as a destination. In this manner, the trap instruction returns the current address of the microsequencer as a result.

Figure 31:
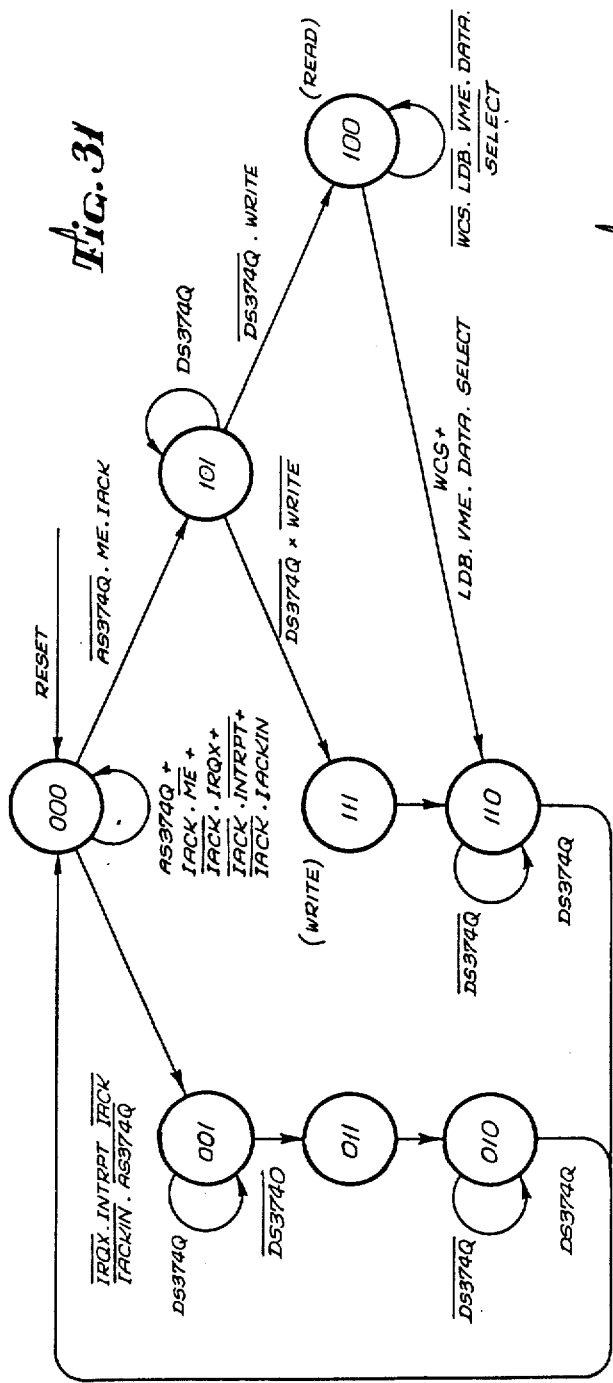
FIG. 31 is a state transition diagram representing the external slave and interrupt request cycles of the state machine of the sync and control logic of FIG. 29B.

The VME interface state machine of the VME interface sync control logic 380 cycles through as many as four states in responding to a VME slave request and states for an interrupt request. A state diagram representation of the external VME slave and VME interrupt request cycles is shown in FIG. 31. As previously mentioned, the state machine of the the sync and control logic 380 of FIG. 29B may be implemented with programmable array logic circuits (PALs). Eight logic states represented in the state transition diagram of FIG. 31 are each assigned an individual flip-flop 510a-510h in the PAL implementation of FIGS. 32 and 33. At initialization, the idle state (000) flip-flop 510a is preset. All other flip flops 510b-510h are reset. Thus, the logic state one will be propagated to the active control state flip-flop.

If an interrupt request is detected by the control logic 380, the VME interface state machine follows the path shown on the left side of FIG. 31, which includes states 001, 011 and 010. During an interrupt cycle, the three least significant VME address bits are driven to the interrupt address and the interrupt acknowledge line ($\overline{\text{VME IACK}}$ is driven low. The address stable line (AS) is then driven low. Although this is sufficient to confirm an interrupt acknowledgement, it does not confirm that this particular slave is being acknowledged. The confirmation that this particular slave has acknowledged the interrupt also includes the $\overline{\text{IACKIN}}$ line being driven low.

The VME interface state machine determines whether these conditions have been met and whether the tree traverser interrupt has been set before responding. If all conditions are met, the VME interface state machine holds the interrupt acknowledge output (IACKOUT) high, waits for the VME data strobe ($\overline{\text{DS374Q}}$)and then enables the status/ID byte stored in the interrupt data buffer 392 onto the VME data bus 389. If any condition is not correct, the VME interface state machine will pass the IACKIN signal from the system bus 18 through to the IACKOUT output to the system bus 18.

Figure 32:
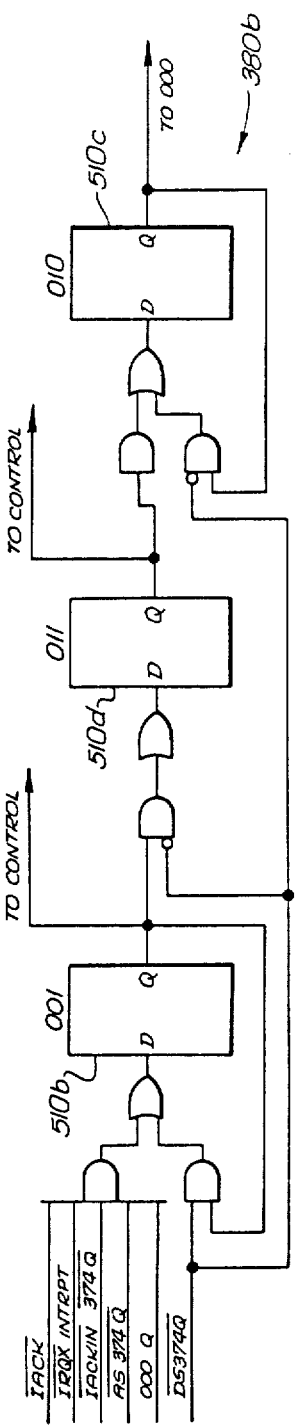
FIG. 32 illustrates logic circuitry for implementing the interrupt cycle state machine of the sync and control logic of FIG. 29B.

The least significant bits of the status/ID byte contain the tree traverser status information e.g. the RUN/HALT, DLM I/F DONE, STK RUNNING and STK OVFL conditions. The four most significant bits are the tree traverser ID, which is 1000 (binary) in the illustrated embodiment. FIG. 32 shows the logic implementation of the interrupt request servicing portion 380b of the VME interface state machine of the control logic 380.

If a VME slave (data transfer) instruction is detected, the VME interface state machine follows the paths shown on the right side of FIG. 31, which includes states 101, 111, 100 and 110. The 111 state is entered if the instruction is a write instruction. Alternatively, the 100 state is entered if the instruction is a read instruction. In both instances, the VME address information is latched into a PAL decoder, a logic implementation of which is illustrated in FIG. 33. The VME address information is also latched into the microsequencer address, microsequencer branch and local data bus registers 386. Because the tree traverser 32 transfers data via the long word mode, the least significant bit of the VME address word is always 0 in the illustrated embodiment. The particular slave function, represented by the VME address, is decoded during the 101 state cycle. The format of these instructions is set forth in FIG. 34. The decoded functions include the aforementioned microsequencer start, stop, restart and reset instructions and the writable control store read/write instructions as defined by the opcode bits 17 and 18.

In executing these instructions, the VME interface state machine enables the least significant portion (bits 1-13) of the VME address onto the microsequencer address (MICAD) bus. If a read WCS operation is selected, the state machine decodes the next least significant bit (bit 14) as the word section select, e.g., the low bits (0-31) or the high bits (32-63) of the microcode data (MICDATA) word. The appropriate buffers of the data transceiver buffers 382 are enabled to transmit the selected bits.

The VME data registers 388 are enabled when the data strobes ($\overline{\text{DS374Q}}$) are active. The VME registers 388 are disabled when the VME transfer acknowledge is received (data strobe $\overline{DS374Q}$ returns high).

If a write WCS operation is selected, the VME interface state machine decodes the VME address and enables the VME data stored in the WCS data buffer 382 onto the microcode data (MICDATA) bus to the microcode memory 302. The state machine simultaneously disables the output of the microcode memory 302 and selects the VME writable control store write enable (VWCSWRTENB) control line. These write control lines are selected at the end of the writable control store instruction cycle.

As previously mentioned, a microsequencer write start instruction forces the microsequencer 300 to the address contained in the least significant bits of the VME address and sets the clock flip-flop (FIG. 38) of the microsequencer 300 to the running state. The least significant bits of the VME address are available from the branch address register of the buffers 386. These bits are provided by the microcode branch address (MICBRAD) bus when the state machine VBRAD control signal is activated. The VME data word which contains the display list memory starting address for culling/face processing and pick/ident operations, is available from the local data bus buffer 390. The data word and VME address can be selectively enabled onto the local data bus (LDB) under microsequencer control (i.e., source control demultiplexer outputs LDVBDATASEL or $\overline{LDBVADSEL}$ (FIG. 29A)).

The read start instructions are quite similar to the write start instructions with several exceptions. By testing the most significant bit of the VME address, i.e., the VME write signal, the microsequencer 300 can discriminate between VME slave read and write instructions. Read instructions cause the microsequencer 300 to write a data word into the local data bus buffer 390. The VME interface state machine detects the local data bus write operation and enables the data output to the system bus 18 through the VME data register 388. The state machine will disable the register 388 when the system bus 18 acknowledges the data transfer.

In order to reduce the number of input terms to the state machine PAL circuitry of FIGS. 32 and 33, many of the input signals from the system bus 18 are first provided to a PAL circuit represented by the logic circuitry 380d of FIG. 35 to produce reduced output signals ME, IRQX*INTRPT, IACKOUT, WCS and START. These output signals are in turn used as input signals by the state machine PAL circuitry of FIGS. 32 and 33 as well as additional PAL circuitry described below to produce the control outputs of the sync and control logic 380.

Figure 36:
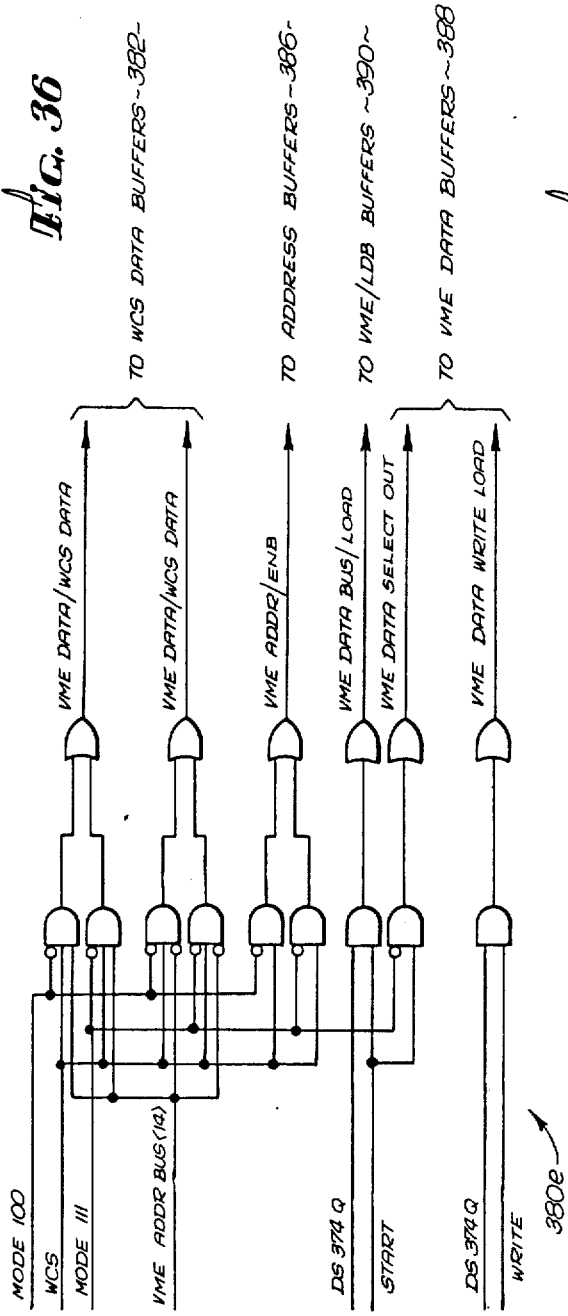
FIG. 36 illustrates output logic circuitry for the state machine of the sync and control logic of FIG. 29B.

Appendix D sets forth the output control logic equations for the enable and clock line signals of the sync and control logic 380, which control the address registers 386, VME/LDB register 390, WCS data buffer 382, interrupt data buffer 392 and the VME data register 388. A logic circuit implementation of the register output control logic equations of Appendix D is illustrated in FIG. 36. As shown therein, the register output control logic 380e combines control state information of the state machine of FIGS. 32 and 33 and also selected condition information from the input reduction logic 380d FIG. 35 to produce the control signals for the above-mentioned registers of the VME interface 100.

Figure 37:
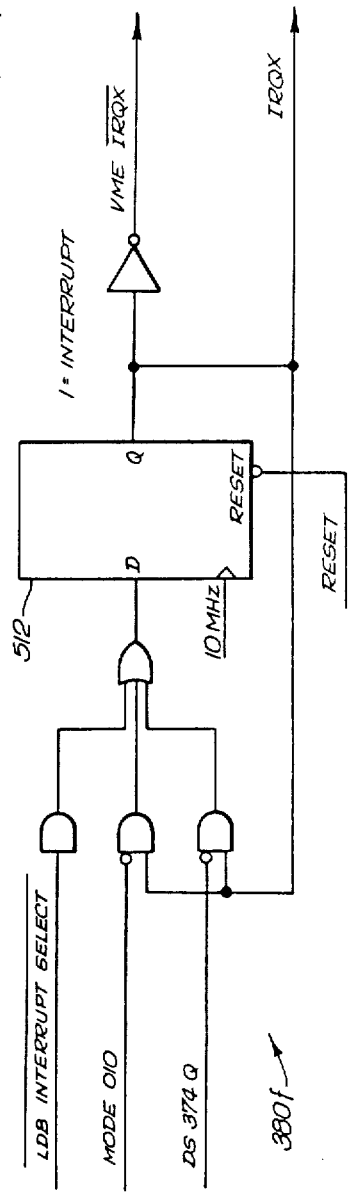
FIG. 37 illustrates a portion of the sync and control logic of FIG. 29B, for generating interrupt request control signals to the system bus.

FIG. 37 shows a portion 380f of the sync and control logic 380, for generating the interrupt request (IRQX) control signal to the system bus 18. The control logic 380F includes a flip flop 512 which can be set by the local data bus interrupt select ($\overline{LDB\ INTERRUPT\ SELECT}$) control signal output of the source control demultiplexer 368 (FIG. 29A) of the microsequencer 300. The flip flop 512 is reset when the interrupt is acknowledged by the system bus 18.

As shown in FIG. 38, a portion 380g of the sync and control logic 380 controls the microsequencer clock line MSEQCLK. The control circuitry 380g includes a flip-flop 514 which is reset when the microsequencer clock is to be disabled and is set when the microsequencer clock is to be allowed to run. The flip-flop 512 can be reset by the tree traverser synchronous reset signal SYNCH RESET and is also controlled by bit 16 of the VME address as shown in FIG. 34. When a valid tree traverser VME instruction is received, the flip-flop 512 is set in accordance with VME address bit 16 as the VME interface 100 completes the instruction, that is, as the interface 100 exits mode 110 illustrated in FIG. 31.

Figure 39:
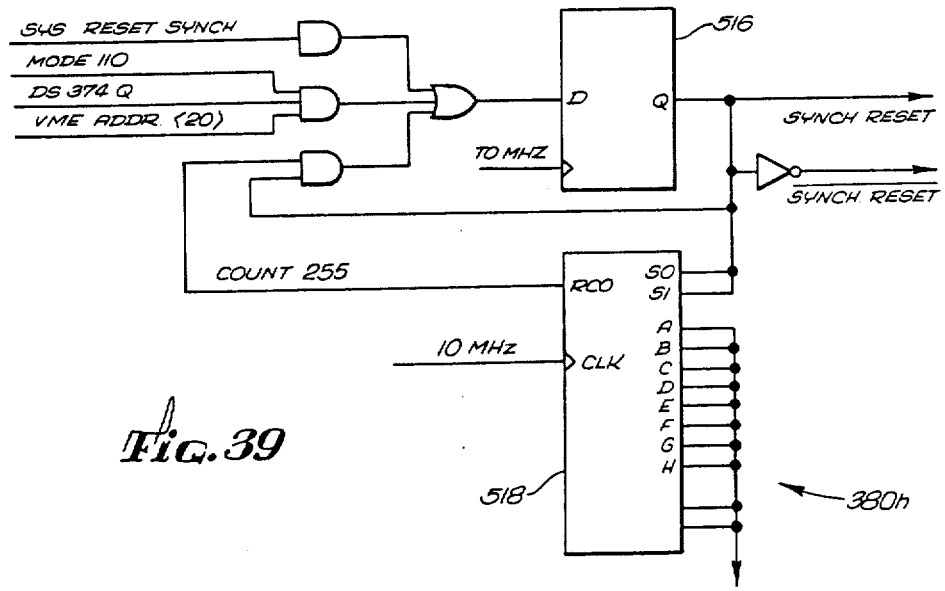
FIG. 39 illustrates a portion of the sync and control logic of FIG. 29B, for generating a synchronous reset control signal.

The synchronous reset signal, SYNCH RESET, of the tree traverser 32 is generated by control circuitry 380h of FIG. 39. A flip-flop 516 can be set by the system bus synchronous reset signal or by bit 15 of a VME instruction (see FIG. 34). The tree traverser synchronous reset signal resets only the tree traverser 32. The tree traverser reset operation begins if the VME address bit 15 is set and after the instruction is completed to permit the tree traverser VME interface 100 to complete the present instruction cycle.

A counter 518 is included within the reset control circuitry 380h to force a minimum reset time of 255 clock periods or 25.5 microseconds. Thus, in the illustrated embodiment, the tree traverser 32 does not accept VME commands until 25.5 microseconds after a VME system reset has occurred.

Figure 40:
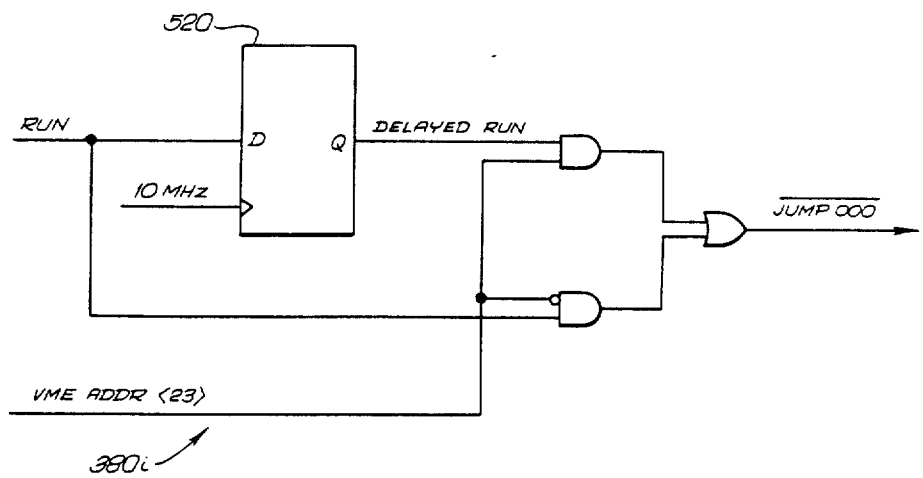
FIG. 40 illustrates a portion of the sync and control logic of FIG. 29B, for delaying the output of the control circuitry of FIG. 38.

FIG. 40 shows a flip-flop 520 of a logic circuit portion 380i of the sync and control logic 380, for delaying the RUN output of the run/halt circuitry 380g of FIG. 38 for one clock. If the undelayed RUN signal is provided to the instruction AND input gates 378 (FIG. 29A), the microsequencer 300 will resume running. If instead the DELAYED RUN output signal from the flip-flop 520 is fed to the microsequencer instruction AND gates 378, an instruction 0 is forced immediately after the microsequencer 300 is started or restarted. Instruction 0 (microsequencer reset) causes a jump to instruction 000H and is used as a microsequencer interrupt as previously described. The VME address bit 18 (FIG. 34) controls whether the delayed or undelayed RUN signal is selected.

Figure 41:
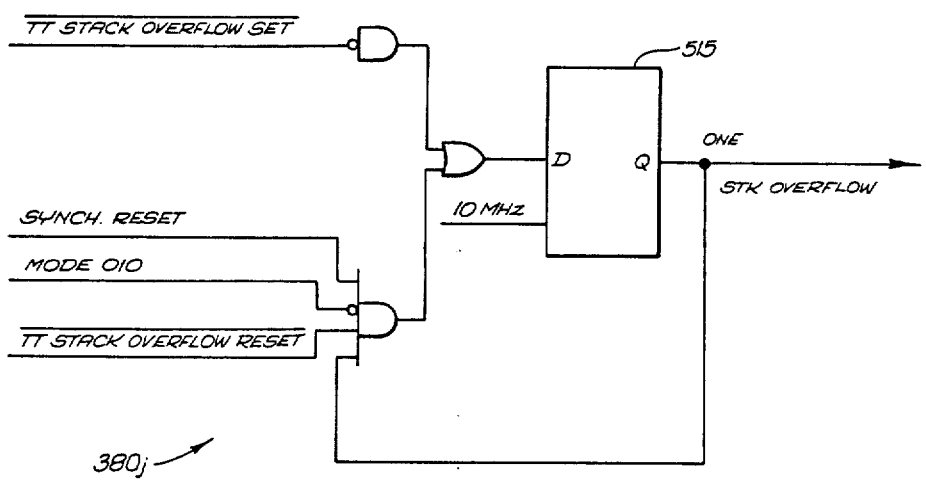
FIG. 41 illustrates a portion of the sync and control logic of FIG. 29B, for generating a stack overflow control signal.

If a stack overflow is detected, the microsequencer 300 activates a stack overflow set (ST OVFL ST) output control line of the destination control demultiplexer 370 of FIG. 29A. This signal sets a stack overflow flip-flop 522 of a portion 380j of the sync and control logic 380, which is shown in FIG. 41. In addition, the microsequencer 300 generates an interrupt after a stack overflow is detected. The terminal processor 12 acknowledges the interrupt and receives the stack overflow flag as bit 3 of the status/ID byte stored in the interrupt data buffer 392 (FIG. 29B). The last state (010) of the VME interface state machine interrupt acknowledge cycle resets the overflow flip-flop 522. The status/ID byte is loaded into the VME data buffer 388 during the previous state (011) and may thereafter be altered in the last state (010). In addition, the stack overflow flip-flop 522 can be reset by the synchronous reset ($\overline{SYNCH\ RESET}$) signal.

Figure 42:
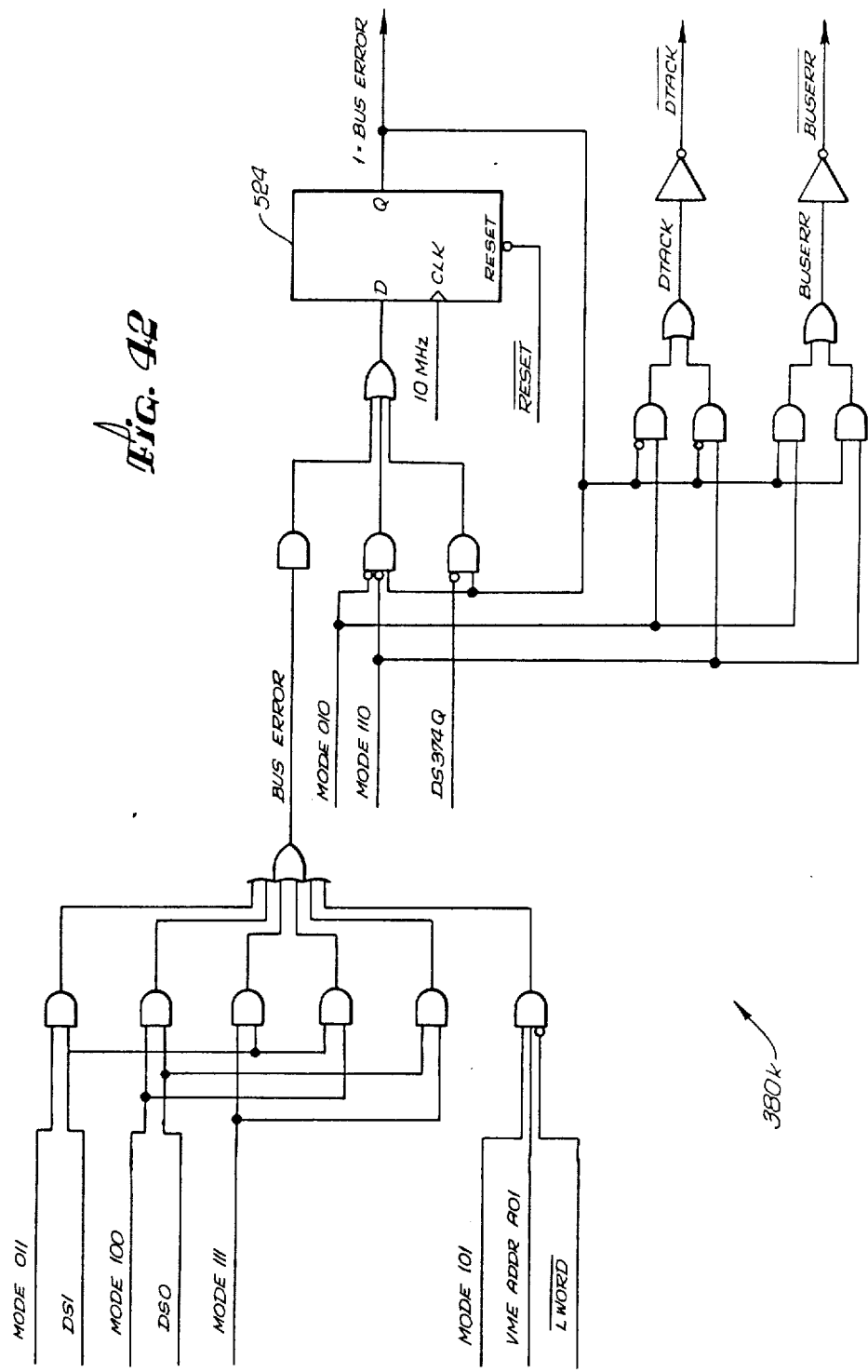
FIG. 42 illustrates a portion of the sync and control logic of FIG. 29B, for generating a bus error control signal.

A VMS system bus error is detected when any of the following conditions occur:

1. An interrupt acknowledge with VMEbus control signal $\overline{DS1}$ low;
2. A data transfer other than a VMEbus longword transfer;
3. A longword transfer without both VMEbus data strobes ($\overline{DS0}$, $\overline{DS1}$) low; or
4. A longword transfer with VME address bit A01 high. A portion 380k of the sync and control logic 380 for generating bus error control signals is shown in FIG. 42. A bus error flip-flop 524 is set when a bus error is detected during either an instruction or interrupt acknowledge cycle of the VME interface state machine. The flip-flop 524 is reset when the current cycle ends or during a reset.

If the microcode memory 302 is programmed to support a read start instruction, the tree traverser 32 should return the data value to the local data bus buffer 390. Moreover, the terminal processor 12 should allow sufficient time for the tree traverser 32 to perform a particular start instruction before sending another instruction.

Figure 43:
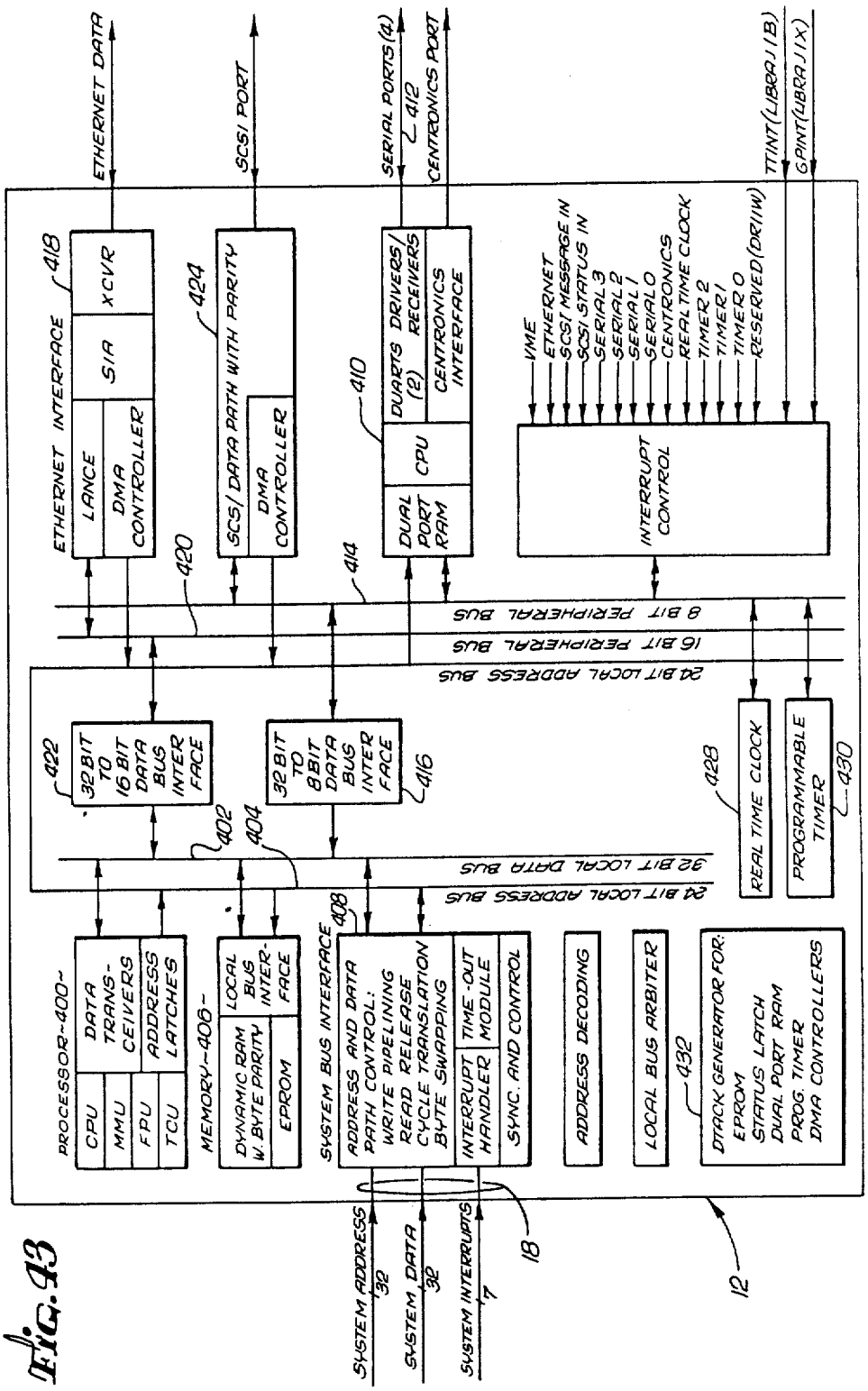
FIG. 43 is a schematic diagram of the terminal processor of the graphics processor of FIG. 1.

The terminal processor 12 of the illustrated embodiment is a single board, general purpose microcomputer. FIG. 43 shows a more detailed schematic diagram of the terminal processor 12 of FIG. 1. The processor 12 includes a processor subsection 400 comprising a microprocessor and associated peripheral integrated circuit chips. In the illustrated embodiment, the microprocessor may be implemented with a National Semiconductor NS 32032 CPU chip and the peripheral chips may include a National Semiconductor NS 32081 Floating Point Unit (FPU), a National Semiconductor NS 32082 Memory Management Unit (MMU), and a National Semiconductor NS 32201 Timing Control Unit (TCU).

The processor 400 communicates with other components of the terminal processor 12 via a 32-bit local data bus 402 and a 24-bit local address bus 404. Data is transferred between the processor 400 and the data bus 402 through data transceivers of the processor 400. The processor 400 also has latches for latching addresses to be placed on the address bus 404.

The terminal processor 12 further includes a memory subsection 406 which comprises dynamic random access memory (DRAM) and read only memory (ROM). Read and write operations between the memory 406 and the local address and data buses 402 and 404 are performed through a bus interface of the memory 406. Preferably, the random access memory may be accessed by either the processor 400 or an external direct memory access (DMA) device.

The terminal processor 12 has four interfaces for communicating with external devices. The first interface is a system bus interface 408 coupling the system bus 18 to the local data and address buses 402 and 404 of the terminal processor 12. As previously mentioned, the system bus 18 of the illustrated embodiment is a standard VMEbus. The system bus interface 408 is a VME master and slave interface which includes arbitration logic for the entire VMEbus. The slave portion of the interface 408 has direct memory access capabilities with respect to the random access memory portion of the memory subsystem 406. As an interface to the system VMEbus 18, the interface 408 includes the usual address and data path control functions including write pipelining, read release, cycle translation and byte swaping. The interface 408 has an interrupt handler, a time out module, address decoding, local bus arbitration and appropriate VMEbus synchronization and control logic as well.

A second interface 410 provides an intelligent serial interface with four asynchronous serial lines 412, each having a programmable baud rate with at least two preferably having standard modem controls. The tablet 20, keyboard 22 and display 26 illustrated in FIG. 1 may be coupled to the terminal processor 12 through these serial ports.

Control of the interface 410 is provided by a microprocessor which is implemented by a 6809 CPU in the illustrated embodiment. The CPU of the interface 410 controls dual universal asynchronous receiver/transmitters (DUARTS SCN68681). The serial ports 412 are coupled to the DUARTS through driver/receivers which, in the illustrated embodiment, are compatible with the RS232 protocol. Data to and from the interface 410 passes through a dual port RAM coupled to an 8-bit peripheral bus 414. A 32-bit to 8-bit data bus interface 416 couples the 8-bit peripheral bus 14 to the 32-bit local data bus 402 of the terminal processor 12.

The interface 410 further has a parallel interface which in the illustrated embodiment, is designed to meet the Centronics standard. Accordingly, a Centronics port 417 of the interface 410 may be coupled to a printer.

An Ethernet interface 418 couples the terminal processor 12 to a host computer. The Ethernet interface 418 includes a direct memory access controller, which couples the interface 418 to the 24-bit local address bus 404. Data from the Ethernet interface 418 passes through a Lance AM7990 to a 16-bit peripheral bus 420 which is coupled to the 32-bit local data bus 402 by a 32-bit to 16-bit data bus interface 422.

In the illustrated embodiment, the Ethernet interface 418 is on a separate removable board. For a host computer requiring a different type of interface, the Ethernet interface 410 may be removed and another interface board substituted.

A small computer system interface (SCSI) 424 may be provided to couple a disk drive (not shown) to the 8-bit peripheral bus of the terminal processor 12. The SCSI interface 424 includes a direct memory access (DMA) controller coupled to the 24 bit local address bus 404.

An interrupt control unit 426 handles incoming interrupt signals for the various peripheral devices as well as the tree traverser 32 and geometry processor 36 connected to the terminal processor. The terminal processor also has a real time clock 428 and programmable timers 430. A generator 432 generates data acknowledge "DTACK" signals for the DMA controllers of the host interface 418 and SCSI interface 424, the programmable timers 430, the dual port RAM of the intelligent serial/Centronics interface 410, the status latch and the EPROM of the memory 406.

Programs for writing graphics data into a memory, and microcomputers with interfaces for the above described peripheral devices are well known in the art. For example, a well known text book, *Fundamentals of Interactive Computer Graphics*, by Foley and Van Dam, Addison Wesley Publishers, illustrates in Chapter 9 a number of algorithms for writing graphics data in a hierarchical structure.

It is seen from the above that the present invention provides a unique architecture which facilitates the traversal of a graphics data base. The tree traverser 32, independently of the terminal processor which creates and maintains the data base, rapidly generates a stream of addresses to the display list memory, traversing the data base until the data base has been completely processed. The private data path 107 coupling an output port of the display list memory 16 to the geometry processor 36 has minimal handshake requirements producing an extremely high data bandwidth bus from the memory 16 to the geometry processor 36. The bidirectional stack bus 38 between the tree traverser 32 and the geometry processor 36 further increases the overall data processing rate.

It will, of course, be understood that modifications of the present invention, in its various aspects, will be apparent to those skilled in the art, some being apparent only after study and only being matters of routine electronic design. For example, a bus other than a VMEbus might be substituted for the system bus 18. Other embodiments are also possible, their specific designs depending upon the particular application. As such, the scope of the invention should not be limited by the particular embodiment herein described but should be defined only by the appended claims and equivalents thereof.

APPENDIX A

TITLE

MODE STATE EQUATIONS
COUNTER STATE EQUATIONS
MEMORY CONTROLLER SIGNAL EQUATIONS

| · MODE STATE EQUATIONS | | |
|---|---|---|
| $\overline{D} =$ | $\overline{F} \cdot E \cdot \underline{B} \cdot \overline{A}$ | |
| + | $F \cdot E \cdot \underline{D} \cdot \overline{C}$ | |
| + | $F \cdot E \cdot \underline{D} \cdot B$ | |
| + | $F \cdot E \cdot \overline{D} \cdot$ | END·ROLLOVER |
| + | RESET | |
| $\overline{E} =$ | $\overline{F} \cdot E \cdot D$ | |
| + | $F \cdot E \cdot D \cdot B$ | |

| -continued | | |
|---|---|---|
| MODE STATE EQUATIONS | | |
| + | $\overline{F} \cdot \overline{E} \cdot D \cdot \overline{C}$ | |
| | $\overline{F} \cdot \overline{E} \cdot D \cdot$ | $\overline{STARTBIT}$ |
| + | $F \cdot E \cdot \overline{D} \cdot C \cdot \overline{B} \cdot$ | $\overline{END}$ |
| ± | RESET | |
| $\overline{F} =$ | $F \cdot E \cdot D$ | |
| + | $\overline{F} \cdot \overline{E} \cdot D \cdot$ | $\overline{STARTBIT}$ |
| + | $\overline{F} \cdot D \cdot \overline{C}$ | |
| + | $\overline{F} \cdot D \cdot B$ | |
| + | $\overline{F} \cdot D \cdot$ | $\overline{GPRDY}$ |
| + | $F \cdot E \cdot \overline{D} \cdot C \cdot \overline{B} \cdot$ | $\overline{END}$ |
| + | RESET | |

| COUNTER STATE EQUATIONS | | |
|---|---|---|
| $\overline{A} =$ | | |
| | | $\overline{A} \cdot \overline{10 \text{ MHz}}$ $ |
| | + | B |
| | + | C |
| | + | RESET |
| $\overline{B} =$ | | |
| | | $\overline{B} \cdot \overline{A}$ |
| | + | $\overline{C} \cdot A$ |
| | + | $F \cdot E \cdot D \cdot$ A |
| | + | RESET |
| $\overline{C} =$ | | |
| | | $\overline{B} \cdot \overline{A}$ |
| | + | $\overline{C} \cdot B$ |
| | + | $F \cdot E \cdot D \cdot$ $\overline{C}$ |
| | + | $\overline{C} \cdot A$ |
| | + | RESET |
| $\overline{STARTBIT} =$ | | |
| | | START·$\overline{STARTBIT}$ |
| | + | $F \cdot E \cdot D \cdot$ |
| | +RESET | |

Note
$ The $\overline{10 \text{ MHz}}$ signal is the 10 MHz clock inverted and delayed.

| Memory Controller Signal Equations | | |
|---|---|---|
| $\overline{STK. MEM. RASIN} =$ | | |
| | $\overline{F} \cdot D \cdot \overline{C} \cdot A$ | |
| + | $\overline{F} \cdot D \cdot B \cdot \overline{A}$ | |
| + | $F \cdot E \cdot D \cdot \overline{C} \cdot A$ | |
| + | $F \cdot E \cdot \underline{D} \cdot \overline{C} \cdot B$ | |
| | $F \cdot E \cdot \overline{D} \cdot \overline{C}$ | |
| + | $F \cdot E \cdot \overline{D} \cdot B$ | |
| + | $F \cdot E \cdot \overline{D} \cdot$ | END·ROLLOVER·$\overline{STK.MEM.R/W}$ |
| + | $F \cdot E \cdot \overline{D} \cdot$ | D.END·ROLLOVER·$\overline{STK.MEM.R/W}$ |
| $\overline{STK. MEM. CASIN} =$ | | |
| | $F \cdot E \cdot D \cdot B \cdot \overline{A}$ | |
| + | $F \cdot E \cdot \overline{D} \cdot \overline{C} \cdot A$ | |
| + | $F \cdot E \cdot \overline{D} \cdot C \cdot \overline{B} \cdot$ | END·ROLLOVER·$\overline{STK.MEM.R/W}$ |
| + | $F \cdot E \cdot \underline{D} \cdot C \cdot \overline{B} \cdot$ | D.END·ROLLOVER·$\overline{STK.MEM.R/W}$ |
| + | $F \cdot E \cdot \overline{D} \cdot$ | |
| $\overline{STK. MEM. RFRSH} =$ | | |
| | $\overline{F} \cdot D \cdot \overline{C}$ | |
| + | $\overline{F} \cdot D \cdot B$ | |
| + | $\overline{F} \cdot D \cdot$ OPRDY | |
| + | $F \cdot E \cdot \overline{D} \cdot C \cdot \overline{B} \cdot$ $\overline{END}$ | |
| + | $\overline{F} \cdot \overline{E} \cdot D \cdot$ $\overline{START\ BIT}$ | |
| $\overline{STK. MEM. ADS} =$ | | |
| | $\overline{F} \cdot D \cdot \overline{C}$ | |

| Memory Controller Signal Equations | | |
|---|---|---|
| | + $\overline{F}$• D • $\overline{STARTBIT}$ | |
| | + $\overline{F}$• D • B | |
| | + F• D • OPRDY | |
| | + F•E•$\underline{D}$ • $\underline{B}$ •$\underline{A}$ | |
| | + F•E•$\underline{D}$ • B•A | |
| | + F•E•$\overline{D}$•C•$\overline{B}$•$\overline{A}$• $\overline{END}$ | |
| | + F•E•$\overline{D}$ • $\overline{C}$•B | |
| | + F•E•$\overline{D}$ • $\overline{C}$•$\overline{B}$•A | |
| | + F•E•$\overline{D}$•C•B•A•ROLLOVER•END | |
| $\overline{STK.\ MEM.\ R/C}$ = | | |
| | F•E•$\underline{D}$ • $\overline{C}$•B | |
| | + F•E•$\overline{D}$ • $\overline{C}$ | |
| | + F•E•$\overline{D}$ • B | |
| | + F•E•$\overline{D}$ • | END•ROLLOVER•$\overline{STK.\ MEM.\ R/W}$ |
| | + F•E•$\overline{D}$ • | D.END•ROLLOVER•STK.MEM.R/W |
| $\overline{STK.\ MEM.\ WIN}$ = | | |
| | F•E • B• | $\overline{STK.\ MEM.\ R/W}$ |
| | + F•E•$\overline{D}$ • $\overline{C}$ • | $\overline{STK.\ MEM.\ R/W}$ |
| | F•E•$\overline{D}$ • | |
| | + | $\overline{STK.\ MEM.\ R/W}$•END• |
| | + F•E•D• | $\overline{STK.\ MEM.\ R/W}$•$\overline{ROLLOVER}$ |
| | + F•E•$\overline{D}$•B• | $\overline{STK.\ MEM.\ R/W}$ |
| $\overline{STACK.\ BUS.\ G}$ = | | |
| | F•E•$\underline{D}$ • | |
| | + F•E•$\overline{D}$ | |
| $\overline{STACK.\ BUS.\ DIR}$ = | STACK.MEM.R/W | |
| STACK.BUS.CAB.ENB= | && | |
| | + F•E•$\overline{D}$ •$\overline{C}$•$\overline{B}$•$\underline{A}$ • STK.MEM.R/W | |
| | + F•E•$\overline{D}$ • C •B•A• STK.MEM.R/W | |
| STACK.BUS.CBA.ENB= | && | |
| | F•E•D•$\overline{B}$• A • $\overline{STK.\ MEM.\ R/W}$ | |
| | + F•E•$\overline{D}$ • $\overline{C}$•B•A • $\overline{STK.\ MEM.\ R/W}$ | |
| | + F•E•$\overline{D}$ • $\overline{C}$•B•A•$\overline{STK.\ MEM.\ R/W}$•END•ROLLOVER | |
| $\overline{GPRDY}$ = | | |
| | STK. MEM. R/W • $\overline{GP.\ STACK.\ REG.\ FILE\ AVAIL}$ • $\overline{STK.\ MEM.\ COPY}$ | |
| | + $\overline{STK.\ MEM.\ R/W}$ • $\overline{GP.\ STACK.\ OUTPUT.\ R.F.\ LOADED}$ • $\overline{STK.\ MEM.\ COPY}$ | |
| | + STK.MEM.DESTINATION | |
| | + $\overline{STK.\ MEM.\ R/W}$ • $\overline{GP.\ STACK.\ OUTPUT.\ R.F.\ LOADED}$ • STK. MEM. COPY | |
| | • $\overline{GP.\ STACK\ REG.\ FILE\ AVAIL}$ | |
| $\overline{STK.\ MEM.\ ADDR.\ ENP}$ = | | |
| | + F•E•$\overline{D}$ • $\overline{C}$ | |
| $\overline{STK.\ MEM.\ WD.\ CNT\ ENP}$ = | | |
| | $\overline{F}$•E•$\overline{D}$ | |
| | + $\overline{F}$• D | |
| | + F•E•$\overline{D}$• | STK.MEM.R/W |
| | + F•E•$\overline{D}$•C•$\overline{B}$•$\overline{A}$• | STK.MEM.R/W |
| | + F•E•$\underline{D}$• $\overline{B}$•$\overline{A}$• | $\overline{STK.\ MEM.\ R/W}$ |
| | + F•E•$\overline{D}$• | ROLLOVER•$\overline{STK.\ MEM.\ R/W}$ |
| | + F•E•$\overline{D}$ • | $\overline{ROLLOVER\ BIT}$•$\overline{STK.\ MEM.\ R/W}$ |
| $\overline{STACK.\ MEM.\ WRITE.\ ENB}$ = | | |
| | F•E•$\overline{D}$•$\overline{C}$ • A •STK.MEM.R/W • DESTINATION | |
| $\overline{STACK.\ MEM.\ READ.\ ENB}$ = | | |
| | F•E•D • $\overline{C}$•$\overline{B}$•$\overline{A}$•$\overline{STK.\ MEM.\ R/W}$ •DESTINATION | |
| | + F•E•$\overline{D}$ • $\overline{C}$•B•A•$\overline{STK.\ MEM.\ R/W}$ •DESTINATION•END•ROLLOVER BIT | |
| | + F•E•$\overline{D}$• $\overline{C}$•B•A•$\overline{STK.\ MEM.\ R/W}$ •DESTINATION•END•ROLLOVER BIT | |
| | F•E•$\overline{D}$• C•B•A•ROLLOVER BIT•$\overline{STK.\ MEM.\ R/W}$•DESTINATION | |
| | + $\overline{F}$•E•D•B•A•START•$\overline{GPRDY}$•DESTINATION•$\overline{STK.\ MEM.\ R/W}$ | |

-continued

| Memory Controller Signal Equations |
|---|
| $+ \quad \overline{F} * E * D * B * \overline{A} * \overline{GPRDY} * DESTINATION * \overline{STK. MEM. R/W}$ |

Note:
&& This signal is a precursor to the desired signal.

APPENDIX B

PROGRAM DESIGN LANGUAGE DESCRIPTION OF TREE TRAVERSER MICROCODE

INDEX

Main Program
Procedure Object Cull
Procedure Unconditional Update
Procedure Next Object Searched
Procedure Last Searched Object Select
Procedure Reverse and Face Process
Procedure Popstack

MAIN PROGRAM

```
/* initialize data registers and flags */
set/reset process face mode bits (ALU word OC, bits
    19 and 1))
initialize viewport
load first packet information into last visible object
    storage registers (DLM reg file locations 10-13) p1
do until (tree objects are exhausted) (ALU word
    OC, bit 17)
    /* stack pointer=first location */
    do until reverse and process face (ALU word OC, bit
        1)
        if stack pointer greater than stack maximum then
            /* stack overflow */
            set stack overflow flip-flop
            set interrupt request flip-flop
            branch to infinite loop
            /* await terminal processor action */
        endif
BEGIN OBJECT CULL
END OBJECT CULL
    enddo
    /* process faces */
```

MAIN PROGRAM (cont.)

```
BEGIN REVERSE AND PROCESS FACE
END REVERSE AND PROCESS FACE
    reset reverse and process flag
    enddo /*tree objects are exhausted*/
    set VME interrupt flag
    branch to infinite loop
    /* await terminal processor action */
```

PROCEDURE OBJECT CULL

```
BEGIN OBJECT CULL
    if (last object was not searched (ALU word OC, bit
        3)) /* then */
BEGIN LAST SEARCHED OBJECT SELECT
END LAST SEARCHED OBJECT SELECT
    else /* last object was searched flag */
        if (GP output not available)then /* locate next
            object */
            if (next object not searched)
BEGIN NEXT OBJECT SEARCHED
END NEXT OBJECT SEARCHED
            else /* next object searched */
            endif /* next object searched */
        endif /* GP output available */
        wait until culling results are received
        if (last searched object is visible)
BEGIN PROCEDURE UNCONDITIONAL UPDATE
END PROCEDURE UNCONDITIONAL UPDATE
        else /* last searched object is invisible */
            if (last searched object was a sibling) then replace
                the last visible object's sibling pointer with last
                searched object's sibling pointer
            else /* last searched object was a child */
                replace the last visible object's child pointer with
                last searched object's sibling pointer
            endif /* last searched object sibling/child */
            reset last object searched visible flag
            if (next object searched) then
                if (next object was last searched object's sibling)
                    then
                    update last searched object pointers
                    cull the new last searched object
                else /* next object was last searched object's child
                    */
                    /* flush the next object--parent is invisible */
                    reset next object searched flag
                    set object to be face processed flag
                endif /* next object sibling/child */
            endif /* next object searched */
        endif /* last searched object visibility */
    endif /* last object searched */
END CULLING
```

PROCEDURE UNCONDITIONAL UPDATE

```
BEGIN
    If (last searched sibling flag set to child) then incre-
        ment current tree level
    endif
        store last object searched pointers (DLM RF
            (14-17) in stack 126
        store last searched object pointers in last visible
            object pointers (DSM RF 10-13)
    if (last searched object sibling flag set to sibling (ALU
        word OC, bit 5))
        transfer GP out data to stack 126
    else /* last searched object is a child */
        copy GP out data to stack 126 and GP stack file 120
    endif
    reset the last object searched pointer (DLM RF
        (14-17))
    if (next object was searched) then
BEGIN PROCEDURE NEXT OBJECT UPDATE
        store next object searched pointers (DLM RF(18-
            1B)) in last object searched pointers (DLM R
            (13-17))
        reset next object searched flag (ALU word OC, bit 4)
        feed culling primitives of (new) last object searched
            to
        GP 36
END PROCEDURE NEXT OBJECT UPDATE
``` endif /* next object was searched */
END

PROCEDURE NEXT OBJECT SEARCHED

```
BEGIN
  set next object searched flag (ALU WORD OC BIT
    4)
    if (last object searched sibling pointer is valid)
      update next object header pointer and flag
      get header block of next object to be searched
      set next object sibling flag to sibling (bit 4)
    else if (last object searched child pointer is valid)
      update next object header pointers and flag
      get header block of next object to be searched
      set next object searched flag
      reset next object sibling/child flag to child
    else /*no children or siblings */
      null next object's sibling, child, and culling pointers
      null last object searched pointer
      set face to be processed bit (bit 19)
      reset next object searched flag (bit 4)
    endif
END
```

PROCEDURE LAST SEARCHED OBJECT SELECT

```
BEGIN
  /* select last searched object from the */
  /* last visible object pointers */
  if (last visible object sibling pointer exists)
    set last object was searched flag (ALU word OC,
      bit 3)
    set last searched object sibling/child flag to sibling
    get header block of sibling object to be searched
    cull culling buffer of sibling object to be searched
      (ALU word OC bit 5)
  else if /* child pointer exists) */
    set last object was searched flag
    reset last searched object sibling/child flag to child
    get header block of child object to be searched
    cull culling buffer of child object to be searched
  else /* no sibling or child pointers exist */
    reset next object to be searched (bit 4)
    reset last object searched flag (bit 3)
    set object to be face processed flag (bit 19)
  endif /* next object exist */
END
```

PROCEDURE REVERSE AND PROCESS FACE

```
  /* last object is stored on stack and has no siblings */
  /* or children. last object is not an invocation */
  /* (invocations have children). */
BEGIN PROCEDURE POPSTACK
  /* loads attributes and transforms the matrix */
END PROCEDURE POPSTACK
  if invocation bit set then
    change the partner pointer to a null data pointer
  endif /* invocation bit */
  /* get data buffer pointer */
  if data buffer pointer is valid and local visibility flag is
    set then
    /* object has data primitives */
    begin procedure process primitives
    /* break up primitives and feed to GP */
    do until next data buffer pointer is null
      set memory read and GP copy
      Read data block from DLM
        /* use data buffer DLM pointer - start */
        /* at pointer location */
        /* data block contains next block pointer word
           count, op code flags */
        /* and N data words */
        /* note maximum word count */
        /* is 32 words per block */
      replace data block pointer with next data block
        pointer
      if new data block word count is 32 then
        extend DLM transfer to 32
```

PROCEDURE REVERSE AND PROCESS FACE (cont.)

```
    endif
    verify DLM transfer was complete
    endo /* data block pointer is null */
  end procedure process primitives
  else /* object has no primitive data */
  endif /* object face processing finished */
  reset child to be culled and reverse and process flags
```

PROCEDURE REVERSE AND PROCESS FACE (cont.)

```
  do until (child to be culled or reverse and process
    face or tree exhausted)
    /* see if next object can be face procsssed, skipped */
    /* or child culled */
    calculate next object stack address
    get next stack object tree level
    get next stack object child pointer
    if current object tree level is not equal to next stack
      object tree level then
      /* stack object is a parent of the previously */
      /* processed object */
      if stack object is an invocation then
        /* skip over parent invocation and repeat tests */
        current stack level = current stack level - 1
        /*pop counter */
        bump stack pointer /*to point at another stack else
        /* parent is a regular object - can be face processed */
        bump stack pointer /* to point at stack object */
        set reverse and process face flag
        set last object child pointer null
        set last object sibling pointer null
        /* trick into reentering reverse and process routine */
      endif /* stack object type */
```

PROCEDURE REVERSE AND PROCESS FACE (cont.)

```
    else /* current object's tree level is equal to next stack
      object's tree level */
      /* stack object is a sibling of the previously */
      /* processed object. Can't be invocation */
      If stack object child pointer is valid then
        /* setup for child cull */
        set last object sibling pointer to null
        set last object child pointer equal to stack object
          child pointer
        reset last object search and next object searched
          flags
        set child to be culled flag
      else /* stack object's child pointer is invalid */
        /* stack object has no child and can be face */
        /* processed */
        set reverse and process face flag
        set last object child pointer to null
        set last object sibling pointer to null
      endif /* stack object's child pointer */
``` endif /* current object level */
enddo /* child to be culled or reverse and process face or tree exhausted */
END PROCEDURE REVERSE AND PROCESS FACE

PROCEDURE POPSTACK

This procedure pops the last stack item from the stack to the geometry processor's input, copies the stack data to the tree traverser. The procedure then obtains the data buffer pointer from the header block address. This routine is called from the Reverse and Process Face routine.

BEGIN PROCEDURE POPSTACK
  transfer four words of the top stack object to the TT DLM register file 112
  update the current tree level
  get the stack's object flag word
  get the stack's object header pointer
  if (flag word indicates visibility) then
    read the header block from DLM
    if (the object is an invocation) then
      make the data pointer null
    endif
    if the header block has a valid data buffer pointer then
      pop the stack to the GP
      /* loads attributes and transformation matrix to GP */
    else
      decrement the stack address
    endif /* data pointer valid */
  else /* flag word indicates invisibility */
    decrement the stack address
  endif /* flag word visibility test */
  if (stack address will underflow) then
    set tree exhausted bit
  endif
END PROCEDURE POPSTACK

APPENDIX C

| WRAP AROUND SHIFT CONTROL LOGIC EQUATIONS | |
|---|---|
| O1 = | O4 * $\overline{S1}$ * S0 |
|  | + S1 * $\overline{S0}$ |
| O2 = | O3 * $\overline{S1}$ * S0 |
|  | + ALUMSB * S1 * S0 |
|  | + S1 * $\overline{S0}$ |
| O3 = | O2 * $\overline{S1}$ * S0 |
|  | + O4 * S1 * S0 |
|  | + S1 * $\overline{S0}$ |
| O4 = | O1 * $\overline{S1}$ * S0 |
|  | + O3 * S1 * S0 |
|  | + S1 * $\overline{S0}$ |
| O1 OE = | INST (7) |
| O2 OE = | $\overline{INST (7)}$ |
| O3 OE = | INST (7) |
| O4 OE = | $\overline{INST (7)}$ |

NOTE:
OE is "output enable"

APPENDIX D

| VME I/F Register Output Control Logic Equations |
|---|
| VME Data/WCS Data Buffer 382 |
| G Low = (Mode 100 + Mode 111 + Mode 110) * WCS * VME.Addr 14 |
| G High = (Mode 100 + Mode 111 + Mode 110) * WCS * $\overline{\text{VME. Addr 14}}$ |
| VME Addr/Micro Addr Buffer 386 |
| Enable = (Mode 100 + Mode 111 + Mode 110) * WCS |
| Status Byte Intrpt Data Buffer 392 |
| Enable = Mode 011 |
| VME Data Bus/Local Data Bus Buffer 390 |
| Local Data Bus Read Load = $\overline{\text{10Mhz}}$ * Local Data Bus Select |
| Local Data Bus Write Load = 10Mhz * Mode 111 |
| GAB = $\overline{\text{DS374Q}}$ * START * WRITE |
| GBA = $\overline{\text{Local Data Bus VME Data Select}}$ |
| VME Data/VME Data Bus Buffer 388 |
| VME Data Write Load = DS374Q * WRITE |
| VME Data Read Load = WCA * Mode 100 * $\overline{\text{10 Mhz}}$ |
| VME Data Select = Start * (Mode 100 + Mode 110) |

Note

The $\overline{\text{10 Mhz}}$ signal is a precursor to the 10 Mhz clock.

We claim:

1. A graphics processor for displaying objects and for use with a host processor, comprising:
   a system bus comprising a plurality of control, data and address lines;
   a unidirectional read bus comprising a plurality of data lines;
   a memory coupled to the system bus and the read bus and having a plurality of memory locations, each location having an address, said memory locations for storing segments of graphics data which represent objects to be displayed, wherein the segments of graphics data are arranged in an hierarchical arrangement wherein the graphics data of each segment includes at least one pointer representing the address of another segment;
   first processing means coupled to the system bus and responsive to the host processor, for writing the segments of graphics data over the system bus into the memory and for supplying a starting segment address; and
   second processing means coupled to the system bus and the read bus and responsive to the first processing means, for sequentially reading over the read bus graphics data stored in the memory starting at the segment address supplied by the first processing means and for displaying images of objects represented by the graphics data read by the second processing means, said second processing means including means for reading a pointer from the memory and for reading the graphics data stored at the segment addresses represented by the read pointers.

2. A graphics processor for displaying objects and for use with a host processor, comprising:
   a system bus comprising a plurality of control, data and address lines;
   a read bus comprising a plurality of data lines;
   a memory coupled to the system bus and the read bus and having a plurality of memory locations, each location having an address, said memory locations for storing segments of graphics data which represent objects to be displayed, wherein the segments of graphics data are arranged in an hierarchical arrangement wherein the graphics data of each segment includes at least one pointer representing the address of another segment;

data base management means coupled to the system bus and responsive to the host processor, for writing the segments of graphics data over the system bus into the memory, and for supplying a segment address;

addressing means coupled to the read bus and responsive to the data base management means, for sequentially addressing graphics data stored in the memory starting at the segment address supplied by the first processing means, said addressing means including pointer read means for reading a pointer from the memory and for addressing the graphics data stored at the segment addresses represented by the read pointers; and graphics data processing means coupled to the read bus for reading over the read bus the graphics data addressed by the addressing means and for displaying images of objects represented by the read graphics data.

3. A graphics processor for displaying objects and for use with a host processor, comprising a system bus comprising a plurality of control, data and address lines;

a read bus comprising a plurality of data lines;

a memory coupled to the system bus and the read bus and having a plurality of memory locations, each location having an address, said memory locations for storing segments of graphics data which represent objects to be displayed, wherein the segments of graphics data are arranged in a hierarchical arrangement wherein the graphics data of each segment includes at least one pointer representing the address of another segment;

data base management means coupled to the system bus and responsive to the host processor, for writing the segments of graphics data over the system bus into the memory, and for supplying a segment address;

addressing means coupled to the memory and read bus, and responsive to the data base management means, for sequentially addressing graphics data stored in the memory starting at the segment address supplied by the first processing means, said addressing means including pointer read means for reading a pointer from the memory and for addressing the graphics data stored at the segment addresses represented by the read pointers; and graphics data processing means coupled to the read bus for reading over the read bus the graphics data addressed by the addressing means and for displaying displaying images of objects represented by the read graphics data;

wherein each segment has a sibling pointer which represents the address of a segment at same hierarchical level and a child pointer which represents the address of a segment at a lower hierarchical level wherein each segment has associated therewith a bounding volume which completely contains the object of the segment and all of the objects of the associated child pointers, wherein the graphics data processing means has culling means for determining whether a segment bounding volume is within a predetermined volume, and the addressing pointer means includes means responsive to the graphics data processing means for addressing the graphics data associated with a segment child pointer only if the bounding volume of the segment is determined to be within the predetermined volume.

4. The processor of claim 3 wherein each segment having a child pointer defines a parent segment and wherein each segment has a coordinate set associated therewith and each child segment has a transformation matrix for transforming the coordinate set of the child segment to the coordinate set of the parent segment, said processor further comprising a third bus having data lines coupling the addressing means to the graphics data processing means, said graphics data processing means having means for concatenating the child segment transformation matrix to the parent segment transformation matrix, said addressing means having means for storing the concatenated matrix of a segment if the segment object is found to be within the predetermined volume.

5. The processor of claim 4 wherein the graphics data of each segment of a plurality of segments further includes coordinate data representative of at least one graphics primitive and the addressing means has means for addressing the coordinate data of a segment and for transferring the stored concatenated matrix of said segment to the graphics data processing means, said graphics data processing means having means for multiplying the segment graphics primitive coordinate data by the segment concatenated matrix to transform the coordinate data to another coordinate set.

6. In a graphics processor for displaying images of objects represented by segments of graphics data stored in a memory, each segment containing the address of another segment, the improvement comprising:

a unidirectional data bus coupled to an output of the memory for transferring graphics data read from the memory;

addressing means coupled to the data bus and the memory, for addressing the graphics data stored in the memory and reading selected graphics data from the data bus to determine the address of another segment of graphics data; and geometry processing means coupled to the data bus for processing the graphics data from the data bus, said geometry processing means including culling means for determining whether an object of a segment of graphics data is within a predetermined volume.

7. In a graphics processor for displaying images of objects represented by segments of graphics data stored in a random access memory, each segment containing the address of another segment, the improvement comprising:

a unidirectional data bus coupled to an output of the random access memory for transferring graphics data read from the random access memory;

addressing means coupled to the data bus and the random access memory, for addressing the graphics data stored in the random access memory and reading selected graphics data from the data bus to determine the address of another segment of graphics data;

geometry processing means coupled to the data bus for processing the graphics data from the data bus; and a stack memory for storing graphics data and a second data bus coupled to the addressing means, the geometry processing means and the stack memory, for transferring graphics data between the geometry processing means and the stack memory, and between the addressing means and the stack memory.

8. The processor of claim 7 wherein the geometry processing means comprising culling means for determining whether an object of a segment of graphics data is within a predetermined volume, said addressing means having means for transferring over the second data bus and storing in the stack memory graphics data of objects determined to be within the volume.

9. The processor of claim 8 wherein the addressing means has means for retransferring over the second data bus to the geometry processing means the graphics data stored in the stack memory for further processing by the geometry processor.

10. The processor of claim 9 wherein the addressing means has means for addressing additional graphics data and the geometry processing means has means for processing the additional graphics data in combination with the graphics data retransferred from the stack memory.

11. The processor of claim 10 wherein the additional graphics data are graphics primitives representing the objects and the geometry processing means for processing the additional graphics data includes clipping means for clipping the graphics primitives relative to the predetermined volume.

12. In a graphics processor for displaying objects and for use with a host processor, said processor having a memory having a plurality of memory locations, each location having an address, said memory locations for storing segments of graphics data which represent objects to be displayed, wherein the segments of graphics data are arranged in an hierarchical arrangement wherein the graphics data of each segment includes at least one pointer representing the address of another segment; the improvement comprising:
a read bus comprising a plurality of data lines to provide a data path for graphics data read from the memory;
addressing means coupled to the memory for sequentially addressing graphics data stored in the memory, said addressing means including a register file coupled to the read bus for storing a pointer from the memory and means for addressing the graphics data stored at the segment addresses represented by the read pointers;
graphics data processing means coupled to the read bus for reading over the read bus and processing the graphics data addressed by the addressing means;
a stack memory;
a second bus coupling the stack memory to the addressing means and the graphics data processing means; and
stack transfer means for transferring pointers over the second bus from the addressing means register file to the stack memory and for transferring graphics data over the second bus from the graphics data processing means to the stack memory.

13. In a graphics processor for displaying objects and for use with a host processor, said processor having a memory having a plurality of memory locations, each location having an address, said memory locations for storing segments of graphics data which represent objects to be displayed, wherein the segments of graphics data are arranged in an hierarchical a arrangement wherein the graphics data of each segment includes at least one pointer representing the address of another segment; the improvement comprising; a read bus comprising a plurality of data lines to provide a data path for graphics data read from the memory; addressing means coupled to the memory for sequentially addressing graphics data stored in the memory, said addressing means including a register file coupled to the read bus for storing a pointer from the memory and means for addressing the graphics data stored at the segment addresses represented by the read pointers;
graphics data processing means coupled to the read bus for reading over the read bus and processing the graphics data addressed by the addressing means;
a stack memory;
a second bus coupling the stack memory to the addressing means and the graphics data processing means; and
stack transfer means for transferring pointers over the second bus from the addressing means register file to the stack memory and for transferring graphics data over the second bus from the graphics data processing means to the stack memory;
wherein each segment has a sibling pointer which represents the address of a segment at the same hierarchical level and a child pointer which represents the address of a segment at a lower hierarchical level wherein each segment has associated therewith a bounding volume which completely contains the object of the segment and all of the objects of the associated child pointers, wherein the graphics data means has culling means for determining whether a segment bounding volume is within a predetermined volume, and the addressing means includes a means responsive of the graphics data processing means for addressing the graphics data associated with a segment child pointer only if the bounding volume of the segment is determined to be within the predetermined volume.

14. The processor of claim 13 wherein each segment having a child pointer defines a parent segment and wherein each segment has a coordinate set associated therewith and each child segment has a transformation matrix for transforming the coordinate set of the child segment to the coordinate set of the parent segment, said graphics data processing means having means for concatenating the child segment transformation matrix to the parent segment transformation matrix, said stack transfer means having means for transferring the concatenated matrix of a segment to the stack memory if the segment object is found to be within the predetermined volume.

15. The processor of claim 14 wherein the graphics data of each segment of a plurality of segments further includes coordinate data representative of at least one graphics primitive and the addressing means has means for addressing the coordinate data of a segment and said stack transfer means has means for transferring the stored concatenated matrix of said segment from the stack memory to the graphics data processing means, and said graphics data processing means having means for multiplying the segment graphics primitive coordinate data by the segment concatenated matrix to transform the coordinate data to another coordinate set.

16. A traverser for use with a memory having a plurality of locations, each location having an address, said memory locations for storing segments of graphics data which represent objects to be displayed, each segment comprising a plurality of packets of graphics data, each packet being stored at memory locations having sequential addresses, wherein the graphics data of each packet includes at least one pointer representing the address of another packet; and for use with a geometry processor for processing the packets of graphics data read from the memory;

the traverser comprising:

counter means responsive to receipt of a pointer, for generating sequential addresses for reading a packet of graphics data from the memory starting at an address represented by the pointer;

a register file for storing pointers read from the memory;

a stack memory for storing segment graphics data; and control means for: (1) transferring a pointer previously stored in the register file to the counter means to initiate the generation of sequential addresses to read a packet; (2) transferring pointers from the register file to the stack memory for storage; (3) transferring graphics data from the geometry processor to the stack memory for storage, and (4) transferring pointers from the stack memory to the counter means to initiate the generation of sequential addresses to read an additional packet; and (5) transferring graphics data from the stack memory to the geometry processor for further processing.

17. The traverser of claim 16 wherein the geometry processor has means for determining whether the object of a segment is potentially visible within a predetermined viewport, and wherein the control means for transferring graphics data from the geometry processor to the stack memory for storage has means responsive to the geometry processor for transferring such graphics data for only objects determined to be potentially visible.

18. A traverser for a memory having a plurality of memory locations, each location having an address, said memory locations for storing segments of graphics data which represent objects to be displayed, wherein the segments of graphics data are arranged in an hierarchical arrangement wherein each segment comprises a plurality of packets of graphics data, each packet being stored in memory locations having sequential memory addresses, said segment packets including a header block comprising a plurality of pointers to relational segments including parent, child and sibling segments, and pointers to culling and data buffers, each culling buffer comprising a plurality of packets of graphics data defining attributes of the object of the segment and each data buffer comprising packets of graphics data defining a graphics primitive of the object, each packet containing a pointer to another packet of the buffer; and for a geometry processor for processing culling buffer packets to determine if the object of the segment is potentially visible within a predetermined viewport and for processing the data buffer packets in combination with the attribute graphics data from the previously processed culling buffer packets to process the graphics primitive of a segment; the traverser comprising:

counter means responsive to receipt of a pointer, for generating sequential addresses for reading a packet from the memory starting at an address represented by the pointer;

a register file for storing pointers read from the memory;

a stack memory for storing segment graphics data; and control means responsive to the geometry processor for (1) supplying a pointer to the counter means to initiate the generation of sequential addresses to read a header block packet for a segment from the memory and storing the header block packet in the register file; (2) transferring the culling buffer pointer from the header block packet stored in the register file to the counter means to initiate the generation of sequential addresses to read a culling buffer packet of the segment and for storing the culling buffer packet in the register file; (3) transferring the next culling buffer packet pointer from the culling buffer packet stored in the register file to the counter means to initiate the generation of sequential addresses to read the next culling buffer packet from the memory and for storing the next culling buffer packet in the register file; (4) repeating step 3 until all packets of the culling buffer have been read for a segment; (5) transferring the segment header block pointer from the register file and segment object attribute graphics data from the geometry processor to the stack memory if the geometry processor determines that the object of the segment is potentially visible; (6) repeating steps 1-5 for the sibling segment of the segment if the segment has a sibling segment; (7) repeating steps 1-5 for the child segment of the segment if the segment does not have a sibling segment and if the segment does have a child segment; (8) repeating steps 6 and 7 until the culling buffer packets for a segment having no sibling or child segment have been read; (9) transferring the header block pointer from a segment having graphics data stored on the stack to the counter means to initiate the generation of sequential addresses to read the segment header block packet from the memory and for storing the read segment header block packet in the register file; (10) transferring the data buffer pointer from the header block packet stored in the register file to the counter means to initiate the generation of sequential addresses to read a data buffer packet of the segment and for storing the data buffer packet in the register file; (11) transferring the next data buffer packet pointer from the data buffer packet stored in the register file to the counter means to initiate the generation of sequential addresses to read the next data buffer packet from the memory and for storing the next data buffer packet in the register file; (12) repeating step 11 until all packets of the segment data buffer have been read; (13) transferring the segment object attribute graphics data from the stack memory to the geometry processor; (14) repeating steps 9-13 for the remaining segments having graphics data stored on the stack until a segment which is the sibling segment of the segment previously read from the stack is encountered having a child segment for which the culling buffer packets have not been read; (15) repeating steps 1-14 until all segment graphics data stored on the stack has been transferred to the geometry processor.

* * * * *